(12) United States Patent
Pitbladdo

(10) Patent No.: US 8,006,517 B2
(45) Date of Patent: Aug. 30, 2011

(54) OVERFLOW DOWNDRAW GLASS FORMING METHOD AND APPARATUS

(75) Inventor: Richard B. Pitbladdo, Naples, FL (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/696,426

(22) Filed: Jan. 29, 2010

(65) Prior Publication Data

US 2010/0162763 A1 Jul. 1, 2010

Related U.S. Application Data

(60) Division of application No. 11/553,198, filed on Oct. 26, 2006, now Pat. No. 7,681,414, which is a continuation-in-part of application No. 11/006,251, filed on Dec. 7, 2004, now Pat. No. 7,155,935, which is a division of application No. 10/214,904, filed on Aug. 8, 2002, now Pat. No. 6,889,526.

(60) Provisional application No. 60/310,989, filed on Aug. 8, 2001, provisional application No. 60/316,676, filed on Aug. 31, 2001, provisional application No. 60/318,726, filed on Sep. 12, 2001, provisional application No. 60/318,808, filed on Sep. 13, 2001, provisional application No. 60/345,464, filed on Jan. 3, 2002, provisional application No. 60/345,465, filed on Jan. 3, 2002, provisional application No. 60/751,419, filed on Dec. 15, 2005.

(51) Int. Cl.
*C03B 17/00* (2006.01)
*C03B 17/06* (2006.01)

(52) U.S. Cl. ............... 65/99.1; 65/90; 65/29.15; 65/355

(58) Field of Classification Search ............ 65/139, 65/193
See application file for complete search history.

(56) References Cited

U.S. PATENT DOCUMENTS

| | | |
|---|---|---|
| 1,565,319 A | 12/1925 | Fowle |
| 1,673,907 A | 6/1928 | Ferngren |
| 1,697,227 A | 1/1929 | Danner |
| 1,731,260 A | 10/1929 | Nobbe |
| 1,759,229 A | 5/1930 | Drake |
| 1,829,639 A | 10/1931 | Ferngren |
| 1,829,641 A | 10/1931 | Ferngren |
| 1,841,579 A | 1/1932 | Fraser |
| 1,891,370 A | 12/1932 | Danner |
| 3,149,949 A | 9/1964 | Dockerty et al. ............ 65/33 |
| 3,338,696 A | 8/1967 | Dockerty ............ 65/164 |
| 3,433,613 A | 3/1969 | Dockerty ............ 65/145 |
| 3,437,470 A | 4/1969 | Overman ............ 65/195 |

(Continued)

FOREIGN PATENT DOCUMENTS

BE 718111 12/1968

(Continued)

OTHER PUBLICATIONS

Bottger, et al.; "LCD substrate—the future process" International Glass Review, Issue 2—2000; 3 pages.

(Continued)

*Primary Examiner* — Matthew J Daniels
*Assistant Examiner* — Cynthia Szewczyk
(74) *Attorney, Agent, or Firm* — Siwen Chen

(57) ABSTRACT

The present invention discloses improved methods and apparatus for forming sheet glass. In one embodiment, the invention introduces a counteracting force to the stresses on the forming structure in a manner such that the thermal creep which inevitably occurs has a minimum impact on the glass flow characteristics of the forming structure.

16 Claims, 53 Drawing Sheets

U.S. PATENT DOCUMENTS

| | | | | |
|---|---|---|---|---|
| 3,451,798 | A | 6/1969 | Simon | 65/199 |
| 3,506,429 | A | 4/1970 | Overman | 65/203 |
| 3,519,411 | A | 7/1970 | Cortright et al. | 65/90 |
| 3,589,887 | A | 6/1971 | Ward | 65/195 |
| 3,607,182 | A | 9/1971 | Leibowitz | 65/53 |
| 3,682,609 | A | 8/1972 | Dockerty | 65/83 |
| 3,723,082 | A | 3/1973 | Knowles | 65/84 |
| 4,214,886 | A | 7/1980 | Shay et al. | 65/121 |
| 4,389,725 | A | 6/1983 | Barkhau et al. | 373/40 |
| 4,416,678 | A | 11/1983 | Bottger | 65/2 |
| 4,738,706 | A | 4/1988 | Picinelli | 65/136 |
| 5,374,595 | A | 12/1994 | Dumbaugh et al. | 501/66 |
| 6,319,867 | B1 | 11/2001 | Chacon et al. | 501/66 |
| 6,748,765 | B2 | 6/2004 | Pitbladdo | 65/53 |
| 6,889,526 | B2 | 5/2005 | Pitbladdo | 65/53 |
| 6,895,782 | B2 | 5/2005 | Pitbladdo | 65/53 |
| 6,974,786 | B2 | 12/2005 | Helfinstine et al. | 501/106 |
| 6,990,834 | B2 | 1/2006 | Pitbladdo | 65/29.21 |
| 6,997,017 | B2 | 2/2006 | Pitbladdo | 65/53 |
| 7,155,935 | B2 | 1/2007 | Pitbladdo | 257/301 |
| 7,681,414 | B2 | 3/2010 | Pitbladdo | |
| 2001/0039814 | A1 | 11/2001 | Pitbladdo | 65/193 |
| 2003/0029199 | A1 | 2/2003 | Pitbladdo | 65/195 |
| 2003/0110804 | A1 | 6/2003 | Fenn et al. | 65/90 |
| 2003/0192349 | A1 | 10/2003 | Meda et al. | 65/53 |
| 2004/0055338 | A1 | 3/2004 | Helfinstine et al. | 65/374.13 |
| 2005/0160767 | A1 | 7/2005 | Novak | 65/29.17 |
| 2005/0183455 | A1 | 8/2005 | Pitbladdo | 65/29.11 |
| 2006/0016219 | A1 | 1/2006 | Pitbladdo | 65/29.21 |
| 2006/0042314 | A1 | 3/2006 | Abbott | 65/25.3 |
| 2008/0202165 | A1 | 8/2008 | Hoysan et al. | 65/90 |

FOREIGN PATENT DOCUMENTS

| | | |
|---|---|---|
| DE | 1596484 | 7/1967 |
| DE | 1596403 | 12/1967 |
| DE | 1596402 | 12/1968 |
| DE | 2158253 | 11/1971 |
| DE | 3113505 | 1/1983 |
| DE | 3111484 A1 | 2/1983 |
| DE | 3316795 | 11/1983 |
| DE | 3111484 C2 | 12/1983 |
| DE | 3314540 | 12/1983 |
| DE | 3329843 | 5/1984 |
| DE | 3507852 | 8/1985 |
| DE | 3518137 | 1/1986 |
| DE | 4326143 | 12/1993 |
| DE | 4336046 | 4/1995 |
| DE | 19644673 | 4/1998 |
| DE | 19809878 | 9/1999 |
| DE | 19840113 | 3/2000 |
| DE | 19964043 | 7/2001 |
| DE | 100 21013 | 11/2001 |
| DE | 10028741 | 12/2001 |
| FR | 1549081 | 12/1967 |
| FR | 1549915 | 1/1968 |
| GB | 982153 | 2/1965 |
| GB | 2100401 | 7/1970 |
| GB | 1354006 | 6/1974 |
| JP | 09110443 | 4/1997 |
| JP | 10291827 | 11/1998 |
| JP | 11-246230 | 9/1999 |
| JP | 2001-80922 | 9/1999 |

OTHER PUBLICATIONS

Bocko, Peter L. and Mitchell, Mark H. "AMLCD Glass Substrates—Foundation for High-Tech Displays" The GlassReseacher, vol. 12, No. 1, pp. 26-29, 2002.

Varshneya, Arun, "Fundamentals of Inorganic Glasses", Academic Press, Inc., 1994, 00.534-540.

Snyder, R.D/Byars, E.F., "Engineering Mechanics", McGraw-Hill Book Company, 1973, pp. 349-350.

Kingery, W.D.; Bowen, H.K.; Uhlmann, D.R., "Introduction to Ceramics", John Wiley & Sons, 1976, pp. 705-767.

Non-final Office action dated Jun. 24, 2005 for U.S. Appl. No. 11/011,657.

Response to Non-final Office action dated Jul. 29, 2005 for U.S. Appl. No. 11/011,657.

Supplemental Amendment dated Aug. 12, 2005 for U.S. Appl. No. 11/011,657.

Non-final Office action dated Jun. 1, 2005 for U.S. Appl. No. 11/006,251.

Response to Non-final Office action dated Aug. 8, 2005 for U.S. Appl. No. 11/006,251.

Final Office action dated Nov. 9, 2005 for U.S. Appl. No. 11/006,251.

Response to Final Office action dated Feb. 9, 2006 for U.S. Appl. No. 11/006,251.

Non-final Office action dated Apr. 19, 2006 for U.S. Appl. No. 11/006,251.

Response to Non-final Office action dated Sep. 18, 2006 for U.S. Appl. No. 11/006,251.

Non-final Office action dated Aug. 28, 2007 for U.S. Appl. No. 11/553,198.

Response to Non-final Office action dated Sep. 4, 2007 for U.S. Appl. No. 11/553,198.

Non-final Office action dated Oct. 18, 2007 for U.S. Appl. No. 11/553,198.

Response to Non-final Office action dated Jan. 18, 2008 for U.S. Appl. No. 11/553,198.

Non-final Office action dated May 14, 2008 for U.S. Appl. No. 11/553,198.

Response to Non-final Office action dated Nov. 14, 2008 for U.S. Appl. No. 11/553,198.

Non-final Office action dated Feb. 24, 2009 for U.S. Appl. No. 11/553,198.

Response to Non-final Office action date Aug. 5, 2009 for U.S. Appl. No. 11/553,198.

Preliminary Amendment dated Jun. 22, 2004 for U.S. Appl. No. 10/214,904.

Examiner Interview Summary dated Dec. 20, 2004 for U.S. Appl. No. 10/214,904.

Notice of Allowance dated Dec. 20, 2004 for U.S. Appl. No. 10/214,904.

Examiner Interview Summary dated Dec. 17, 2004 for U.S. Appl. No. 10/771,761.

Notice of Allowance dated Dec. 17, 2004 for U.S. Appl. No. 10/771,761.

Preliminary Amendment dated Dec. 14, 2004 for U.S. Appl. No. 11/011,657.

Examiner Interview Summary dated Jun. 24, 2005 for U.S. Appl. No. 11/011,657.

Examiner Interview Summary dated Sep. 26, 2005 for U.S. Appl. No. 11/011,657.

Notice of Allowability dated Sep. 26, 2005 for U.S. Appl. No. 11/011,657.

Preliminary Amendment dated Dec. 7, 2004 for U.S. Appl. No. 11/006,251.

Preliminary Amendment dated Feb. 14, 2005 for U.S. Appl. No. 11/006,251.

Notice of Non-compliant amendment dated Aug. 22, 2005 for U.S. Appl. No. 11/006,251.

Response to Notice of Non-compliant amendment dated Aug. 30, 2005 for U.S. Appl. No. 11/006,251.

Examiner Interview Summary dated Oct. 5, 2006 for U.S. Appl. No. 11/006,251.

Notice of Allowability dated Oct. 5, 2006 for U.S. Appl. No. 11/006,251.

Examiner Interview Summary dated Oct. 23, 2006 for U.S. Appl. No. 11/006,251.

Response to Election/Restriction dated Sep. 4, 2007 for U.S. Appl. No. 11/553,198.

Notice of Allowability dated Oct. 29, 2009 for U.S. Appl. No. 11/553,198.

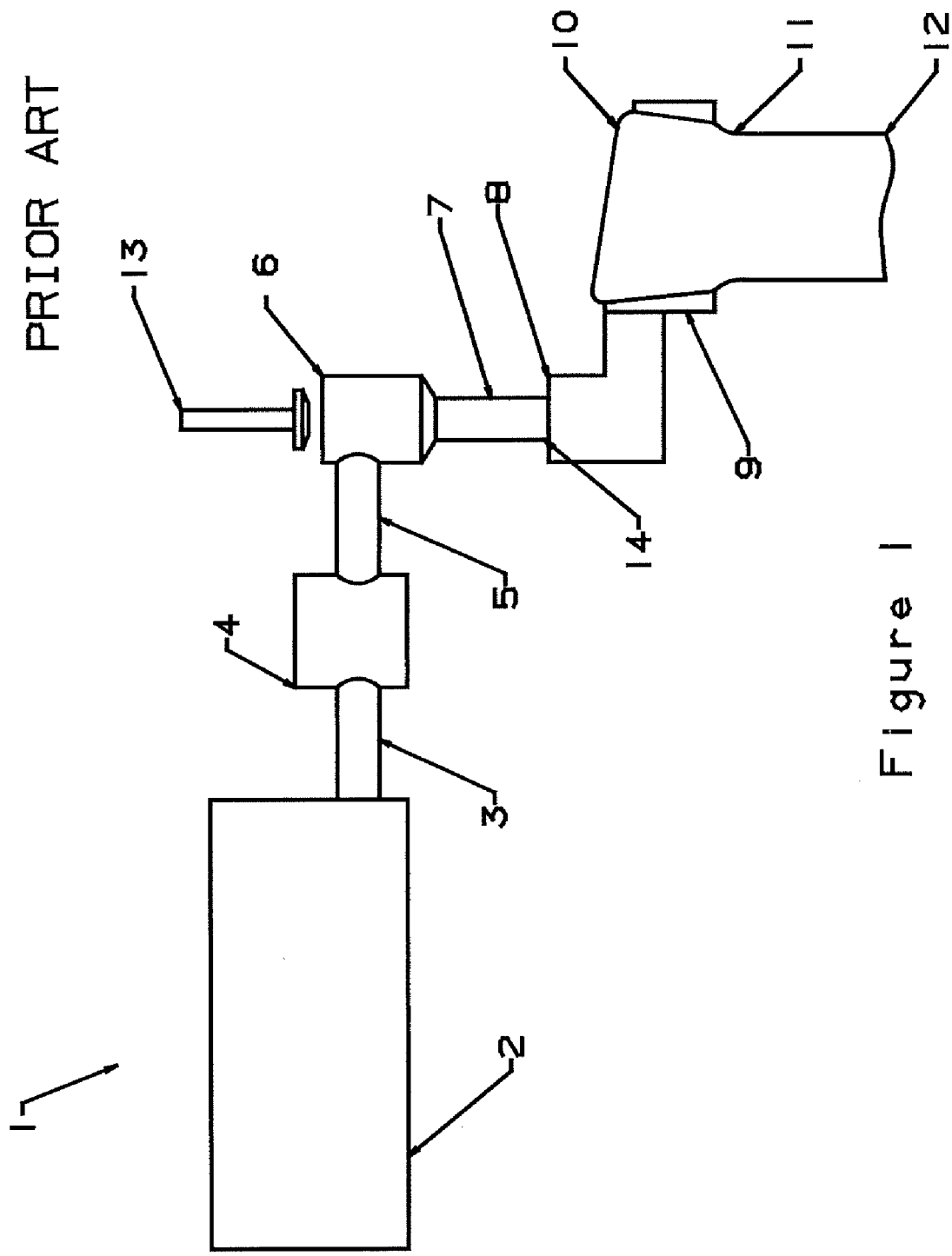
Figure 1 — PRIOR ART

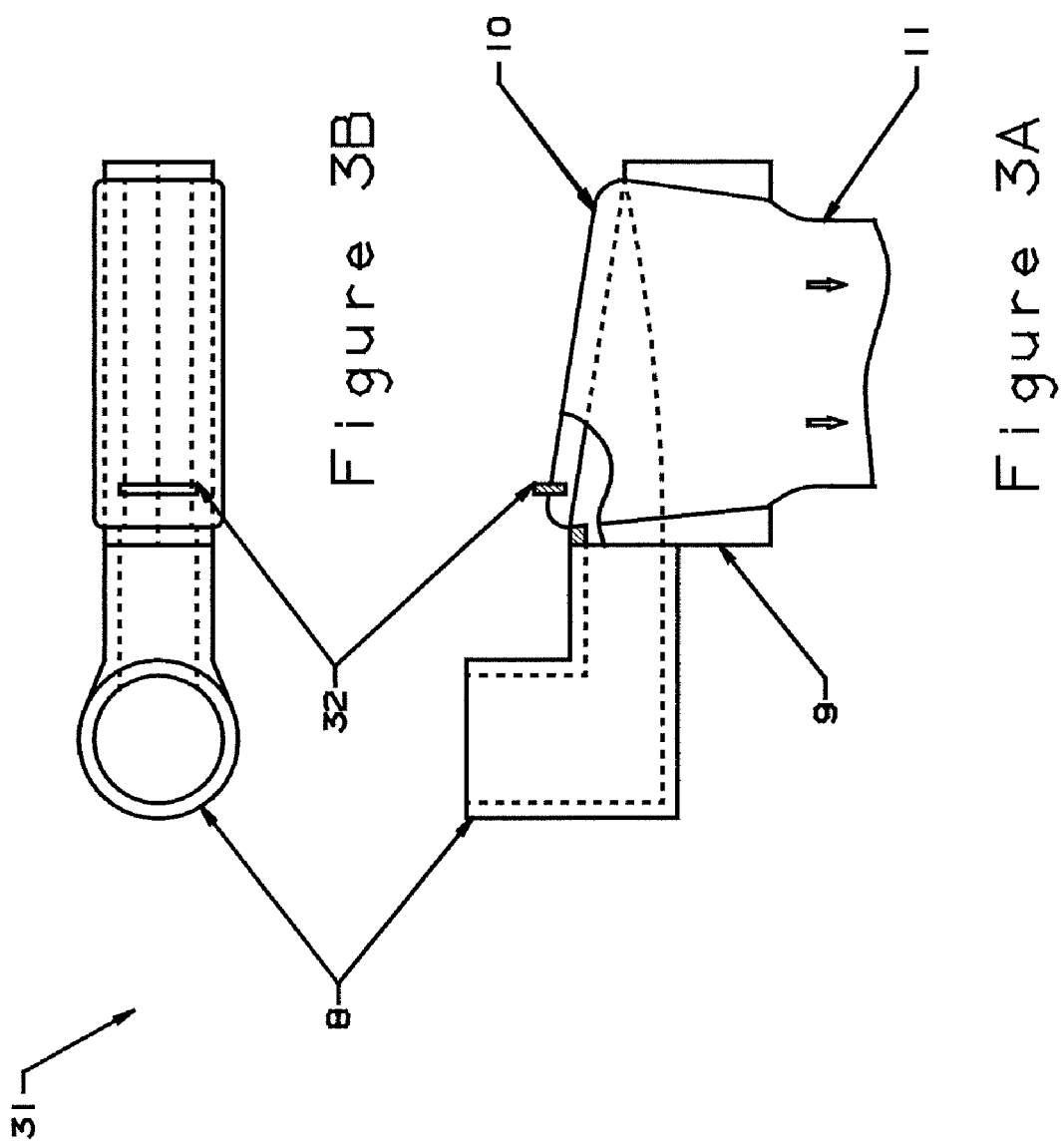

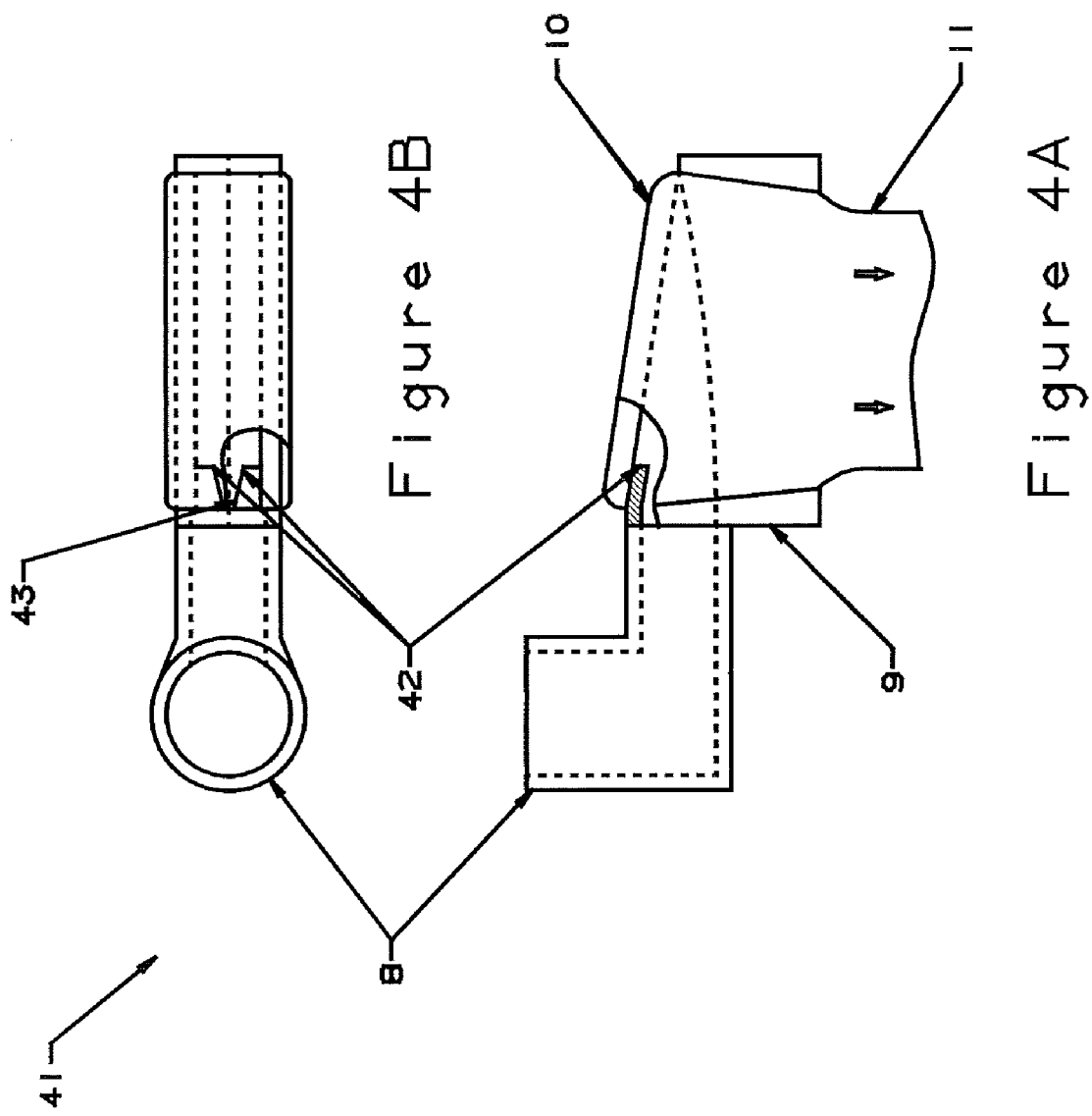

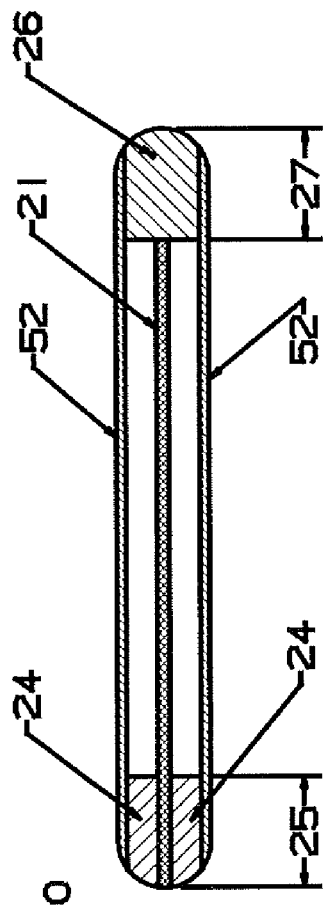
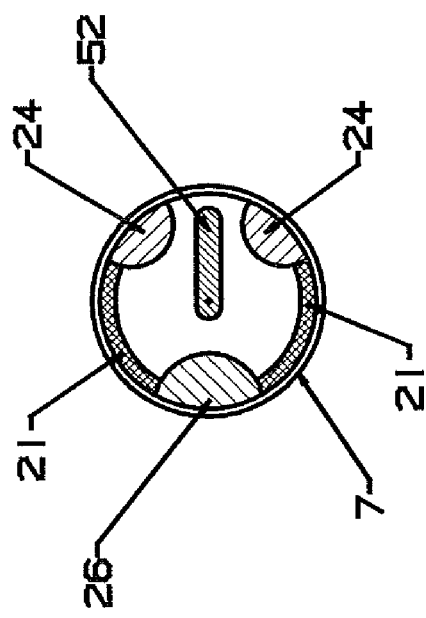
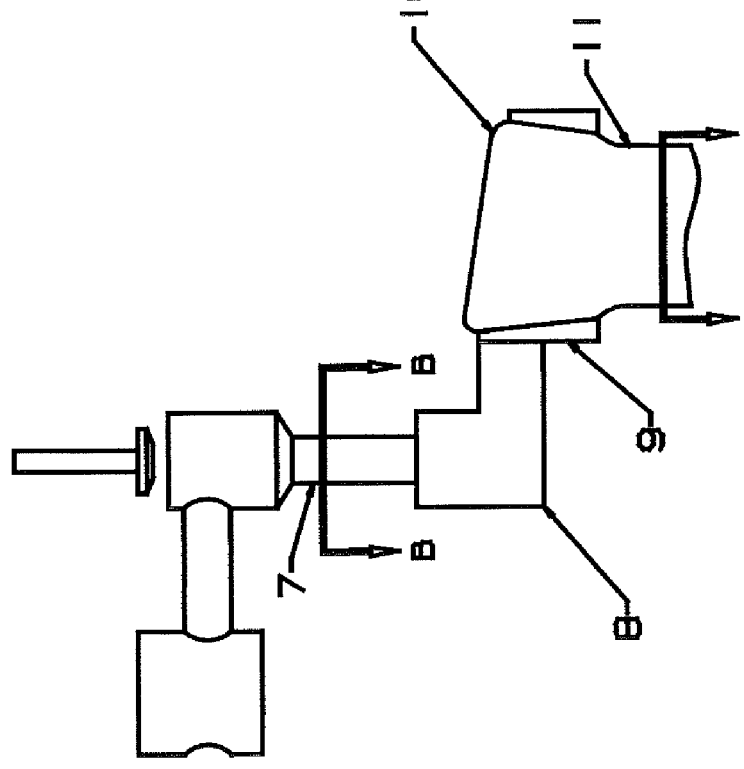
Figure 5C
Figure 5B
Figure 5A

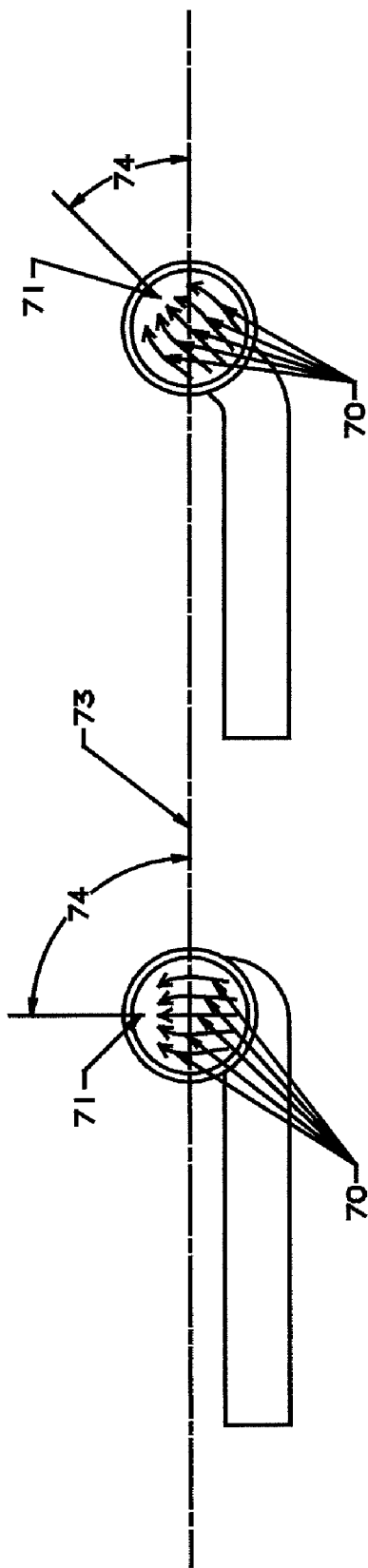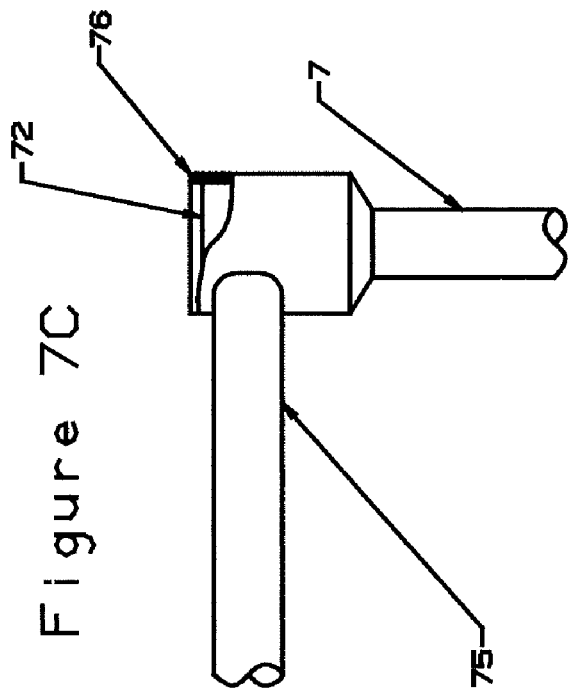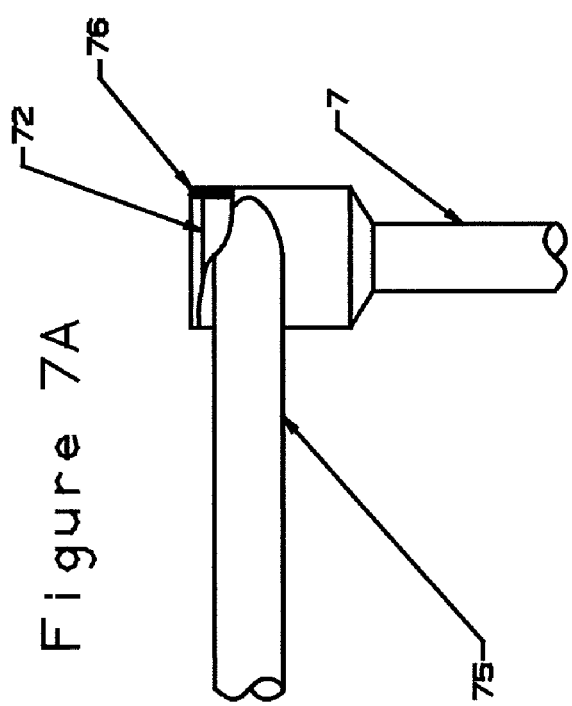

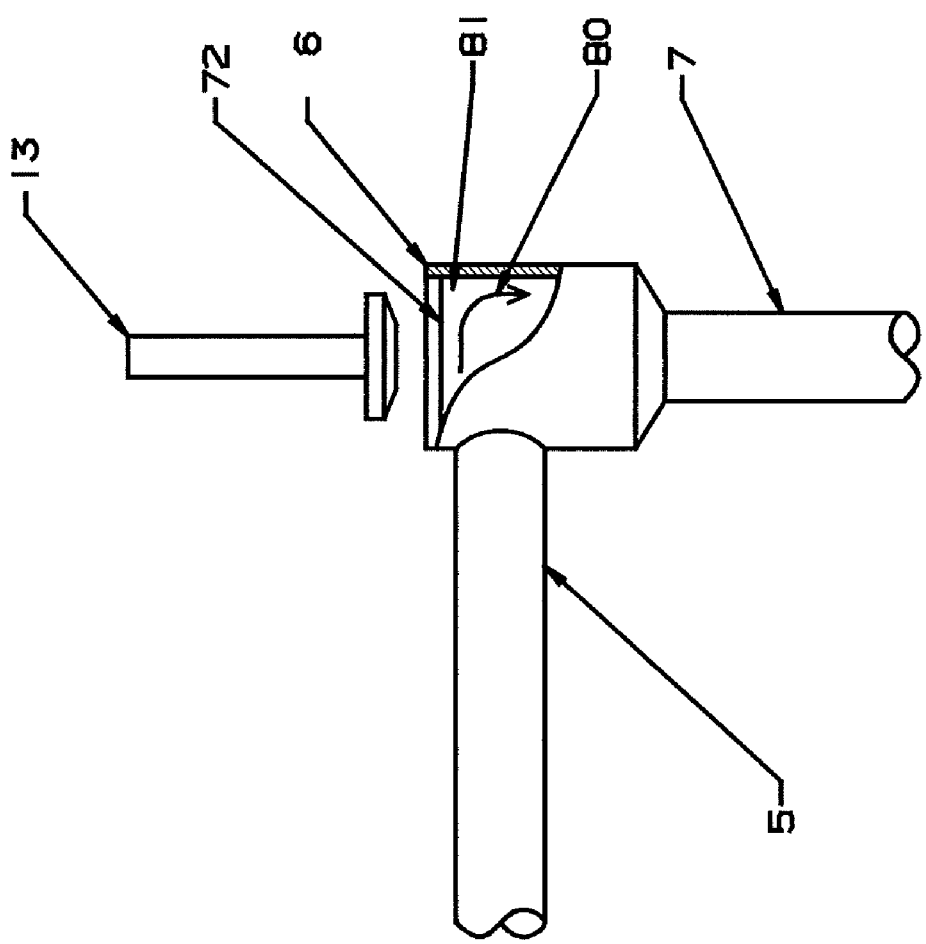
Figure 8 — PRIOR ART

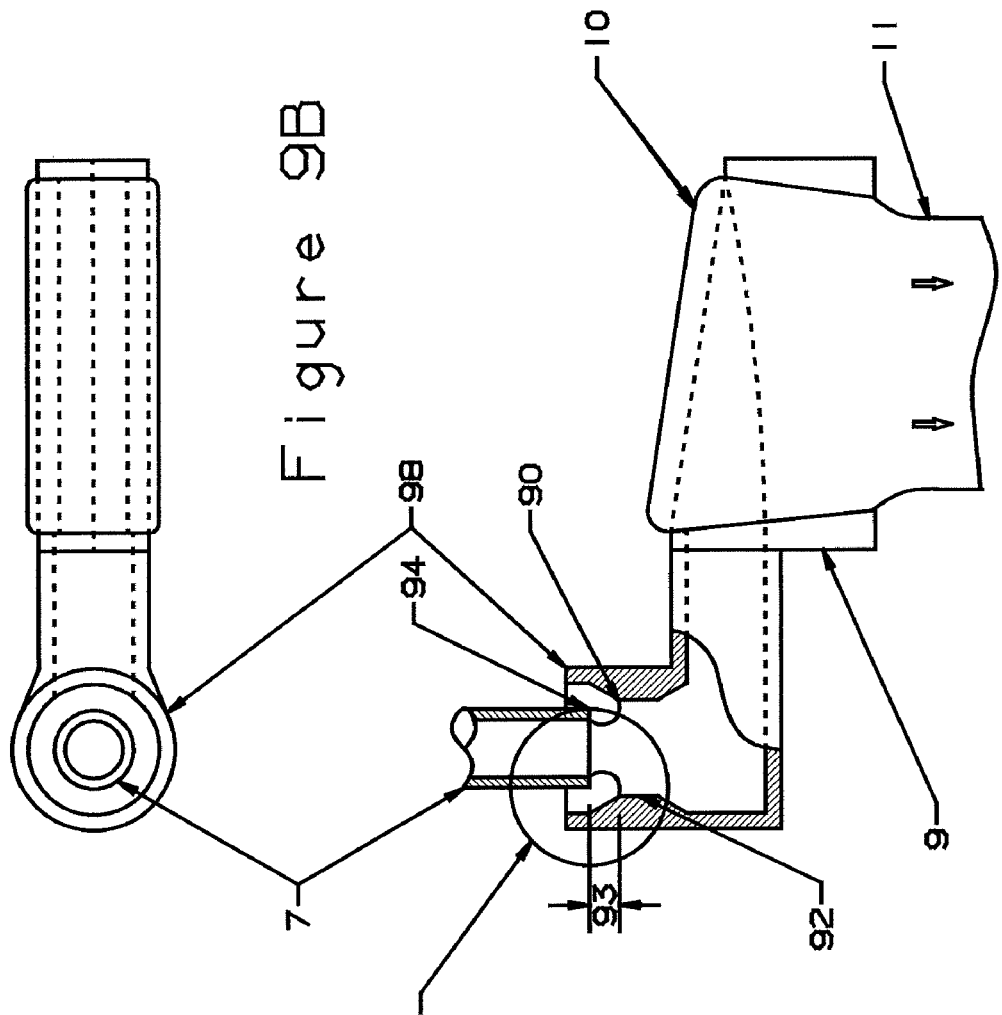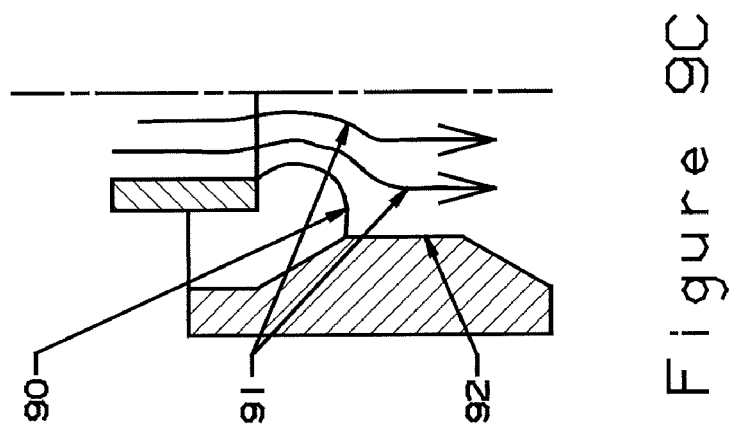

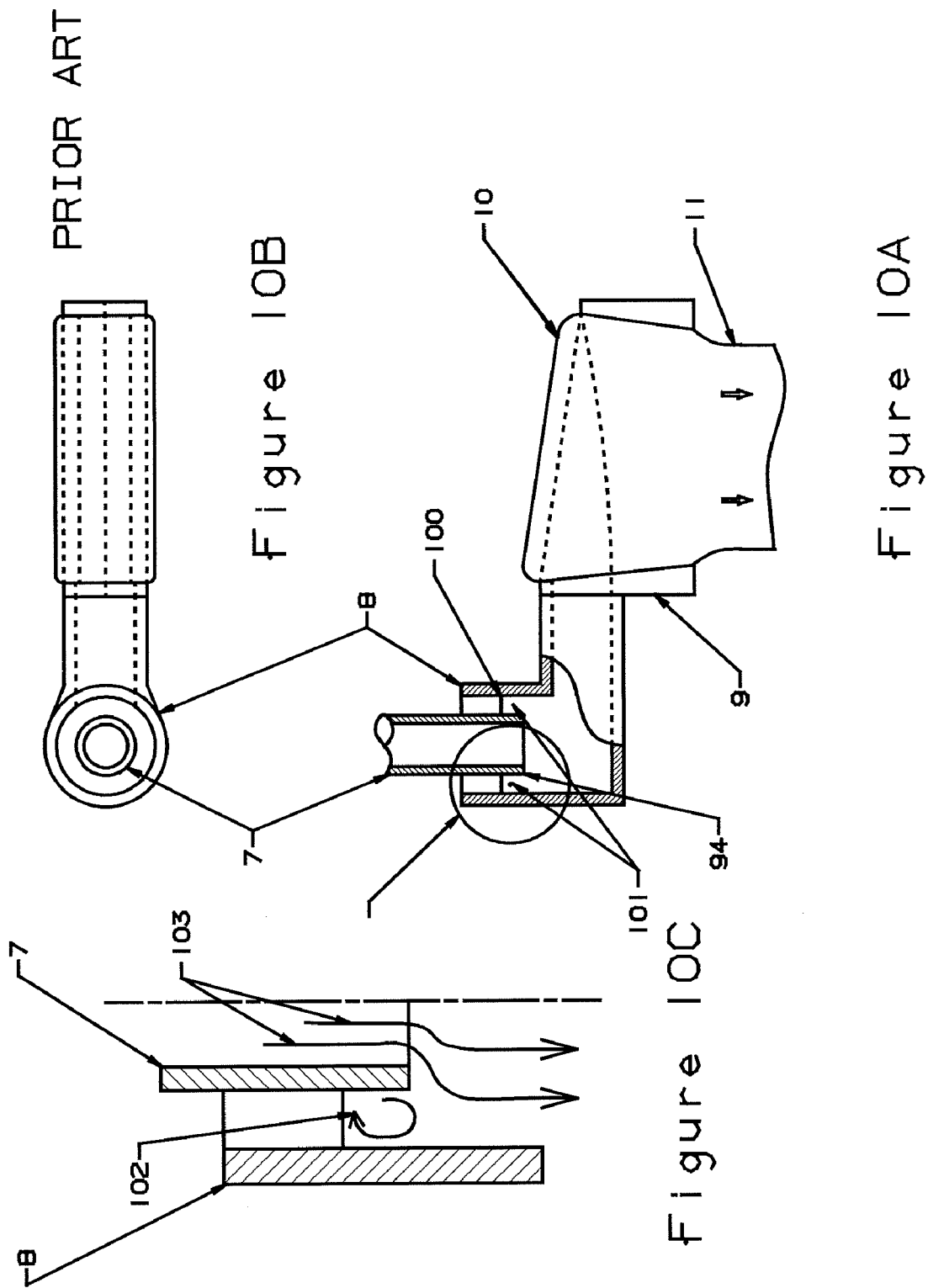

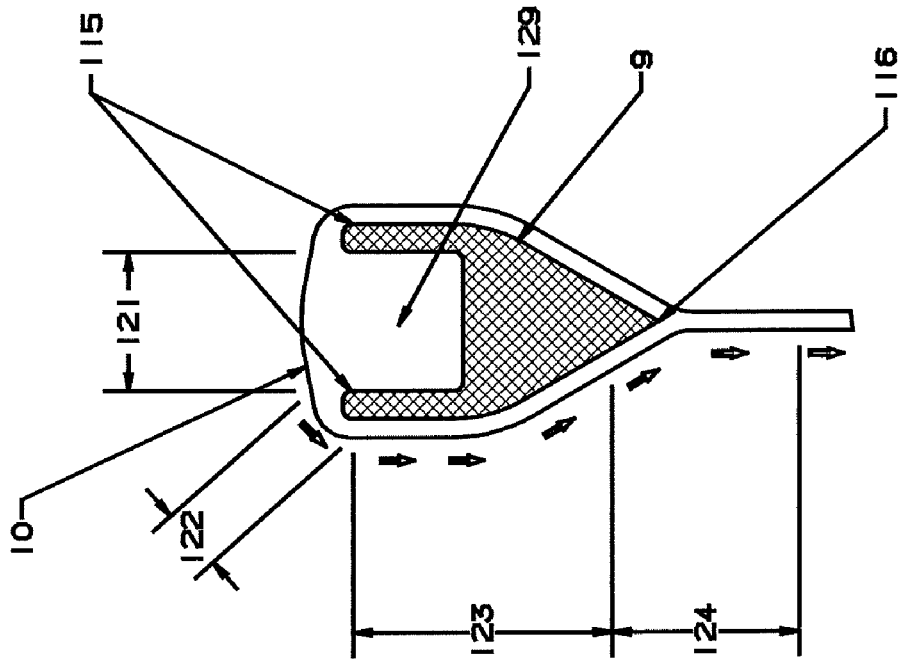
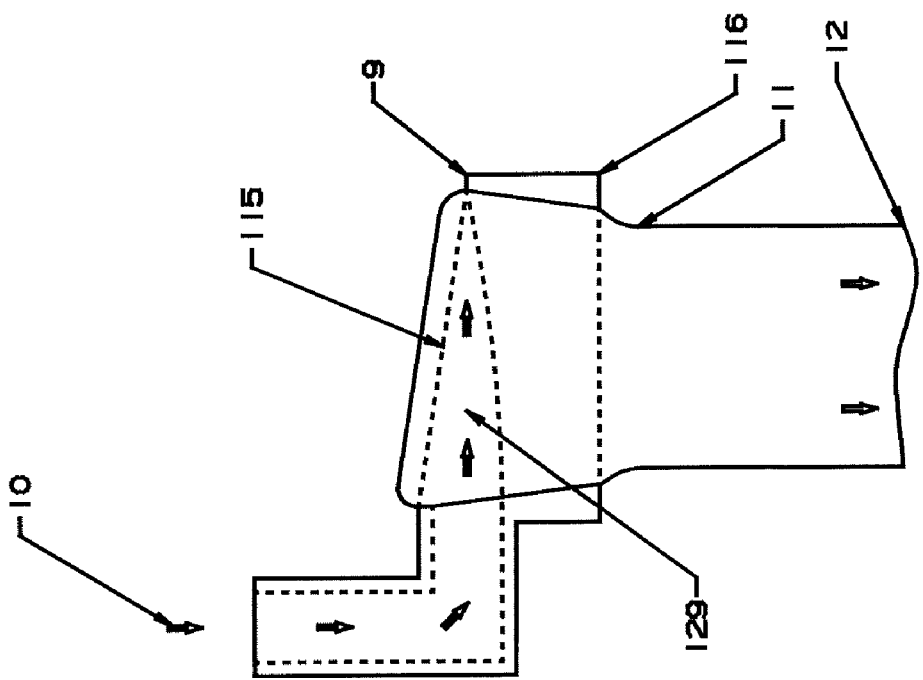

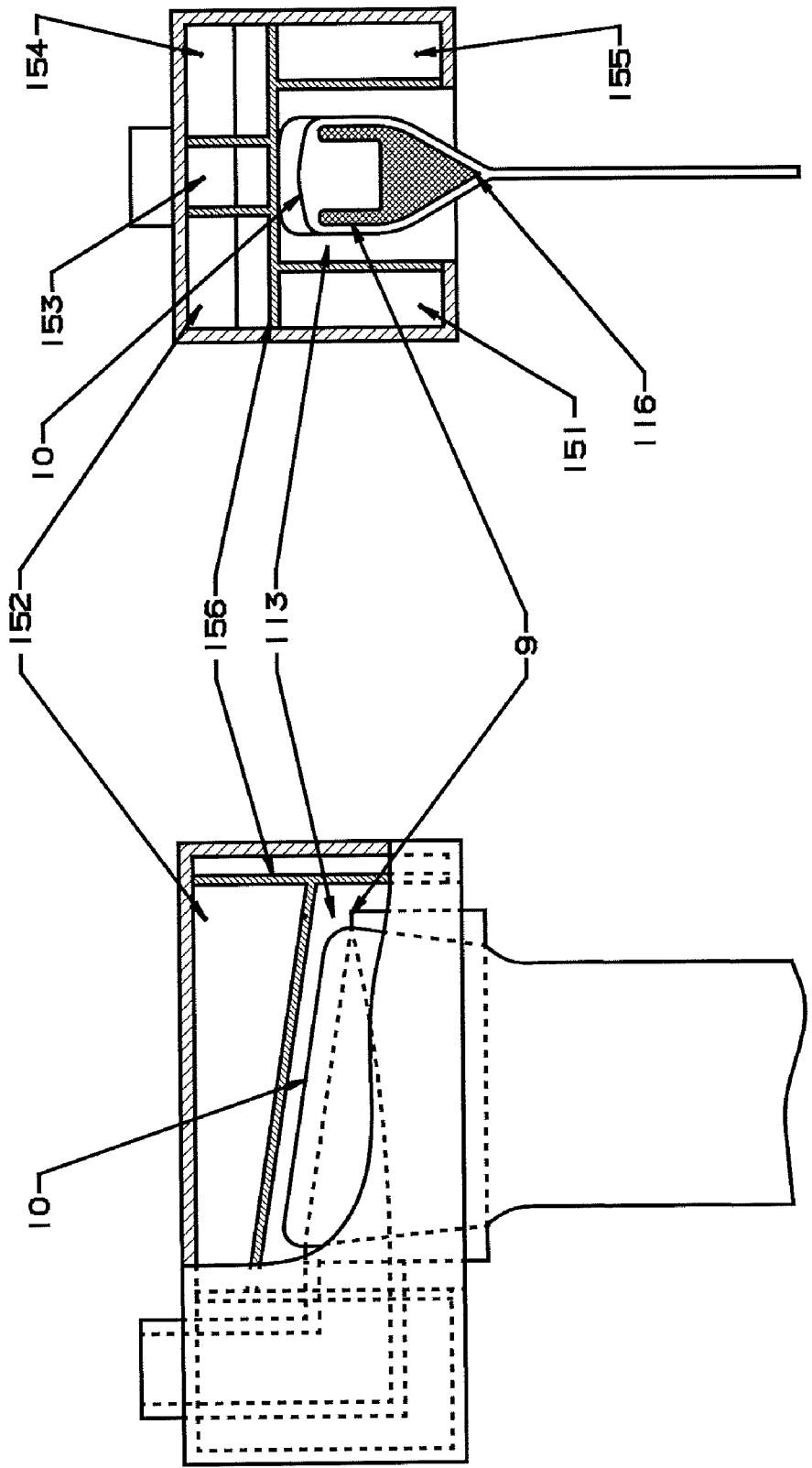

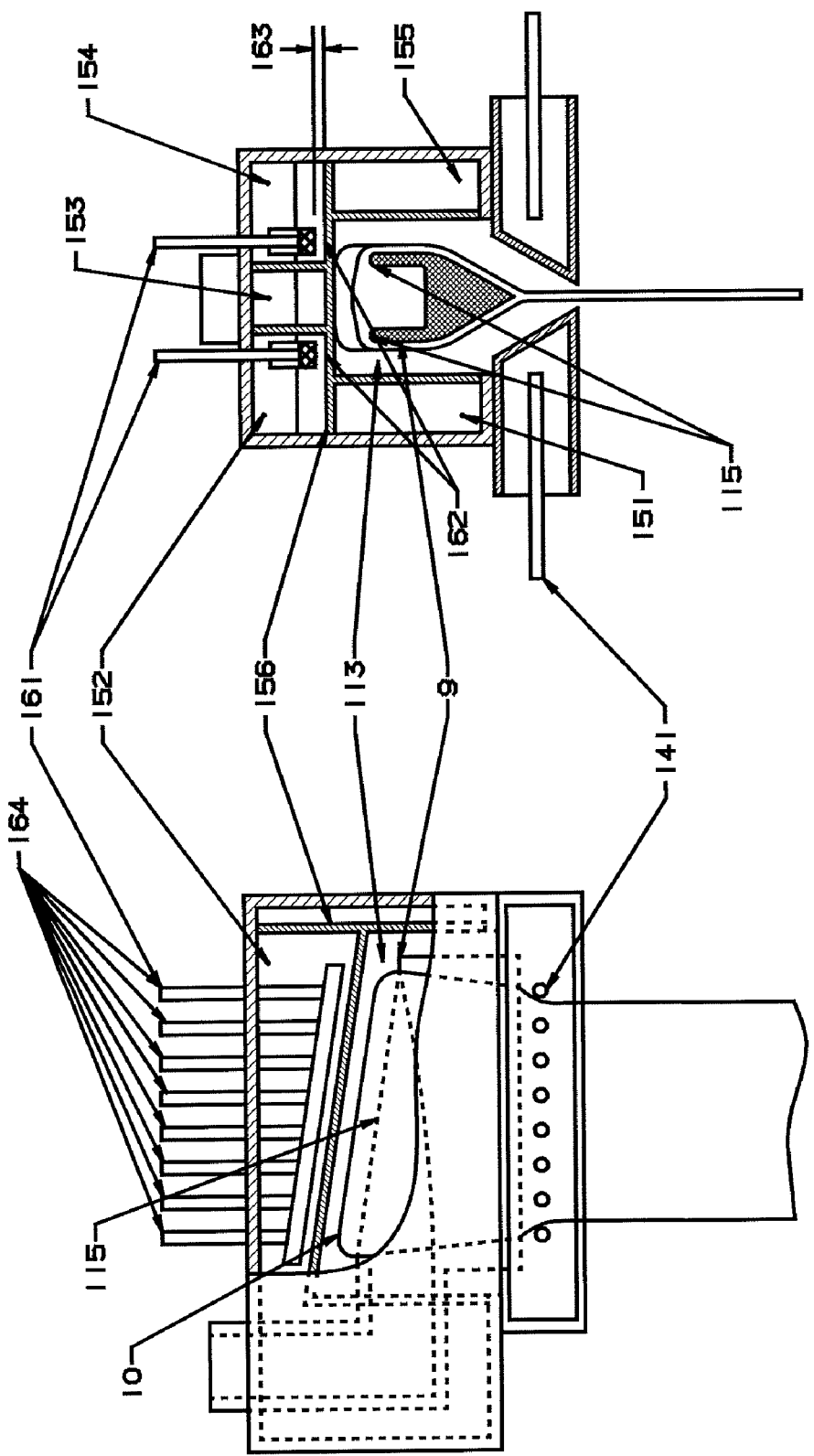

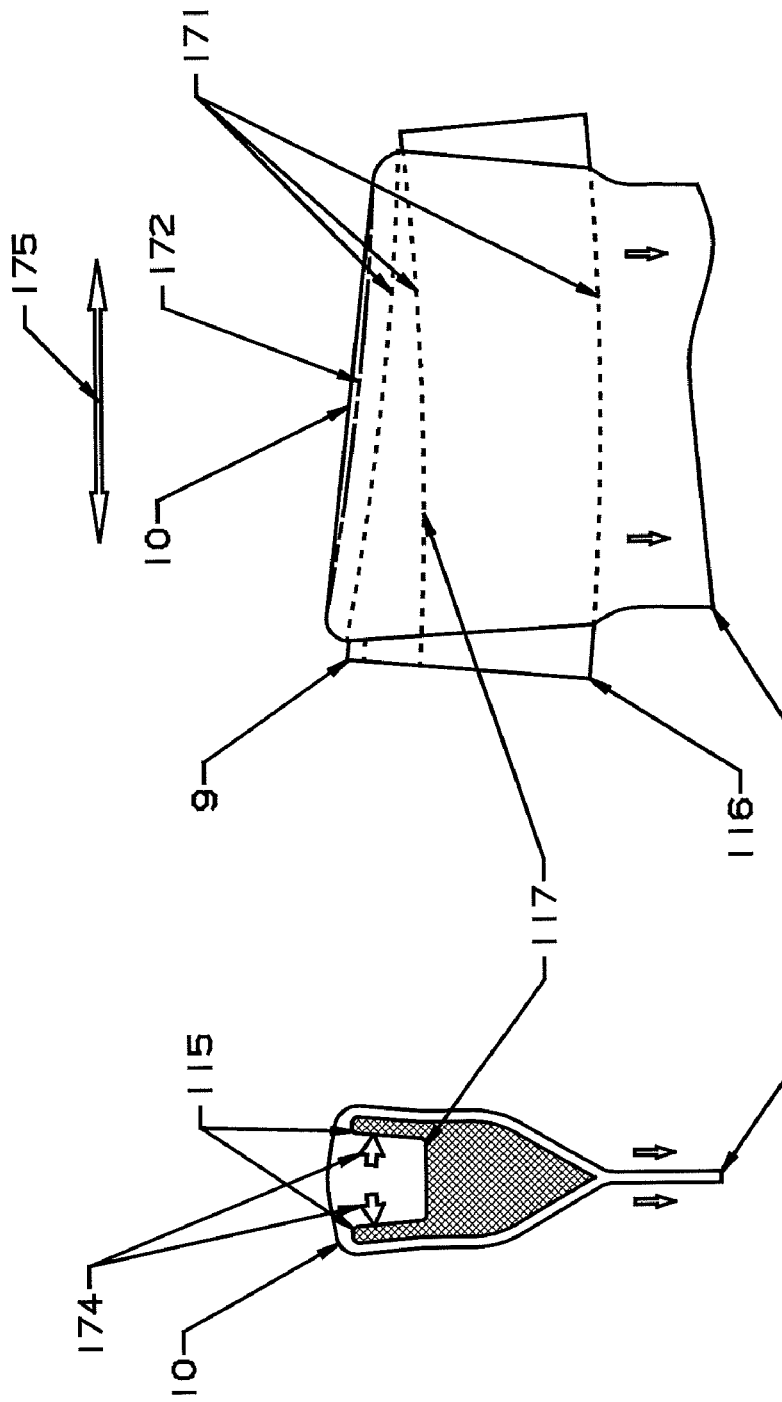

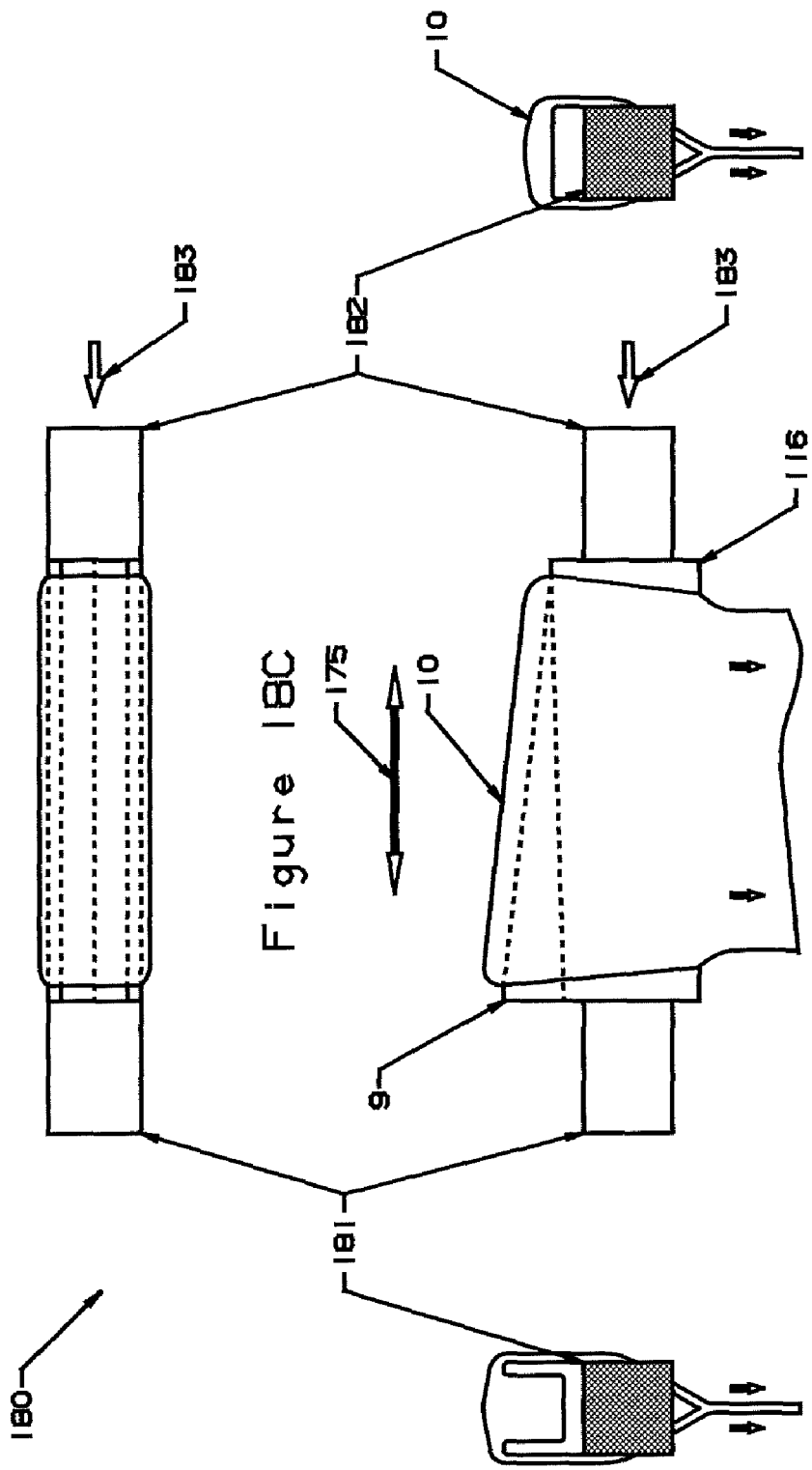

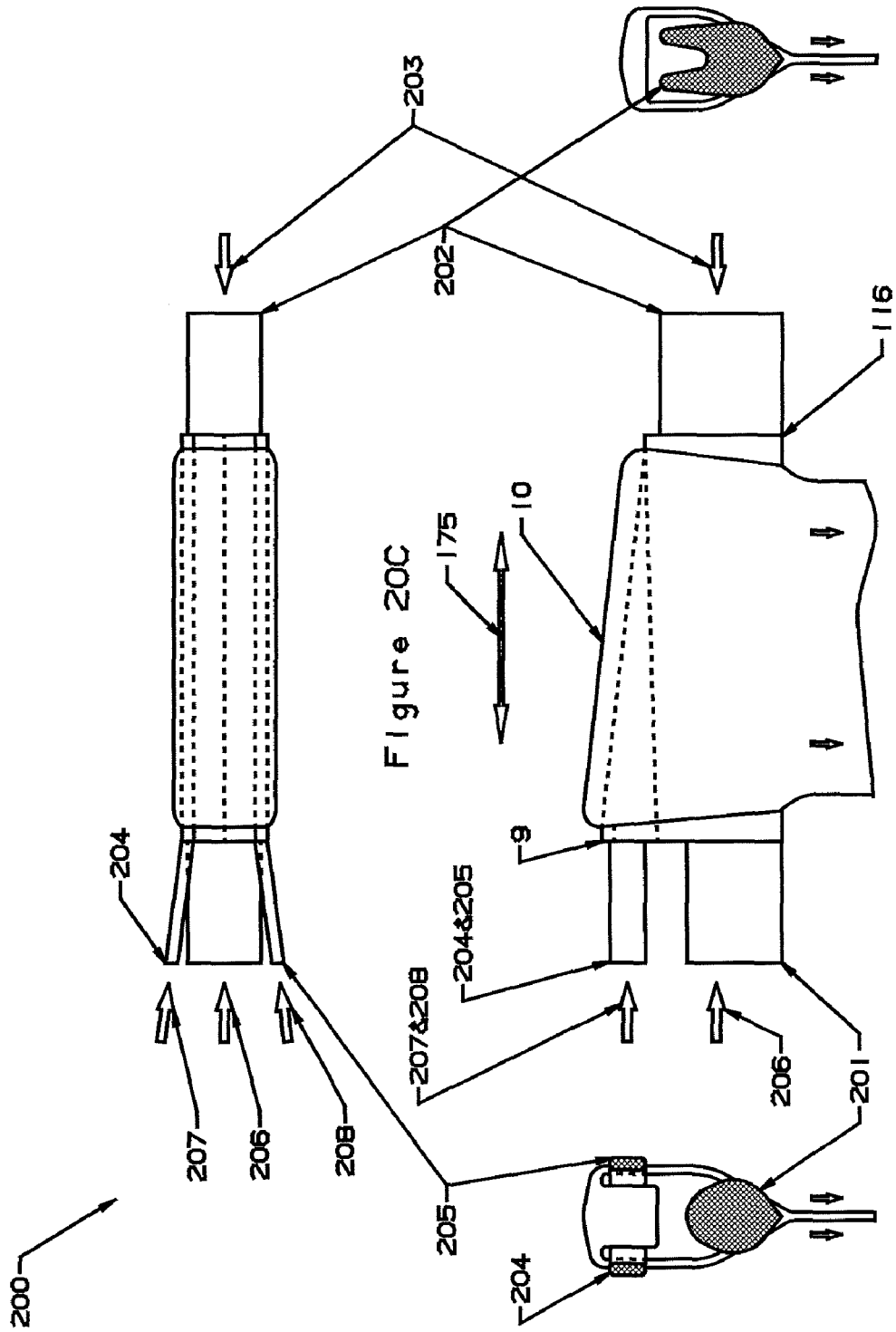

PRIOR ART

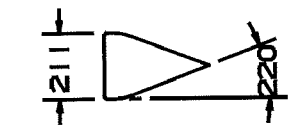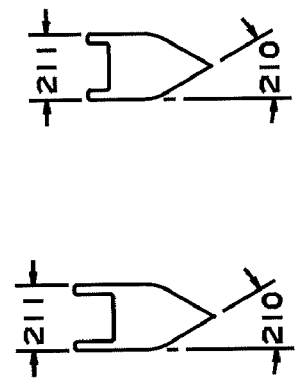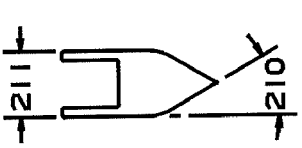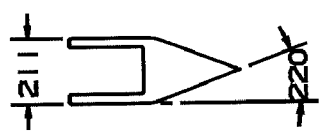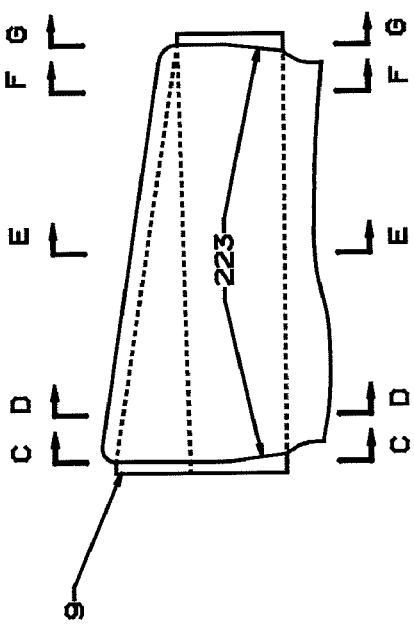

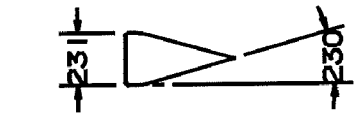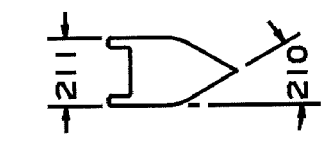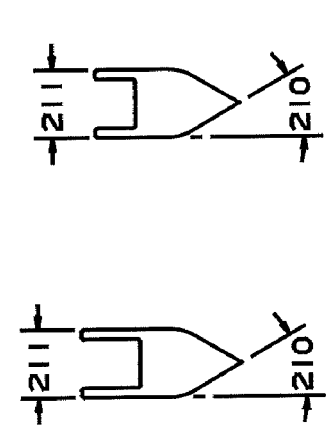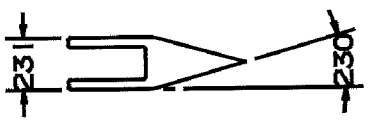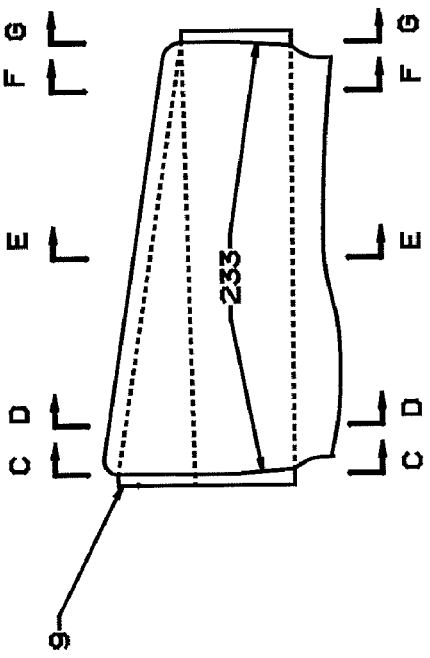

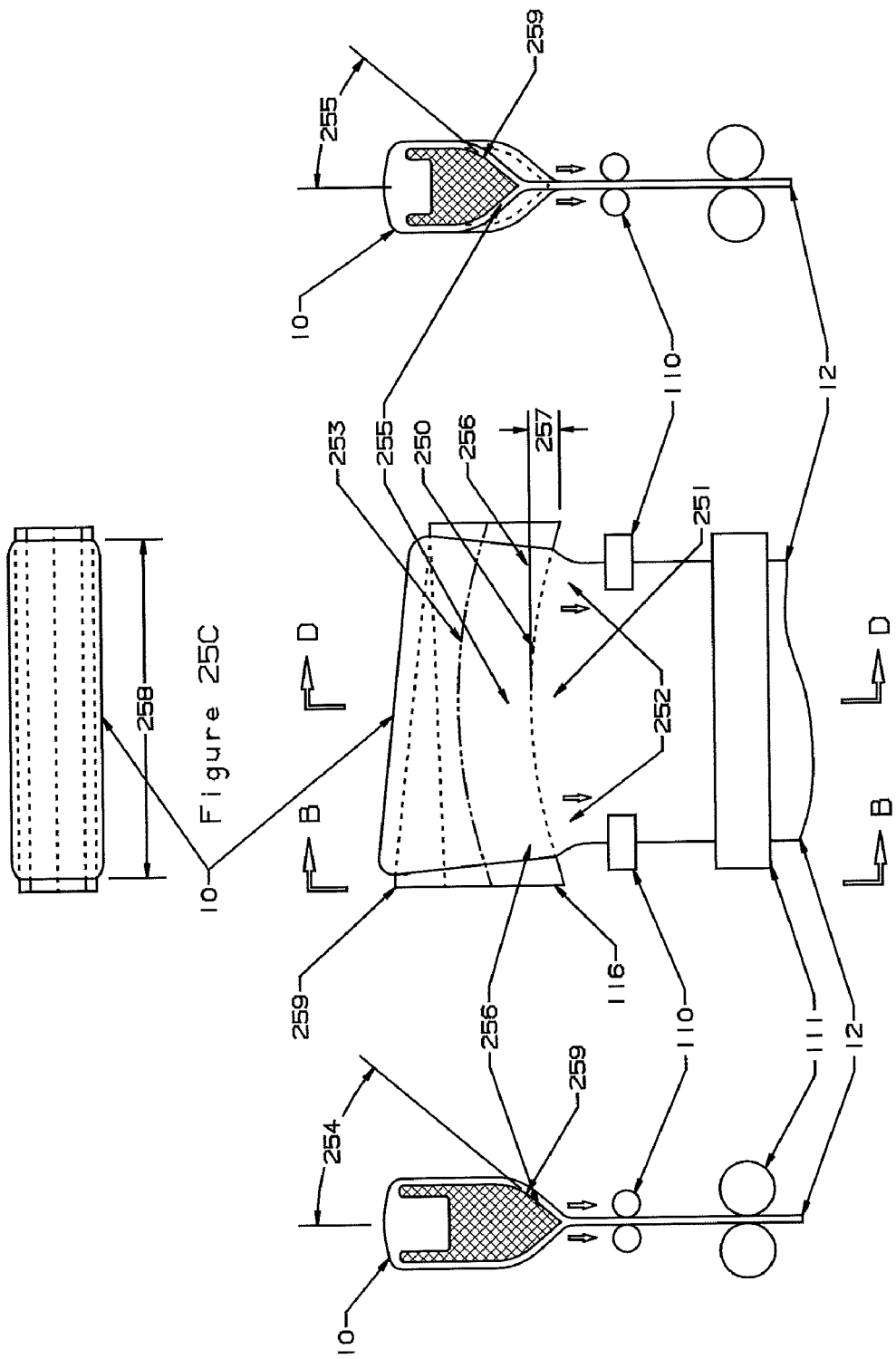

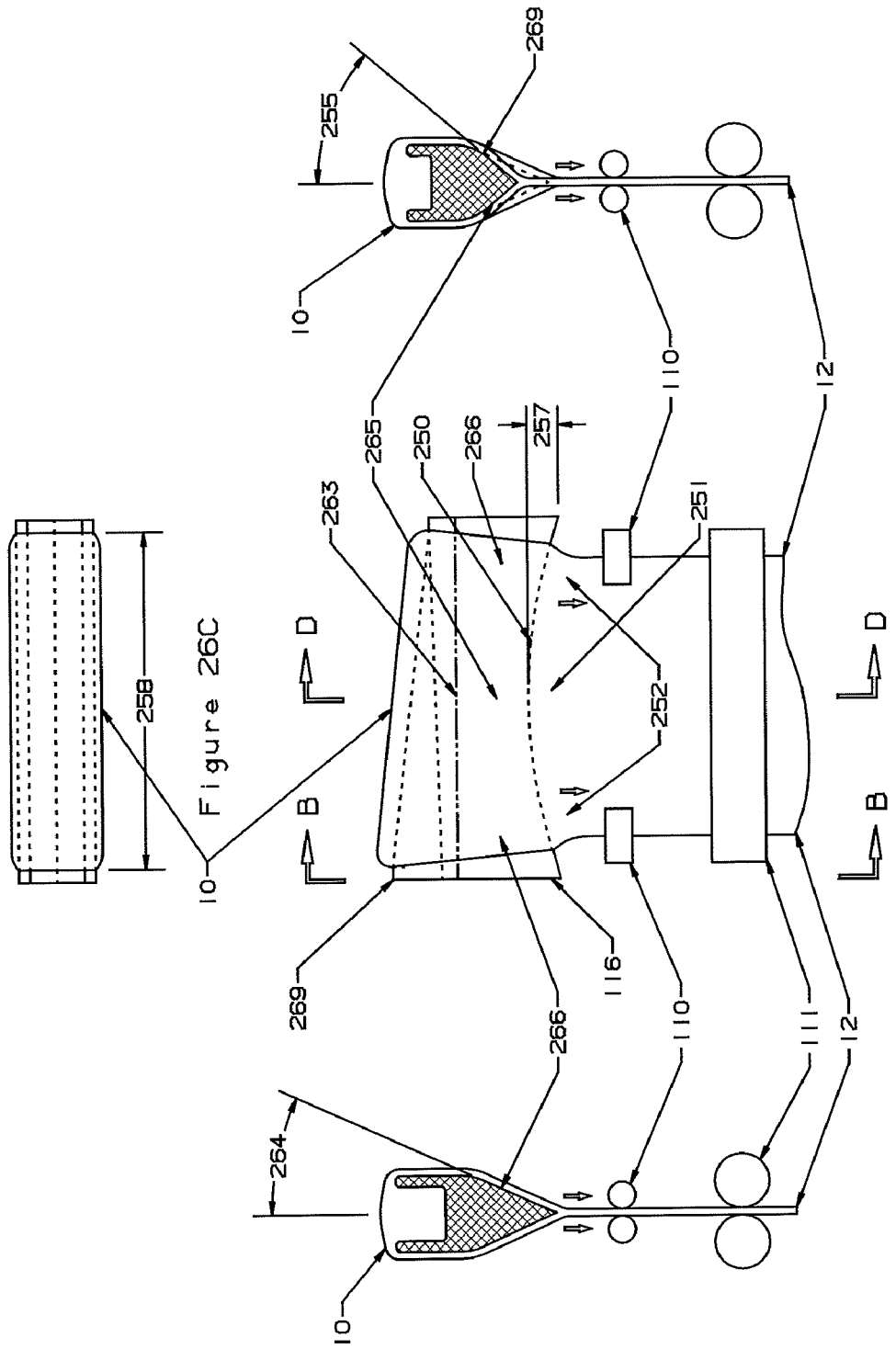

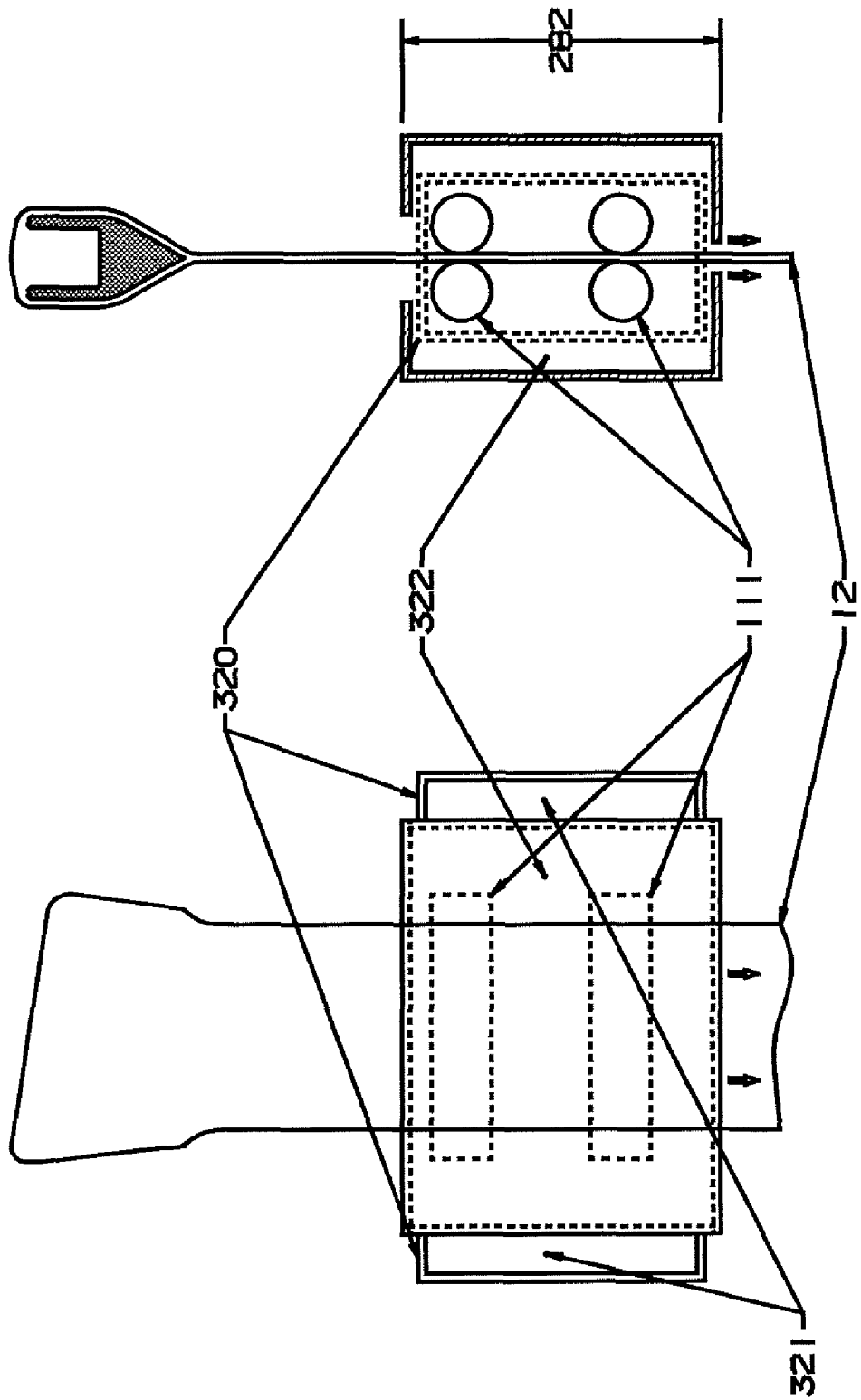

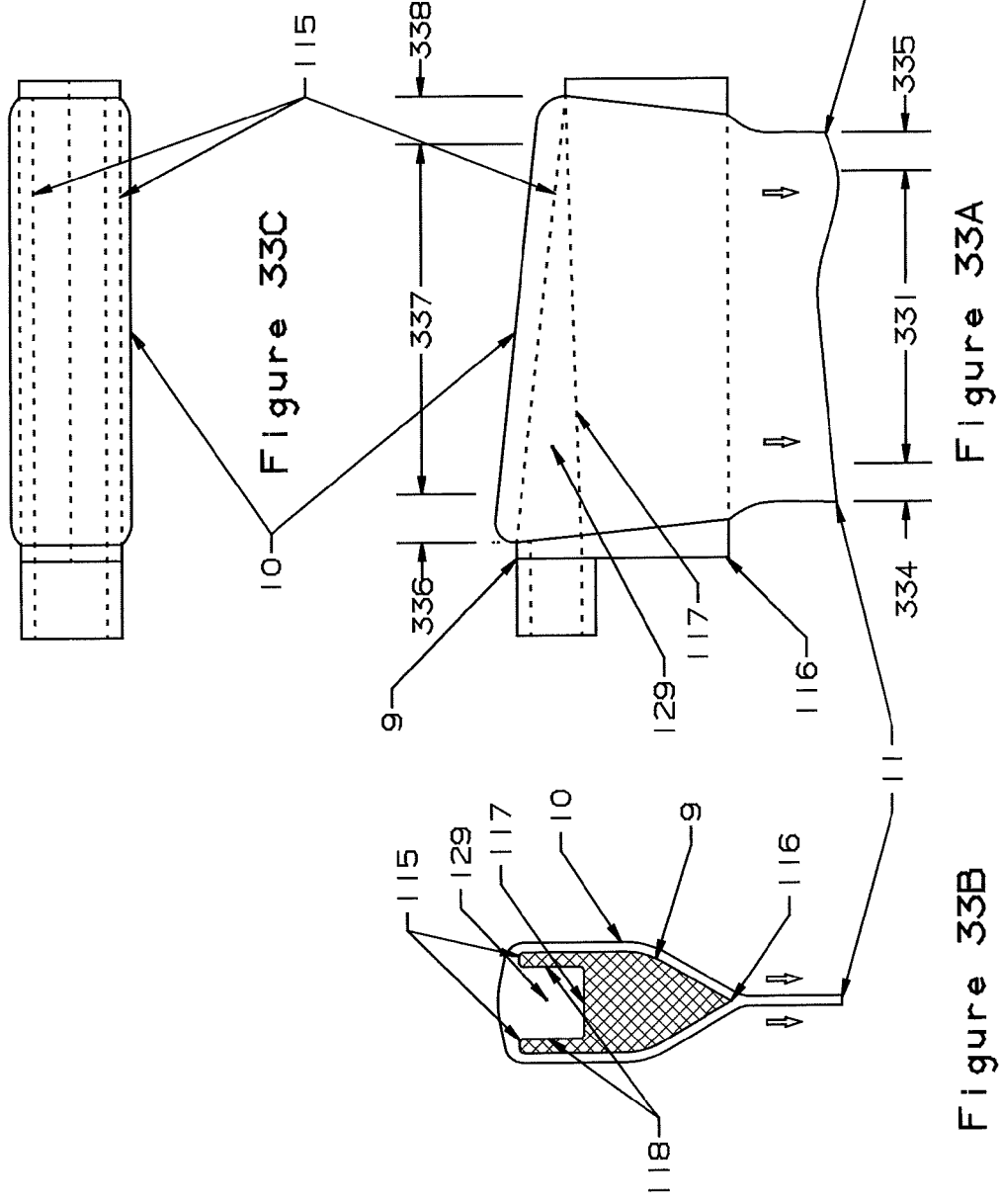

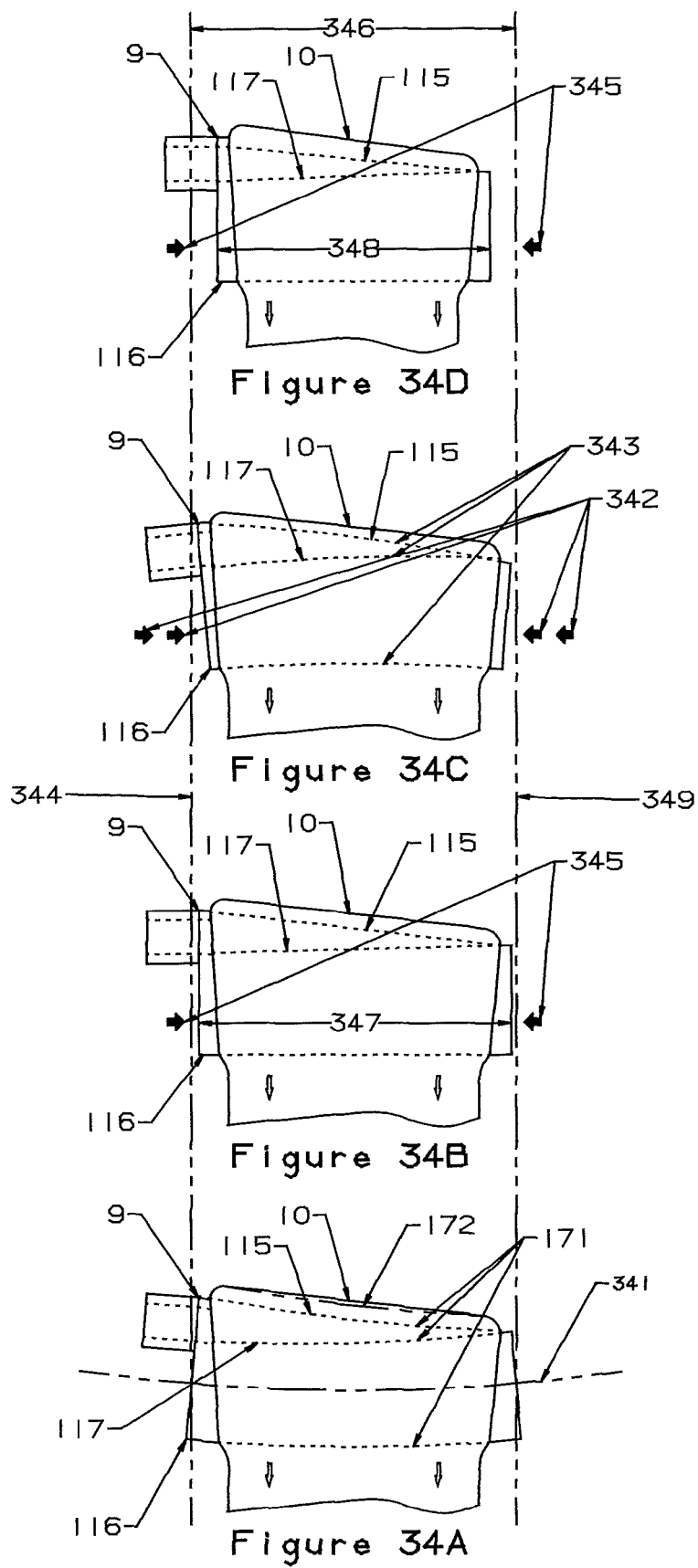

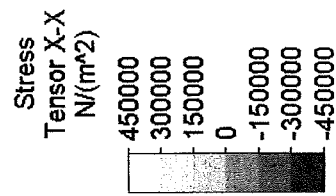
PRIOR ART
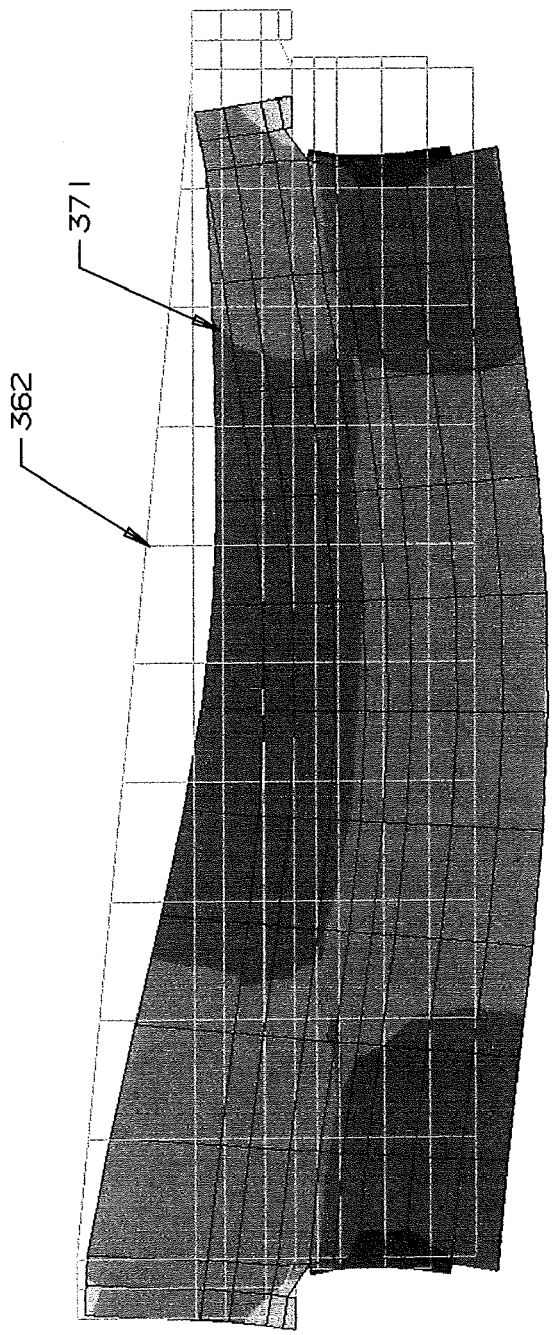
Figure 37

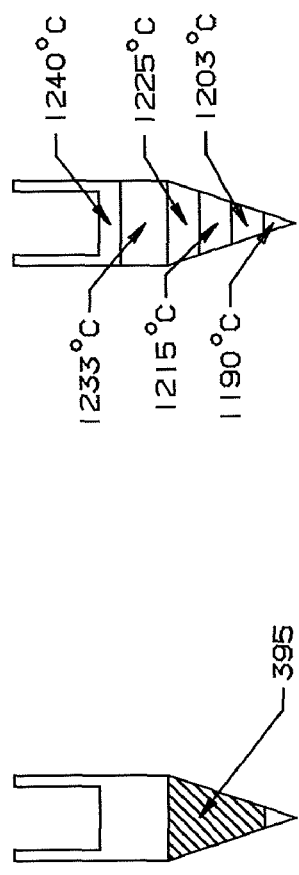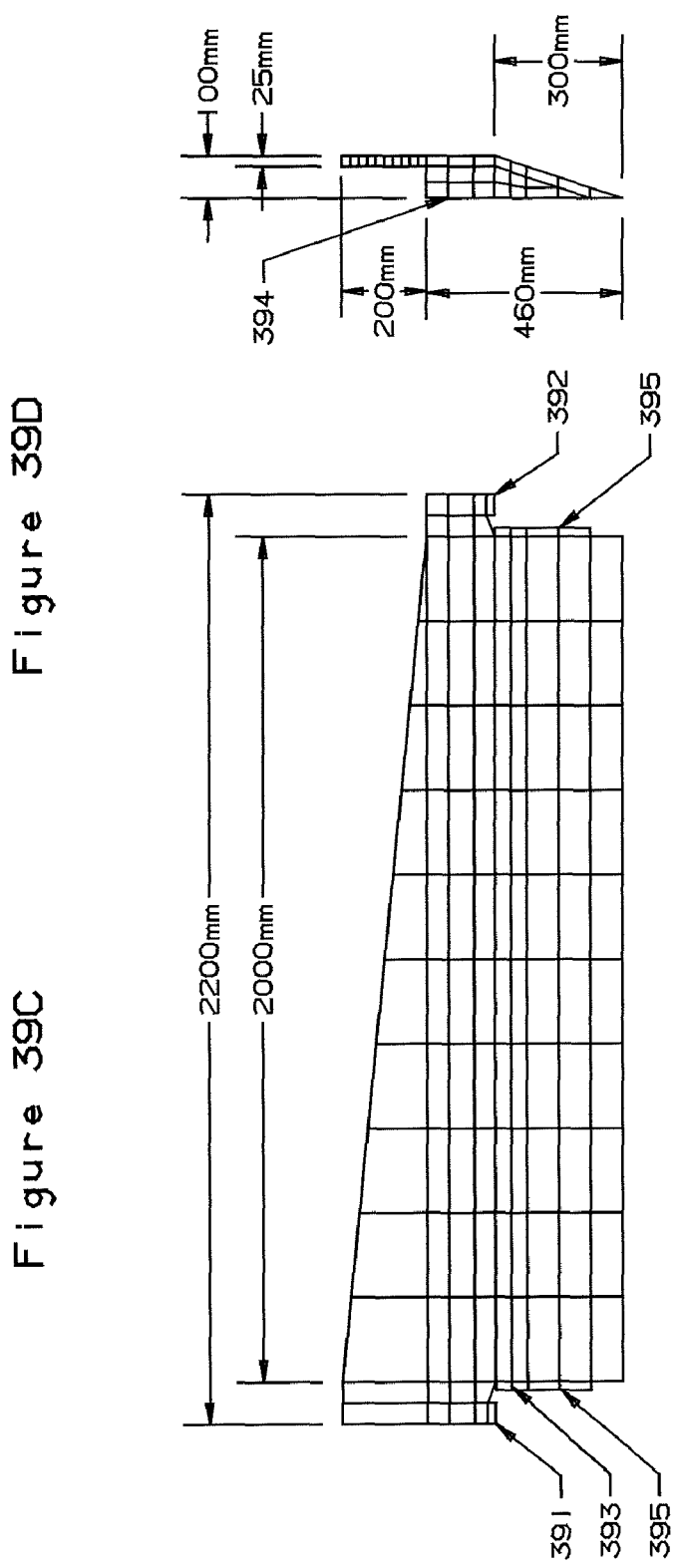

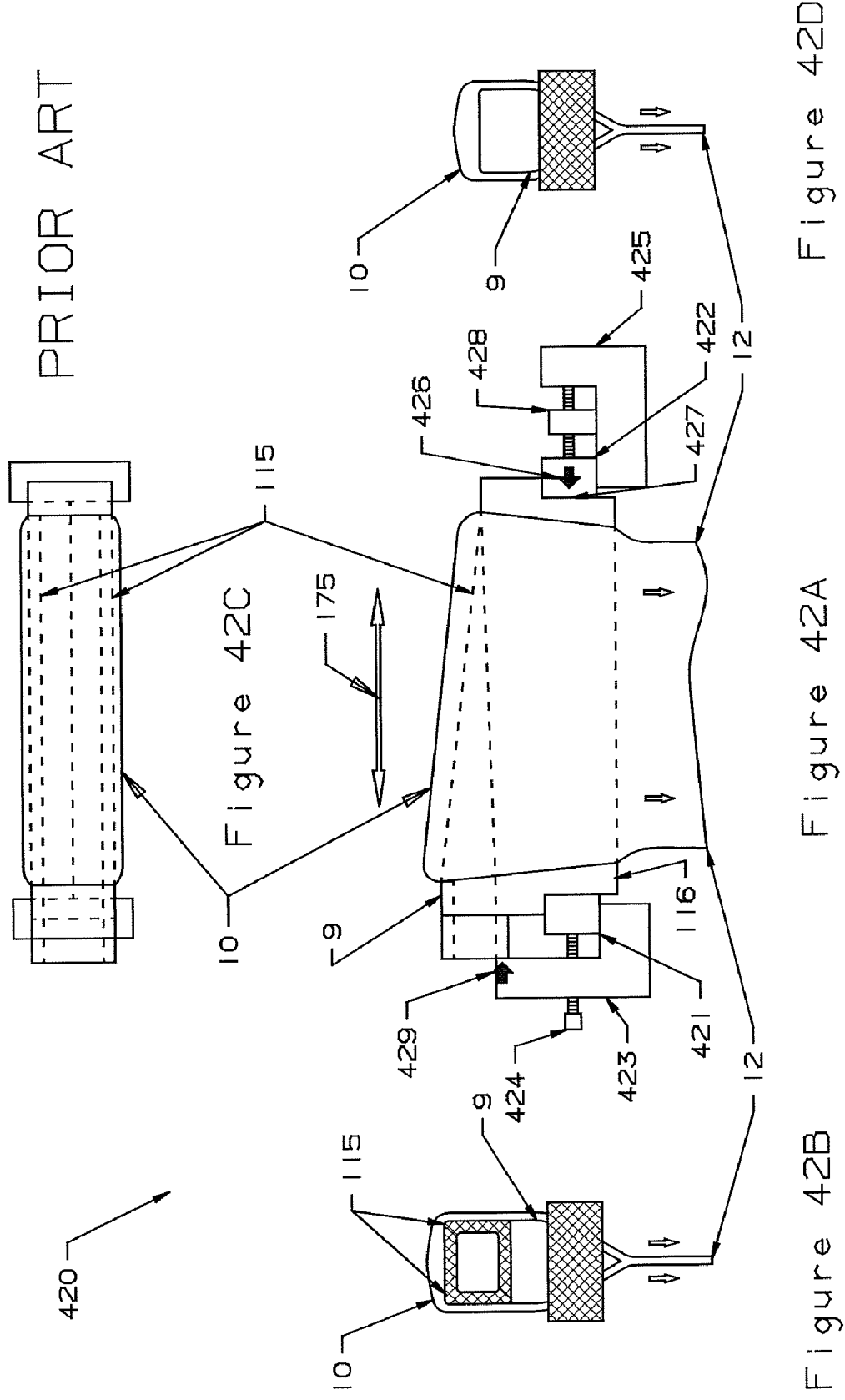

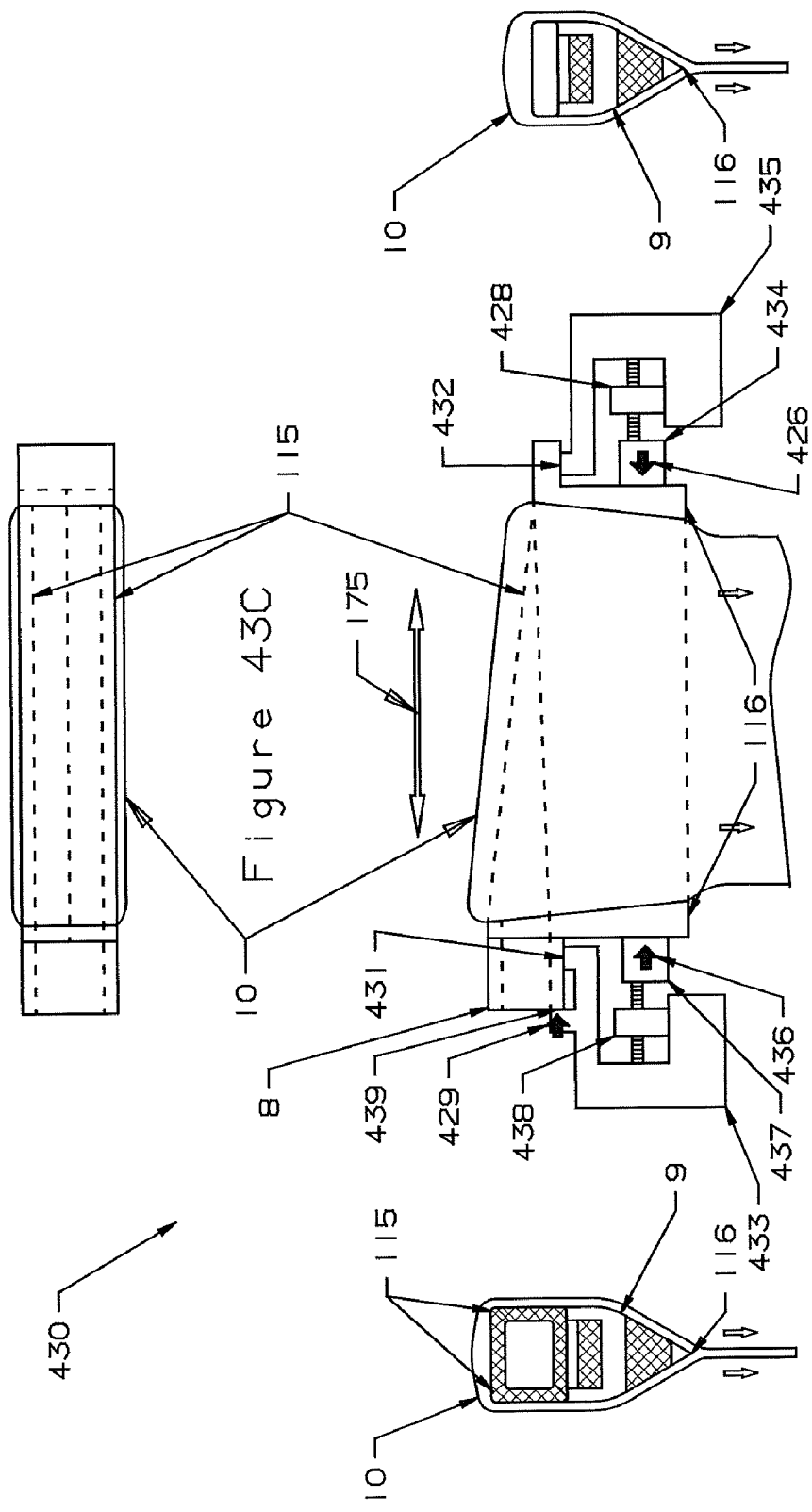

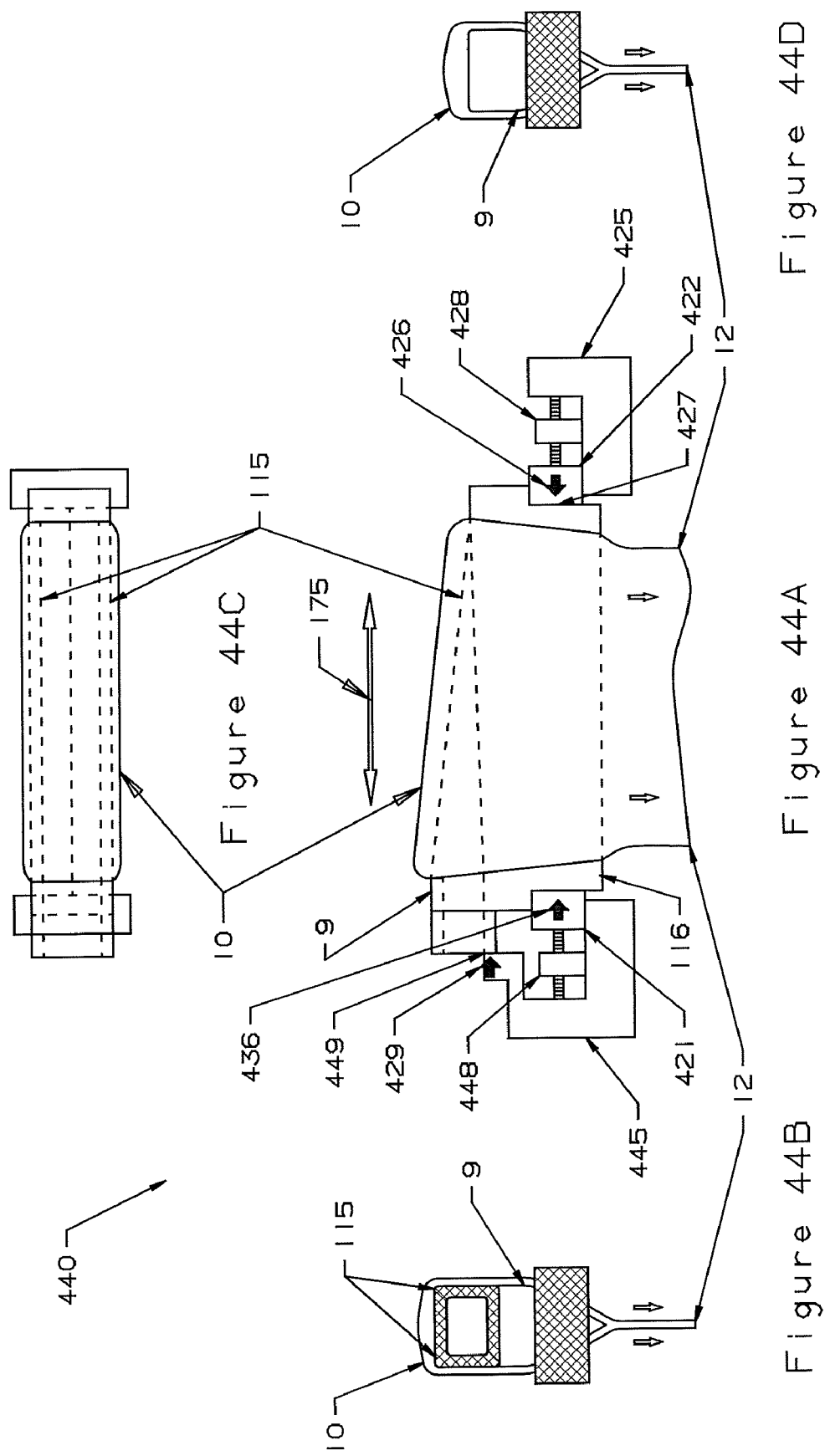

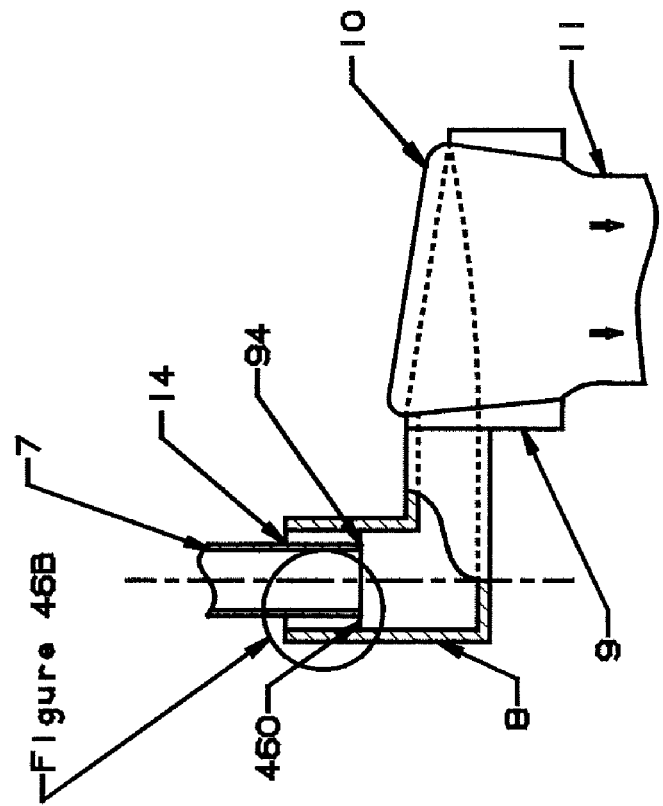
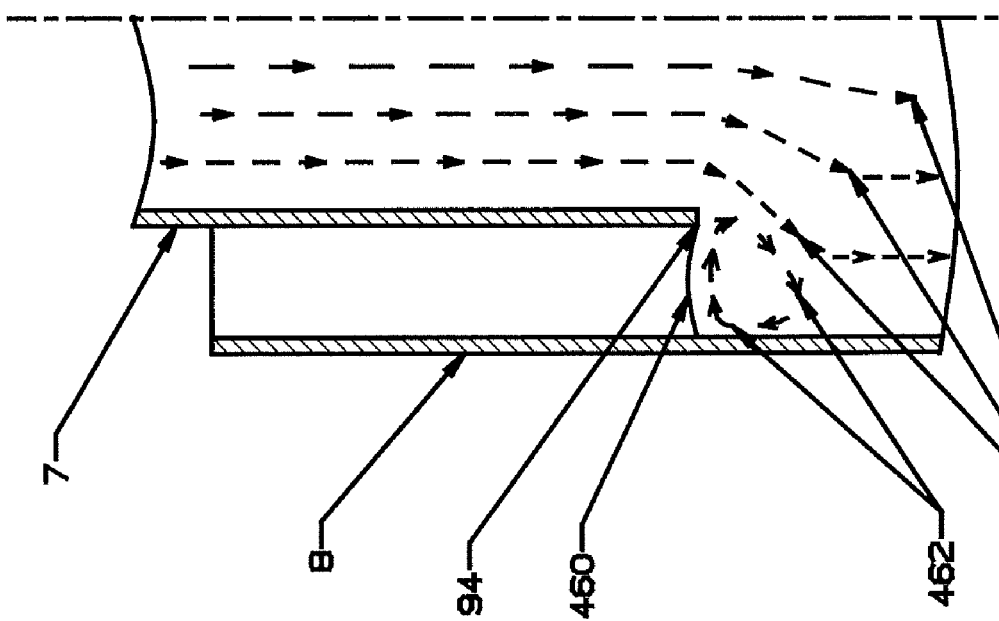
Figure 46A
Figure 46B

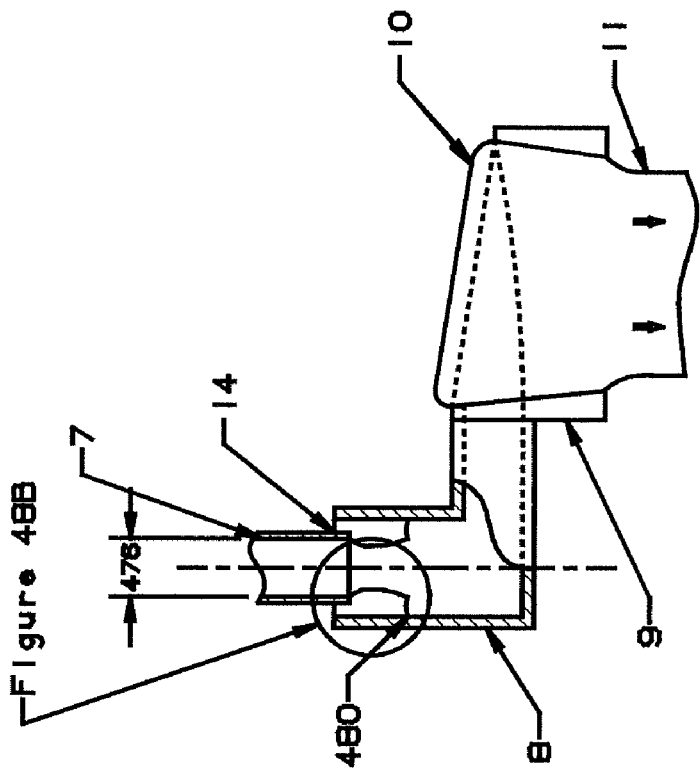
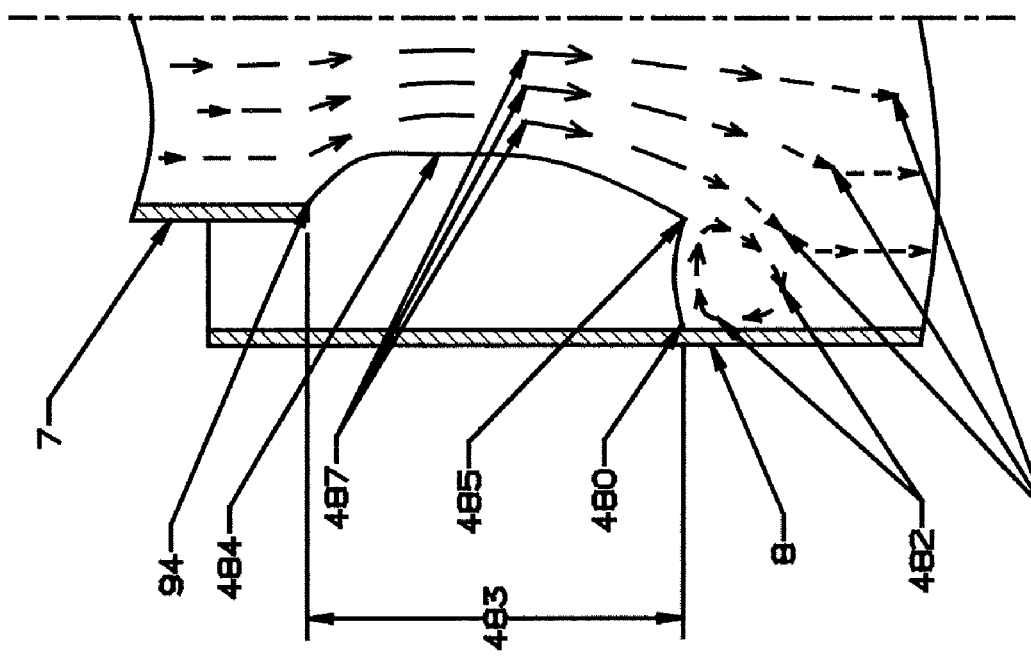

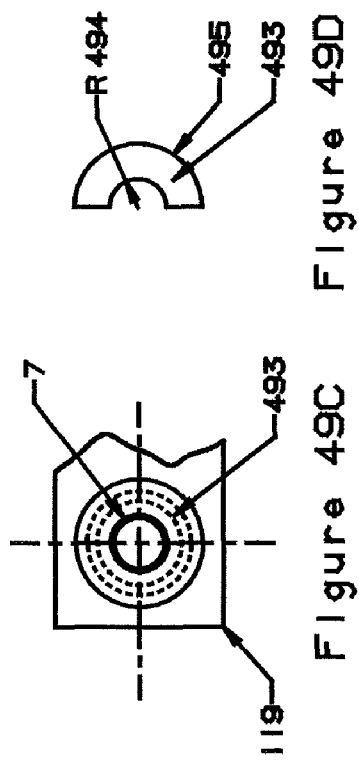
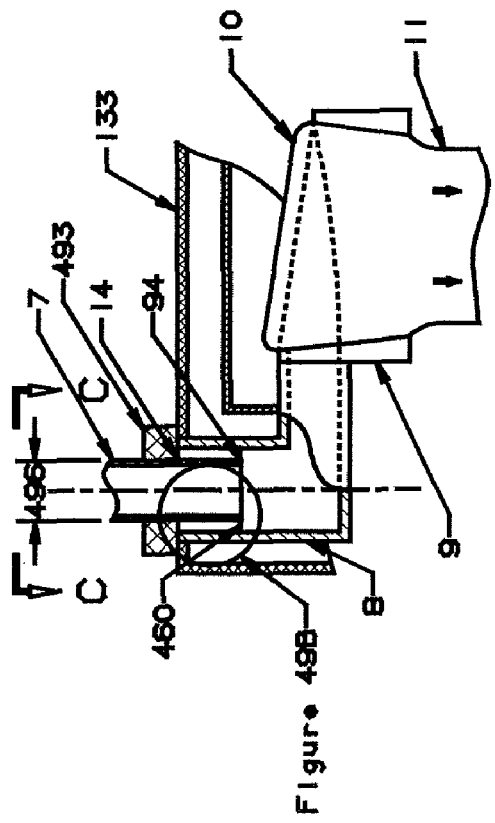
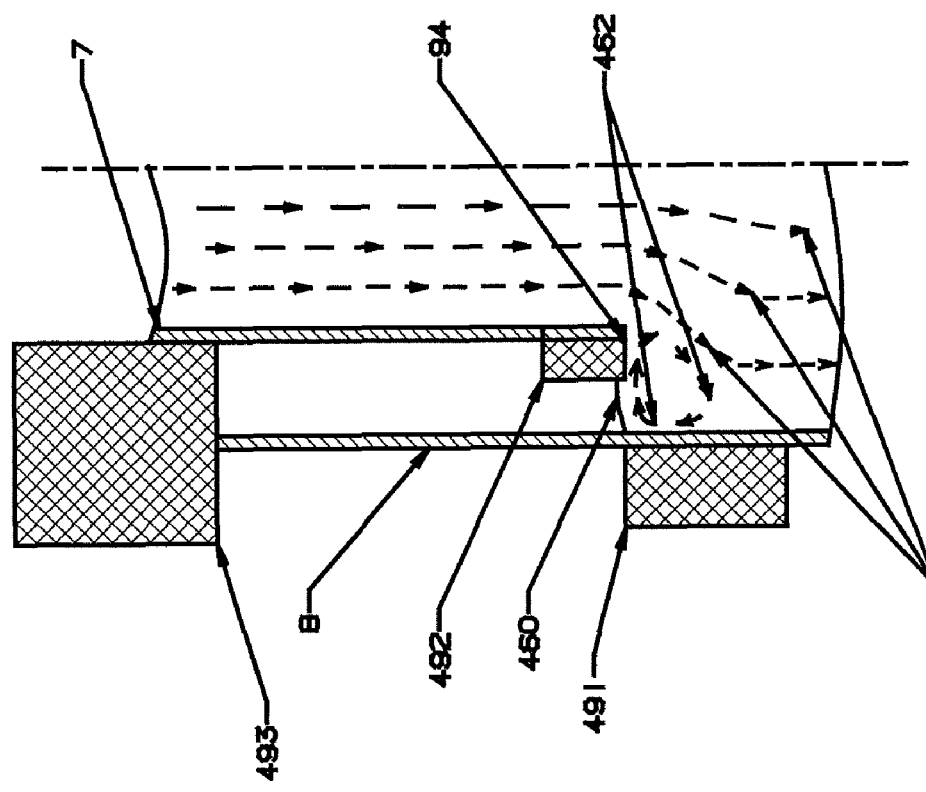

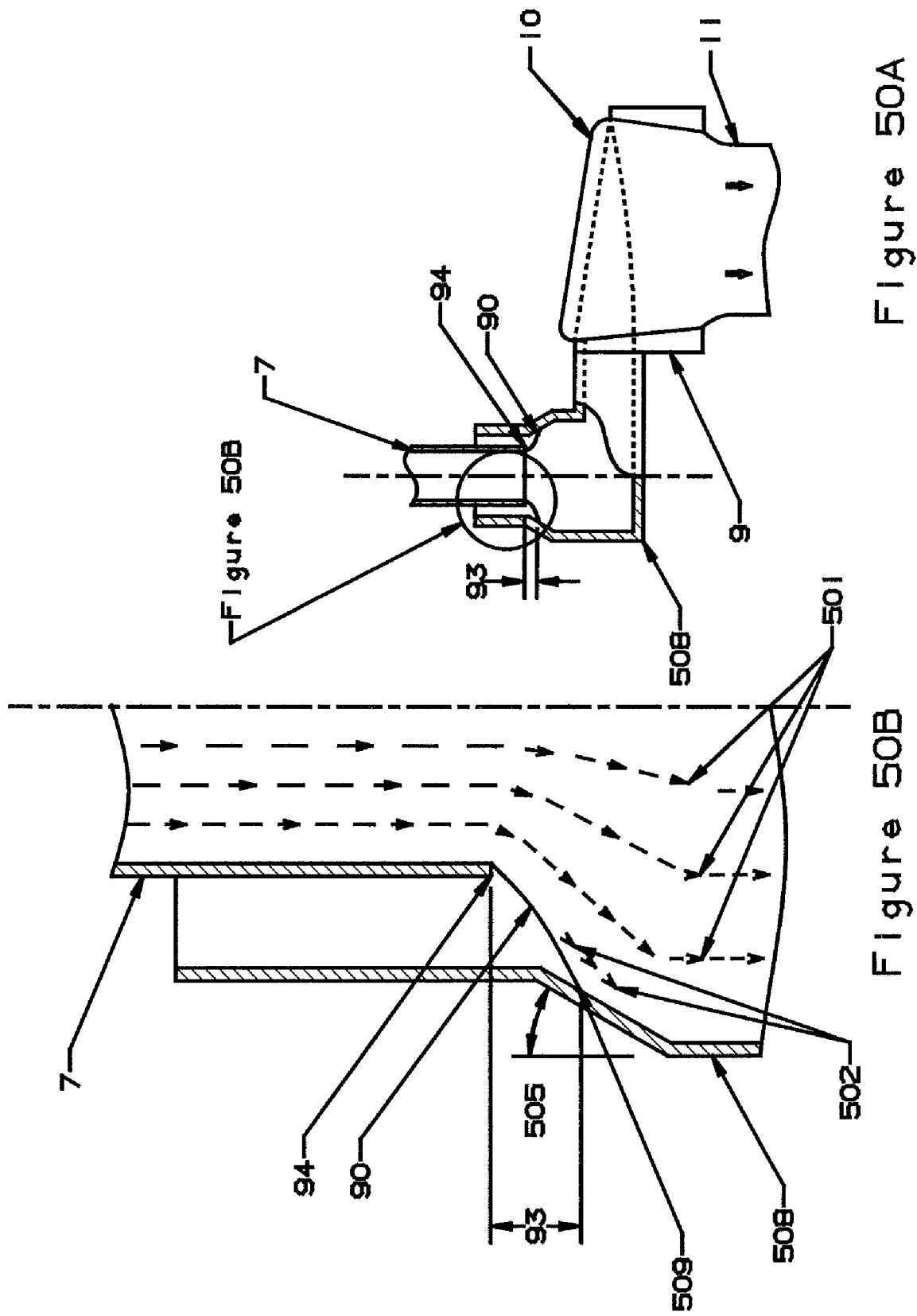

OVERFLOW DOWNDRAW GLASS FORMING METHOD AND APPARATUS

REFERENCE TO RELATED APPLICATIONS

This application claims an invention that was disclosed in Provisional Application Ser. No. 60/751,419, filed Dec. 15, 2005, entitled "OVERFLOW DOWNDRAW GLASS FORMING METHOD AND APPARATUS". The benefit under 35 USC §119(e) of the United States provisional application is hereby claimed, and the aforementioned application is hereby incorporated herein by reference.

This application is a divisional of patent application Ser. No. 11/553,198 now U.S. Pat. No. 7,681,414, filed on Oct. 26, 2006, issued Mar. 23, 2010 entitled "OVERFLOW DOWNDRAW GLASS FORMING METHOD AND APPARATUS," which, in turn, is a continuation in part of patent application Ser. No. 11/006,251 now U.S. Pat. No. 7,155,935, filed on Dec. 7, 2004, issued Jan. 2, 2007, entitled "OVERFLOW DOWNDRAW GLASS FORMING METHOD AND APPARATUS", which is a divisional application of patent application Ser. No. 10/214,904, now U.S. Pat. No. 6,889,526, filed Aug. 8, 2002, issued May 10, 2005, entitled "OVERFLOW DOWNDRAW GLASS FORMING METHOD AND APPARATUS", which claims an invention that was disclosed in one of the following provisional applications:

1) Provisional Application No. 60/310,989, filed Aug. 8, 2001, entitled "SHEET GLASS FORMING DEVICE";
2) Provisional Application No. 60/316,676, filed Aug. 31, 2001, entitled "SHEET GLASS FORMING DEVICE";
3) Provisional Application No. 60/318,726, filed Sep. 12, 2001, entitled "SHEET GLASS FORMING APPARATUS";
4) Provisional Application No. 60/318,808, filed Sep. 13, 2001, entitled "SHEET GLASS FORMING APPARATUS";
5) Provisional Application No. 60/345,464, filed Jan. 3, 2002, entitled "SHEET GLASS FORMING APPARATUS"; and
6) Provisional Application No. 60/345,465, filed Jan. 3, 2002, entitled "SHEET GLASS FORMING APPARATUS".

The benefit under 35 USC §119(e) of the United States provisional applications is hereby claimed, and the aforementioned applications and patents are hereby incorporated herein by reference.

BACKGROUND OF THE INVENTION

1. Field of the Invention

This invention relates generally to the manufacture of glass sheet and, more particularly, to glass sheet used for the production of LCD display devices that are widely used for computer displays.

2. Description of Related Art

The glass that is used for semiconductor powered display applications, and particularly for TFT/LCD display devices that are widely used for computer displays, must have very high surface quality to allow the successful application of semiconductor type material. Sheet glass made using the apparatus of U.S. Pat. No. 3,338,696, assigned to Corning, Inc., makes the highest quality glass as formed and does not require post-processing. The Corning patent makes glass by a manufacturing process termed: "The Overflow Process". Glass made using other processes requires grinding and/or polishing and thus does not have as fine a surface finish. The glass sheet must also conform to stringent thickness variation and warp specification. The fine surface finish is formed from virgin glass primarily from the center of the glass stream. This glass has not been in contact with foreign surfaces since the stirring operation.

The teachings of U.S. Pat. No. 3,338,696 are still the state of the art as practiced today. However, the apparatus has limitations.

A major drawback of the apparatus of "The Overflow Process" is that, even though it makes excellent glass over most of the surface, the surface of the glass sheet nearest the inlet is composed of glass that has flowed in proximity to the feeding pipe surfaces and therefore is subject to lower quality.

Another drawback of the apparatus of "The Overflow Process" is that, even though its makes excellent glass during stable operating conditions, it recovers from transient conditions very slowly. This is caused in part by quiescent zones of glass flow in the pipes conducting the glass from the stirring device to the apparatus when these pipes are designed using traditional practice. During unintended process transients, these quiescent zones slowly bleed glass of a previous material composition into the main process stream of glass causing defects. These defects eventually subside when the process stabilizes; however, there is a period of time where the quality of the glass sheet is substandard.

Yet another drawback of the apparatus of "The Overflow Process" is the limited means for controlling the thickness of the formed sheet. The selective cooling of the glass with respect to width as the sheet is formed is not provided in current practice. The radiant heat losses from the lower inverted slope portion of the forming structure are not controlled. This lack of control can have a significant impact on the flatness (warp) of the formed sheet.

The thickness control system of U.S. Pat. No. 3,682,609 can compensate for small thickness errors, but it can only redistribute the glass over distances on the order of 5-10 cm.

A further drawback of the apparatus of "The Overflow Process" is that surface tension and body forces have a major effect on the molten glass flow down the external sides of the forming apparatus causing the sheet to be narrower than the forming apparatus and the edges of the formed sheet to have thick beads.

U.S. Pat. No. 3,451,798 provides for edge directors which endeavor to compensate for the surface tension effects but are in reality a correction for problems created by restricting the forming apparatus cross-section to a single profile on its external surface.

Yet another drawback of the apparatus of "The Overflow Process" is that the drawing of the sheet from the bottom of the apparatus has a propensity to have a cyclic variation in sheet thickness. This cyclic thickness variation is a strong function of uncontrolled air currents, which tend to become more prevalent as the equipment ages during a production campaign. As the apparatus ages, air leaks develop through cracks in material and assorted openings caused by differential expansion.

A significant drawback of the apparatus of "The Overflow Process" is that the forming apparatus deforms during a manufacturing campaign in a manner such that the glass sheet no longer meets the thickness specification. This deformation is thermal creep of the forming apparatus caused by gravitational forces. This is a primary cause for premature termination of the production run. This deformation occurs over an extended period of time. During this time, the process is continuously changing such that process adjustments must be made to compensate for the sagging of the forming apparatus. This adjustment activity leads to loss of salable product.

Therefore, there is a need in the art for an apparatus which overcomes the shortcomings of the prior art.

SUMMARY OF THE INVENTION

In a preferred embodiment of the present invention, all the glass that forms the surface of the useful area of the sheet is virgin glass, which is not contaminated by flow in proximity to a refractory or refractory metal surface after the stirring operation. In addition, this embodiment significantly reduces inhomogeneities in the glass that forms the sheet by eliminating the regions of quiescent flow in the piping between the stirring device and the sheet glass forming apparatus.

In another preferred embodiment, this invention introduces a precise thermal control system to redistribute the flow of molten glass at the weirs which is the most critical area of the forming process. This thermal control effectively counteracts the degradation of the sheet forming apparatus which inevitably occurs during a production campaign.

In another embodiment the radiant heat loss from the bottom of the inverted slope of the forming structure is longitudinally adjusted by varying the width of the exit opening of the forming chamber.

Another preferred embodiment creates a variable external cross-section which alters the direction and magnitude of the surface tension and body force stresses and thus, reduces the adverse influence of surface tension and body forces on sheet width.

In an alternative preferred embodiment, the glass is preferentially cooled across its width to create forming stresses during solidification, which ensures that the glass sheet drawn is inherently flat.

In a further preferred embodiment, this invention adjusts the internal pressure in each of the major components of the forming apparatus such that the pressure difference across any leakage path to the forming zone approaches zero. Therefore, air leakage in the apparatus is minimized even though cracks and openings exist during initial operation and develop during manufacturing.

In yet another preferred embodiment, the invention introduces a counteracting force to the stresses caused by gravitational forces on the forming structure in a manner such that the thermal creep deformation (strain) that results from thermal creep has a minimum effect on the thickness variation of the glass sheet.

BRIEF DESCRIPTION OF THE DRAWINGS

FIG. 1 illustrates the principle parts of "The Overflow Process" glass sheet manufacturing system.

FIG. 3A shows a side view of a surface flow distribution device in a preferred embodiment of the present invention.

FIG. 3B shows a top view of a surface flow distribution device in a preferred embodiment of the present invention.

FIG. 4A shows a side view of a submerged flow distribution device in a preferred embodiment of the present invention.

FIG. 4B shows a top view of a submerged flow distribution device in a preferred embodiment of the present invention.

FIG. 5A shows a side view of "The Overflow Process" in an embodiment of the present invention.

FIG. 5B shows the glass flow in the downcomer pipe across lines B-B of FIG. 5A when a flow distribution device is used.

FIG. 5C shows a cross-section across lines C-C of FIG. 5A, where the glass flow in the downcomer pipe appears in the sheet when a flow distribution device is used.

FIG. 7A shows the top view of a bowl with side inflow which relocates the quiescent flow zone from the bowl nose to the bowl side in a preferred embodiment of the present invention.

FIG. 7B shows a side view of FIG. 7A.

FIG. 7C shows the top view of a bowl with side inflow which relocates the quiescent flow zone from the bowl nose to a location approximately 45 degrees to the side with respect to the centerline of the forming apparatus in a preferred embodiment of the present invention.

FIG. 7D shows a side view of FIG. 7C.

FIG. 8 illustrates a bowl in "The Overflow Process" as known in the prior art.

FIG. 9A shows a downcomer pipe feeding the forming apparatus inlet with minimum quiescent flow in a preferred embodiment of the present invention.

FIG. 9B shows a top view of FIG. 9A.

FIG. 9C shows a detail of the downcomer pipe to trough inlet pipe connection showing the glass flow pattern in a preferred embodiment of the present invention.

FIG. 10A shows the flow between the downcomer pipe and the forming apparatus inlet in "The Overflow Process" as known in the prior art.

FIG. 10B shows a top view of FIG. 10A.

FIG. 10C shows a detail of the downcomer pipe to trough inlet pipe connection showing the glass flow pattern as known in the prior art.

FIG. 12A illustrates a side view of the glass flowing through the forming structure.

FIG. 12B shows a section through the center of the forming structure of FIG. 12A showing the cooling zones.

FIG. 15A shows a muffle with multiple heating chambers in a preferred embodiment of the invention.

FIG. 15B shows a section of FIG. 15A.

FIG. 16A shows radiant coolers which affect localized cooling to the molten glass as it passes over the weirs in a preferred embodiment of the invention.

FIG. 16B shows a section of FIG. 16A.

FIG. 17A illustrates how the prior art forming structure design deforms as a result of thermal creep.

FIG. 17B shows another view of FIG. 17A.

FIG. 18A shows the forming structure support system as known in the prior art.

FIG. 18B shows another view of FIG. 18A.

FIG. 18C shows another view of FIG. 18A.

FIG. 18D shows another view of FIG. 18A.

FIG. 20A shows a single shaped compression block on one end of the forming structure and multiple shaped compression blocks on the other end in a preferred embodiment of the present invention.

FIG. 20B shows another view of FIG. 20A.

FIG. 20C shows another view of FIG. 20A.

FIG. 20D shows another view of FIG. 20A.

FIG. 22A shows a reduced inverted slope at each end of the forming structure in a preferred embodiment of the present invention.

FIG. 22B shows a top view of FIG. 22A.

FIG. 22C shows a cross-section of the forming structure design shown in FIG. 22A across lines C-C.

FIG. 22D shows a cross-section of the forming structure design shown in FIG. 22A across lines D-D.

FIG. 22E shows a cross-section of the forming structure design shown in FIG. 22A across lines E-E.

FIG. 22F shows a cross-section of the forming structure design shown in FIG. 22A across lines F-F.

FIG. 22G shows a cross-section of the forming structure design shown in FIG. 22A across lines G-G.

FIG. 23A shows an alternate embodiment of the present invention with further modified ends.

FIG. 23B shows a top view of FIG. 23A.

FIG. 23C shows a cross-section of the forming structure design shown in FIG. 23A across lines C-C.

FIG. 23D shows a cross-section of the forming structure design shown in FIG. 23A across lines D-D.

FIG. 23E shows a cross-section of the forming structure design shown in FIG. 23A across lines E-E.

FIG. 23F shows a cross-section of the forming structure design shown in FIG. 23A across lines F-F.

FIG. 23G shows a cross-section of the forming structure design shown in FIG. 23A across lines G-G.

FIG. 25A shows a forming structure with a continuously curved parabolically shaped convex upward root with constant inverted slope angle which solidifies the center glass before the edge glass in a preferred embodiment of the present invention.

FIG. 25B shows an end view through section B-B of FIG. 25A.

FIG. 25C shows a top view of FIG. 25A.

FIG. 25D shows a section view through section D-D of FIG. 25A.

FIG. 26A shows a forming structure with a continuously curved parabolically shaped convex upward root with variable inverted slope angle which solidifies the center glass before the edge glass in a preferred embodiment of the present invention.

FIG. 26B shows an end view through section B-B of FIG. 26A.

FIG. 26C shows a top view of FIG. 26A.

FIG. 26D shows a section view through section D-D of FIG. 26A.

FIG. 32A shows how the pressure in the annealer and pulling machine zone may be controlled to minimize leakage in a preferred embodiment of the present invention.

FIG. 32B shows a section of FIG. 32A.

FIG. 33A is a side view of glass flowing in and over the forming structure of the overflow process.

FIG. 33B is an inflow end view of the glass and forming structure shown in FIG. 33A.

FIG. 33C is a far end view of the glass and forming structure shown in FIG. 33A.

FIG. 33D is a top view of the glass and forming structure shown in FIG. 33A.

FIG. 34A is an illustration of the thermal creep deformation of the glass forming structure under the load of its own weight.

FIG. 34B is an illustration of the thermal creep deformation of the glass forming structure under an applied load that minimizes vertical deformation.

FIG. 34C is an illustration of the thermal creep deformation of the glass forming structure under excessive applied load.

FIG. 34D is an illustration of the thermal creep deformation of the glass forming structure under an applied load that minimizes vertical deformation over the extended period of a production campaign.

FIG. 37 shows the deformation of the prior art linear FEA of the forming structure deformation with corrective forces per U.S. Pat. No. 3,519,411.

FIG. 39A is a side view of the grid, with dimensions in the metric system, used in the FEA.

FIG. 39B is an end view of the grid, with dimensions in the metric system, used in the FEA.

FIG. 39C is an end view of the forming structure showing where the force was applied to the bottom portion of the forming structure in the FEA.

FIG. 39D shows the assumed temperature distribution of the cross-section of the forming structure.

FIG. 42A illustrates the prior art glass forming structure support and compression system.

FIG. 42B shows a sectional view of FIG. 42A.

FIG. 42C shows a partial view of FIG. 42A.

FIG. 42D shows a sectional view of FIG. 42A.

FIG. 43A shows a forming structure support system involving support blocks for the weight of the forming structure at each end and individual compression blocks and force applicators at each end.

FIG. 43B shows a sectional view of FIG. 43A.

FIG. 43C shows a partial view of FIG. 43A.

FIG. 43D shows a sectional view of FIG. 43A.

FIG. 44A shows a forming structure support system involving support and compression blocks and force applicators at each end.

FIG. 44B shows a sectional view of FIG. 44A.

FIG. 44C shows a partial view of FIG. 44A.

FIG. 44D shows a sectional view of FIG. 44A.

FIG. 45A shows a forming structure support system involving support and compression blocks, force applicators at each end, and a sealing force applicator at the far end.

Figures 45A, 45B, 45C, 45D:
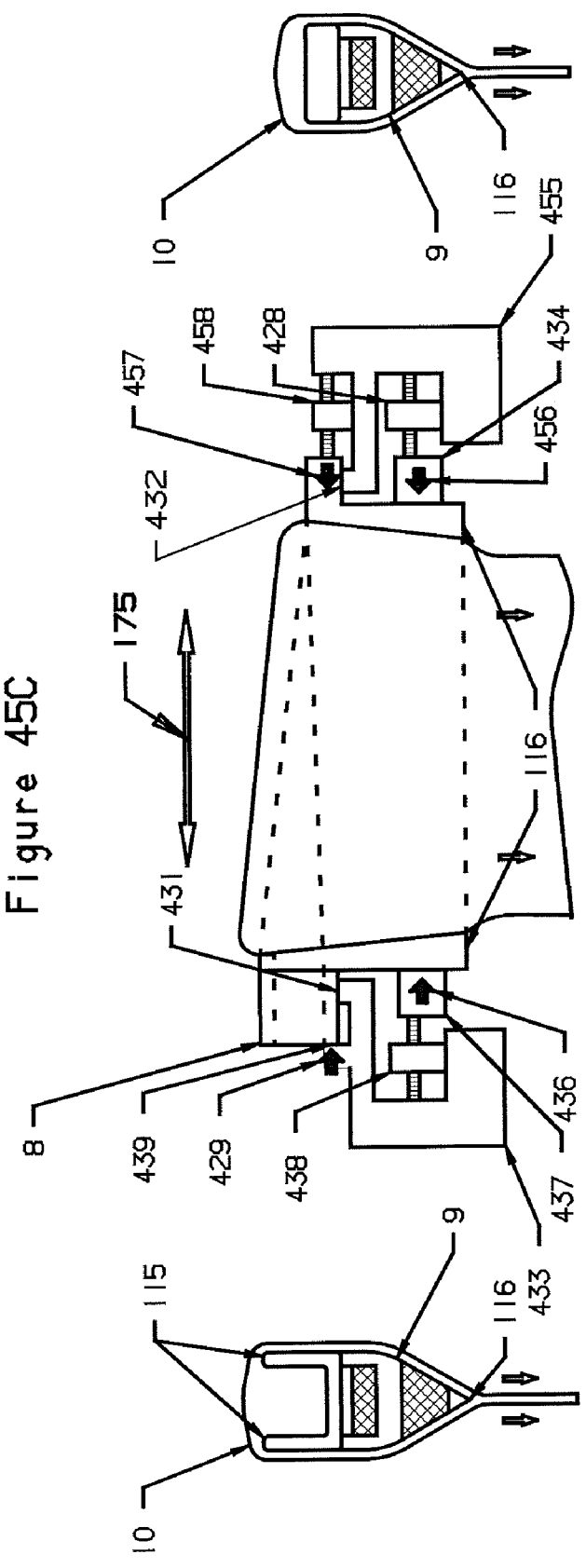

FIG. 45B shows a sectional view of FIG. 45A.

FIG. 45C shows a partial view of FIG. 45A.

FIG. 45D shows a sectional view of FIG. 45A.

FIG. 46A is a section through the downcomer pipe to the inlet pipe junction where the downcomer pipe is immersed below the glass free surface.

FIG. 46B is a detail of the glass flow in a section of FIG. 46A.

Figure 47A:
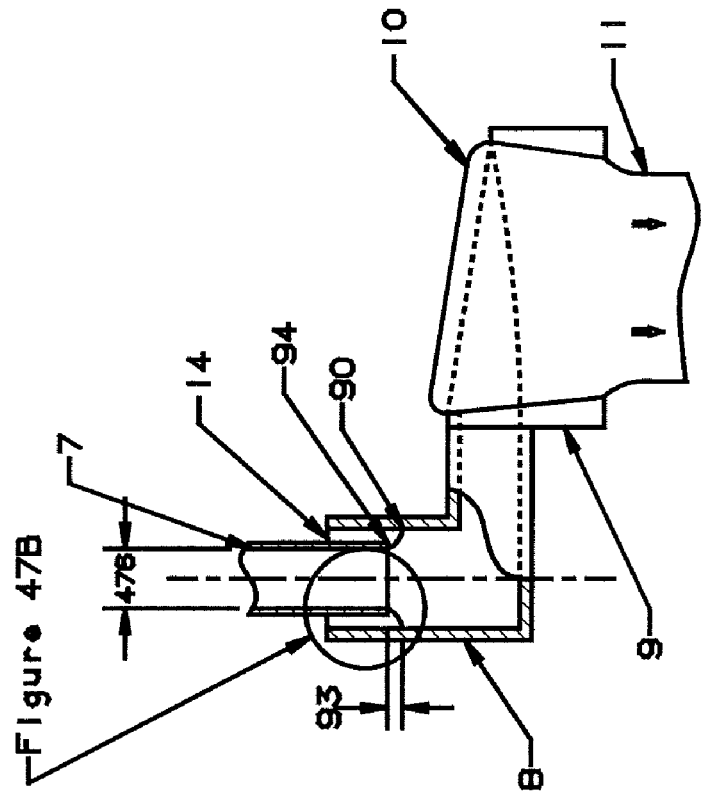

FIG. 47A is a section through the downcomer pipe to the inlet pipe junction where the downcomer pipe is substantially above the glass free surface.

Figure 47B:
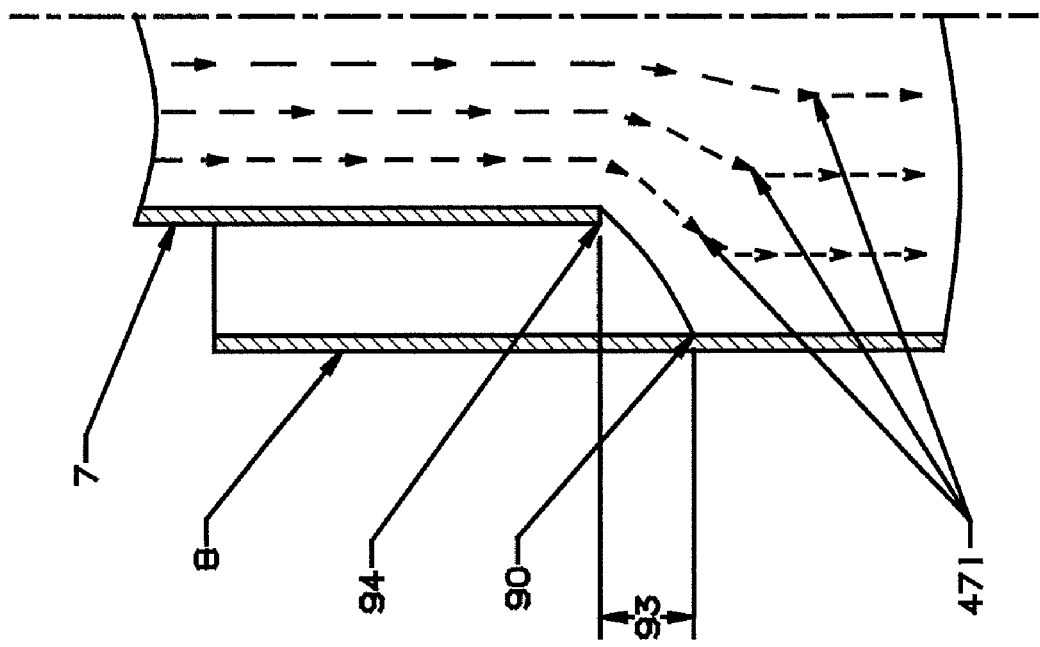

FIG. 47B is a detail of the glass flow in a section of FIG. 47A.

FIG. 48A is a section through the downcomer pipe to inlet pipe junction where the downcomer pipe is the same distance as the diameter of the inlet pipe above the glass free surface.

FIG. 48B is a detail of the glass flow in a section of FIG. 48A.

FIG. 49A shows heaters at the downcomer pipe to the inlet pipe junction.

FIG. 49B is a detail of the glass flow in a section of FIG. 49A.

FIG. 49C is a partial top view of FIG. 49A.

FIG. 49D is a detail of a typical sealing block as used in FIGS. 49A, 49B, and 49C.

FIG. 50A is a section through the downcomer pipe to the inlet pipe junction where a conical section is added to the inlet pipe.

FIG. 50B is a detail of the glass flow in a section of FIG. 50A.

Figure 51:
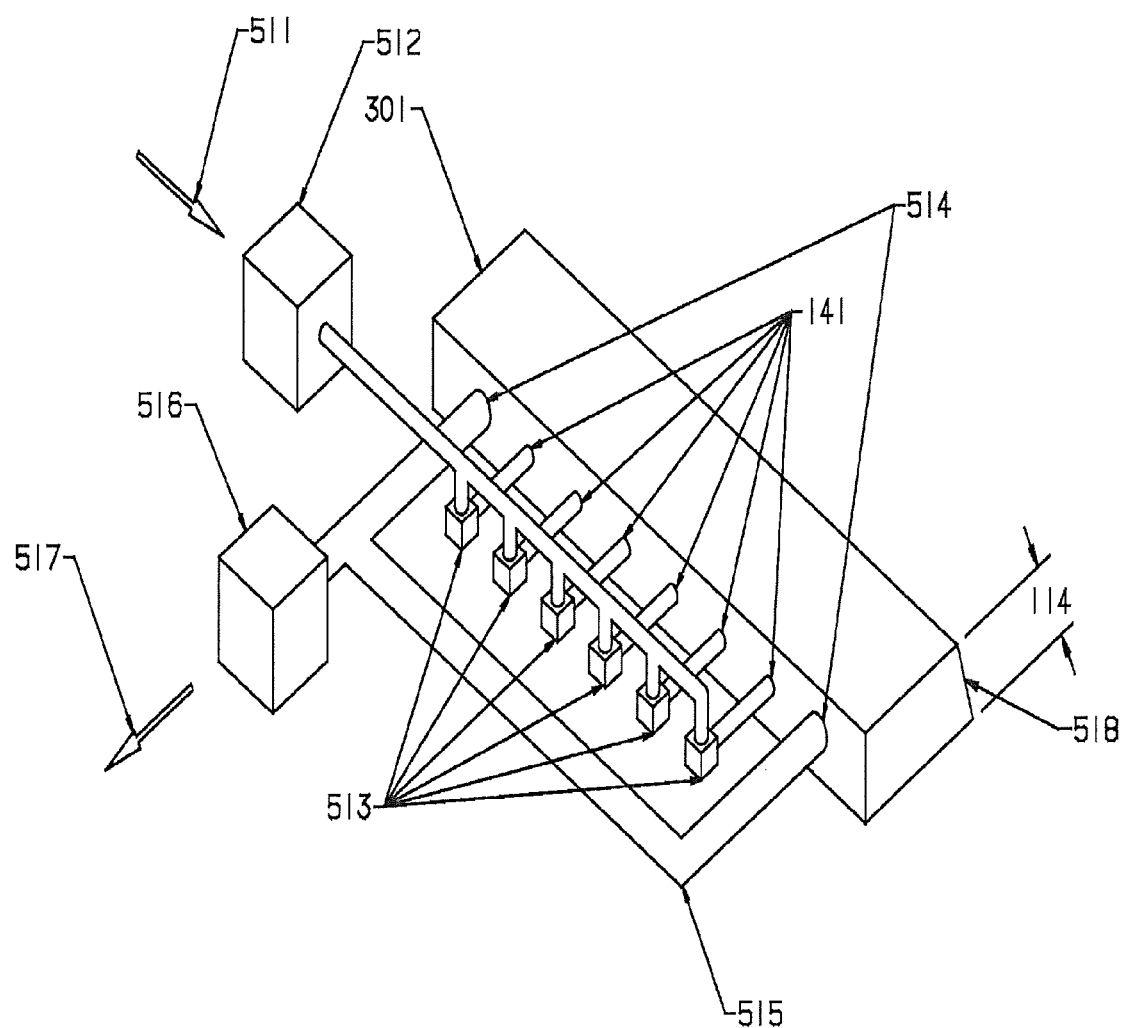

FIG. 51 shows a device that precisely controls the cooling air mass flow into and out of the muffle door chamber to minimize the leakage from the muffle doors in an embodiment of the present invention.

Figure 52:
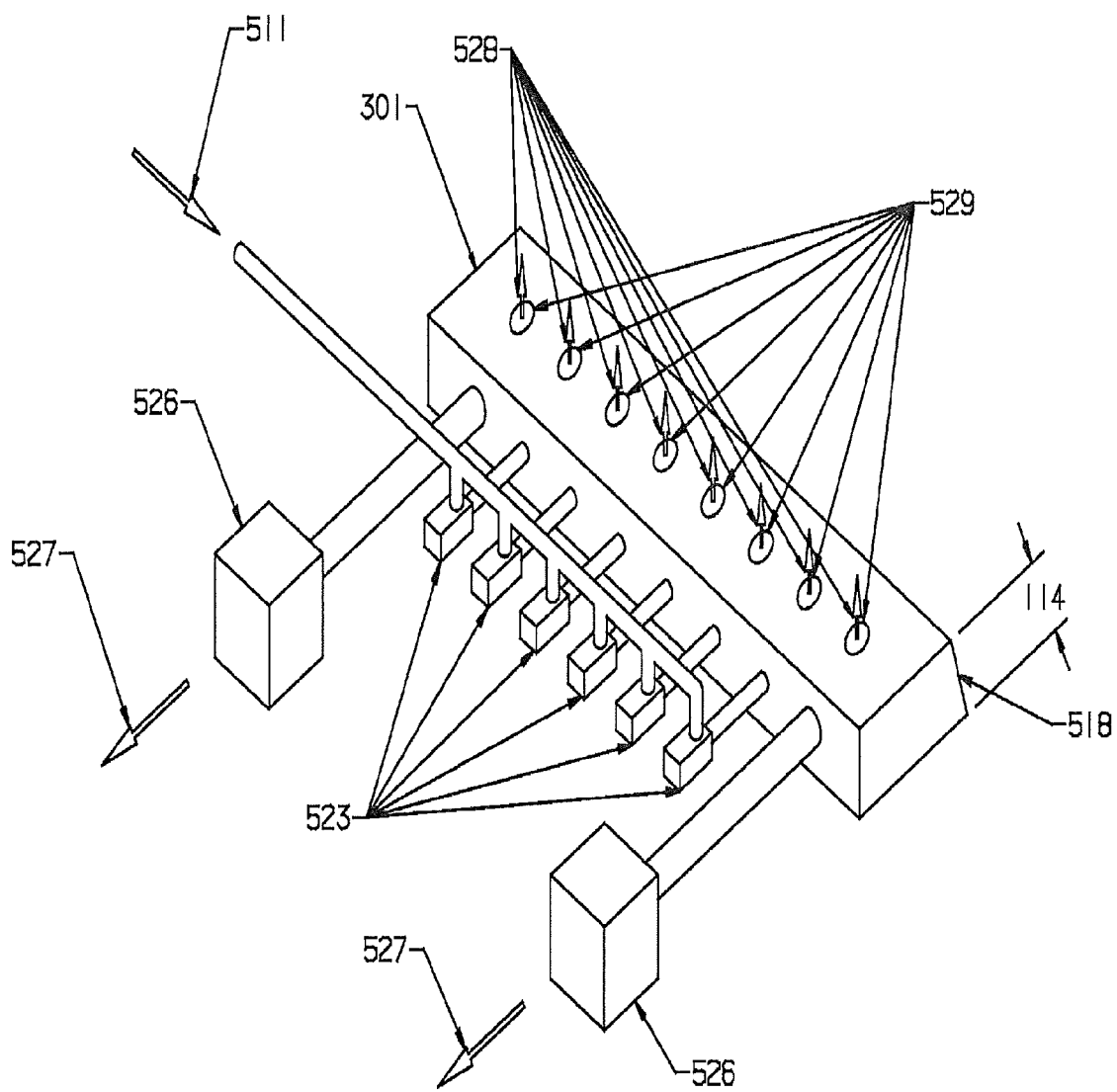

FIG. 52 shows a device that controls the forced convective cooling of the glass flowing off the sheet forming structure by precisely controlling the cooling air mass flow into and out of the muffle door chamber in an embodiment of the present invention.

Figure 53:
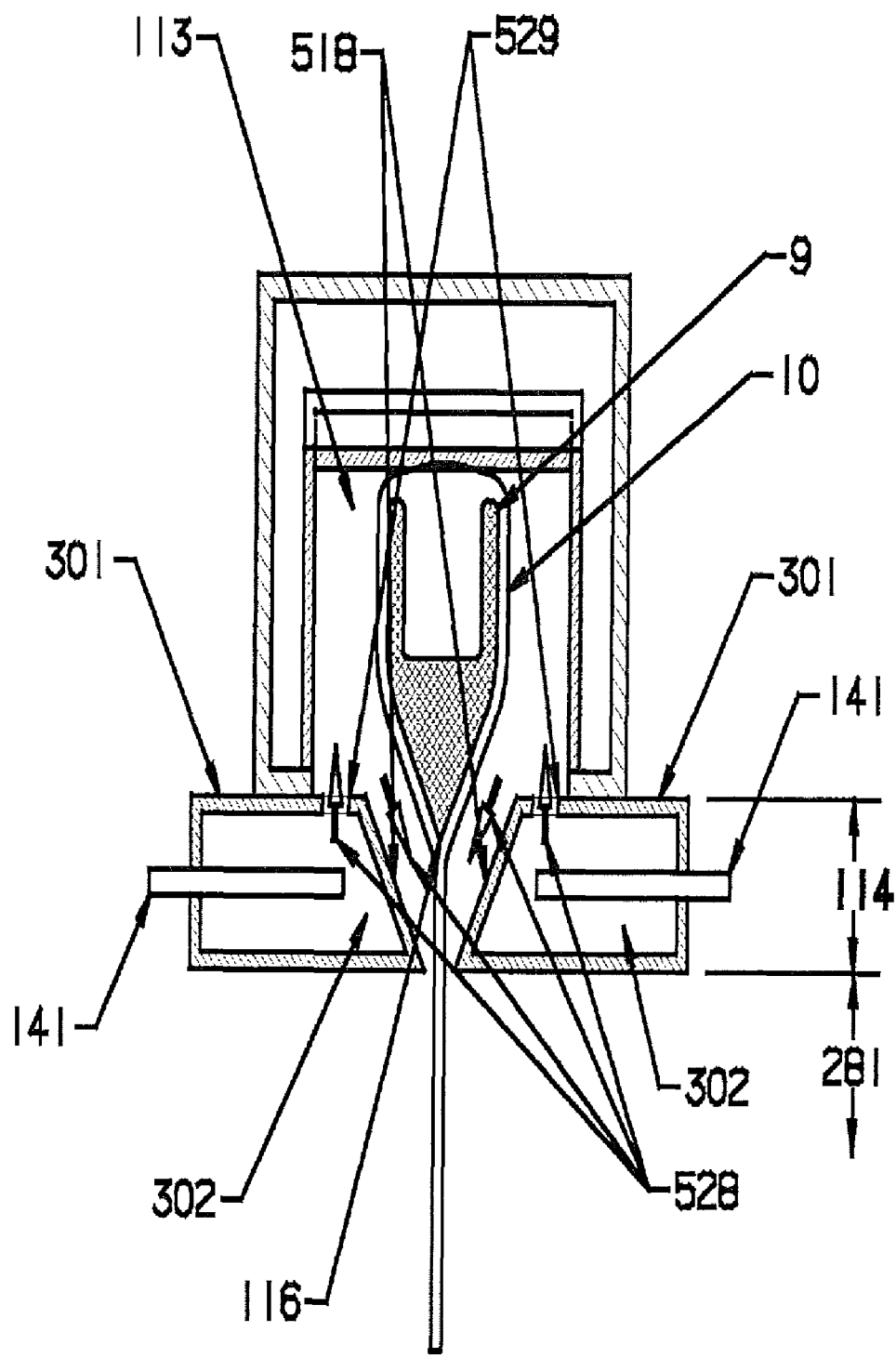

FIG. 53 shows the cross-section of the muffle door in FIG. 52 as it fits into the sheet forming apparatus.

DETAILED DESCRIPTION OF THE INVENTION

The flow dynamics in all embodiments of this invention are such that the outside surfaces of the glass sheet are formed from thoroughly mixed virgin glass that comes from the center of the glass stream flowing into the forming apparatus and thus has not contacted a refractory or refractory metal surface. This produces the highest possible surface quality. This pristine surface is essential for the manufacture of LCD/TFT semiconductor display devices. In addition, the flow dynamics in all embodiments of this invention are such that the flow rate of molten glass to the forming wedge at the bottom of the forming structure is substantially uniform over its width.

The glass "Sheet Forming Apparatus" normally designed for use in "The Overflow Process" (U.S. Pat. No. 3,338,696) relies on a specifically shaped forming structure to distribute the glass in a manner to form a sheet of a uniform thickness. The basic shape of this forming structure is described in detail in U.S. Pat. No. 3,338,696. The sheet glass forming process is conducted at elevated temperatures, typically between 1150° C. and 1275° C. At these temperatures, the materials used for construction of the forming structure exhibit a property called thermal creep, which is deformation of the material caused by applied stress at elevated temperatures. Thus, the forming structure deforms under the stress caused by its own weight and the stress caused by the weight and hydrostatic pressure of the molten glass in and on the forming structure.

As used herein, stress is the magnitude of the force within the forming structure, while strain is the deformation of the forming structure.

The concern for the structural integrity of the forming structure was addressed by Cortright in U.S. Pat. No. 3,519,411. The refractory material from which the forming structure is made has a high strength in compression and a low strength in tension. To prevent fracture of the forming structure, a compressive force was applied to the bottom portion of each end of the forming structure with the objective "to alleviate the undesirable effects of tensile stresses in a refractory sheet glass forming member". This force was determined by a static closed form stress analysis in U.S. Pat. No. 3,519,411, because Finite Element Analysis (FEA) was not a technology used by those skilled in art in the glass industry at that time.

U.S. Pat. No. 3,437,470 (Overman) also provides a design to negate the effect of gravity on the structural integrity of the forming structure. In both these patents, there was no documented concern or information about thermal creep of the forming structure as it relates to the thickness of the glass sheet produced.

U.S. Pat. Nos. 6,748,765, 6,889,526, and 6,895,782 and U.S. patent application Ser. Nos. 10/826,097, 11/011,657, 11/060,139 and 11/184,212 have been filed by the present applicant addressing, in different ways, the various problems of thermal creep in the Overflow Process. These patents and patent applications are herein incorporated by reference. They describe handling thermal creep as a linear process. While these methods and apparatuses work as described, there are significant advantages to be gained by considering the nonlinear behavior of thermal creep. The present invention enhances the claims and technology of the above referenced patents and patent applications by considering the nonlinear thermal creep characteristics of the refractory forming structure with respect to temperature and stress.

The invention introduces an accurate calculation of the counteracting force to the gravitational force on the forming structure in a manner such that the thermal creep, which inevitably occurs, has virtually no impact on the glass flow characteristics of the forming structure. The invention is designed such that this counteracting force is adequate to overcome the nonlinear aspects of thermal creep of the refractory material and is maintained through an extended period of the production campaign. Thus, sheet glass may be manufactured to the original specification for a longer time with the same forming structure and process parameters.

Figures 11A, 11B:
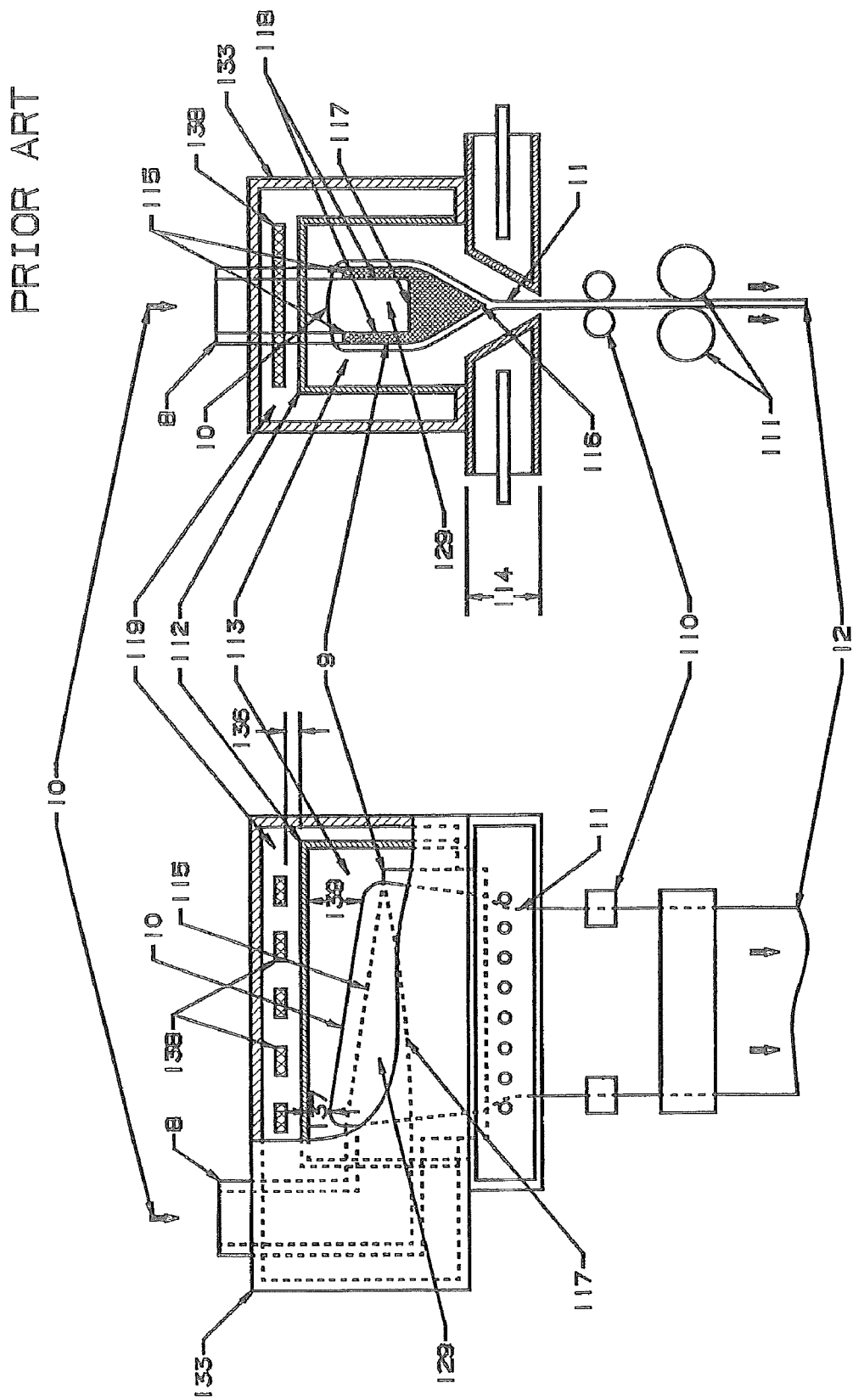
FIG. 11A shows the principle parts of a typical "Overflow Process" manufacturing system.
FIG. 11B shows a section of FIG. 11A.

Referring to FIGS. 1, 11A and 11B, a typical "Overflow Process" manufacturing system (1) is shown. The glass (10) from the melting furnace (2) and forehearth (3), which must be of substantially uniform temperature and chemical composition, feeds a stirring device (4). The stirring device (4) thoroughly homogenizes the glass. The glass (10) is then conducted through a bowl inlet pipe (5), into a bowl (6), and down into the downcomer pipe (7), through the joint (14) between the downcomer pipe (7) and the forming apparatus inlet pipe (8), to the inlet of the overflow forming structure (9). While flowing from the stirring device (4) to the forming structure (9), the glass (10), especially that which forms the sheet surface, must remain homogeneous. The normal purpose of the bowl (6) is to alter the flow direction from horizontal to vertical and to provide a means for stopping the flow of glass (10). In some apparatus configurations, a needle (13) is provided to stop glass flow. The normal function of the joint (14) between the downcomer pipe (7) and the trough inlet pipe (8) is to allow for removal of the sheet glass forming apparatus for service as well as a means of compensation for the thermal expansion of the process equipment.

The molten glass (10) from the melting furnace and forehearth, which must be of substantially uniform temperature and chemical composition, enters the forming apparatus through the inlet pipe (8) to a trough (129) located at the top of the sheet forming structure (9). The inlet pipe (8) is preferably shaped to control the velocity distribution of the incoming molten glass flow. The glass sheet forming apparatus, which is described in detail in both U.S. Pat. No. 3,338,696 and U.S. Pat. No. 6,748,765, herein incorporated by reference, is a wedge shaped forming structure, or forming structure (9). Straight sloped weirs (115), substantially parallel with the pointed edge of the wedge (116), form each side of the trough (129). The bottom (117) of the trough (129) and sides (118) of the trough (129) are contoured in a manner to provide even distribution of glass to the top of each side weir (115). The glass then flows over the top of each side weir (115), down each side of the wedge shaped forming structure (9), and joins at the pointed edge of the root (116), to form a sheet of molten glass (11). The sheet of molten glass (11) is then cooled as it is pulled off the root (116) by pulling rollers (111) to form a solid glass sheet (12) of substantially uniform thickness. Edge rollers (110) may also be used to draw the molten glass sheet (11). In the prior art, the forming structure (9) is encased within a rectangular shaped muffle (112), the purpose of which is to control the temperature of the forming structure (9) and the molten glass (10). It is prior art practice to maintain a constant temperature in the muffle chamber (113) surrounding the forming structure (9). The muffle (112) is heated by heating elements (138) in heating chamber (119), which is encased in the insulated structure (133). Cooling the glass as it transitions from the molten state to the solid state must be carefully controlled. This cooling process starts on the lower part of the forming apparatus (9) just above the root (116), and continues as the molten glass sheet passes through the muffle door zone (114). The molten glass is substantially solidified by the time it reaches the pulling rollers (111). The molten glass forms a solid glass sheet (12) of substantially uniform thickness.

A primary element in the overflow process sheet forming apparatus is the forming structure (9). The forming structure (9) is also known by many other names by those skilled in the art, including, but not limited to, forming trough, forming wedge, forming member, forming device, forming block, trough, pipe, isopipe, and fusion pipe.

Altering Glass Flow Distribution

Referring also to FIG. 2 through FIG. 10, a preferred embodiment of the present invention alters the flow path at the inlet of the sheet glass forming apparatus to improve surface quality. It also facilitates more uniform flow of glass through the piping that conducts the glass from the stirring device to the sheet glass forming apparatus.

U.S. Pat. No. 3,338,696 considers only the glass flow within the forming structure. U.S. Pat. No. 3,338,696 also claims that the entire sheet surface is formed from virgin glass, which has not been adversely effected by contact with a foreign surface. This is not entirely correct as some of the glass which forms the sheet on the inlet end of the trough has flowed in contact with the downcomer pipe front surface. A flow distribution device is added at the trough inlet in this invention to ensure that all of the usable sheet surface is formed from virgin glass. The piping system between the glass stirring device and the glass sheet forming apparatus is modified from traditional practice in the bowl and at the connection between the downcomer pipe and the forming apparatus inlet pipe. The flow through the bowl is altered, either eliminating or relocating the quiescent flow zone that normally forms at the front top surface of the bowl. The downcomer pipe is not submerged in the forming apparatus inlet pipe glass thus eliminating the quiescent flow zone between the pipes.

Figure 2B:
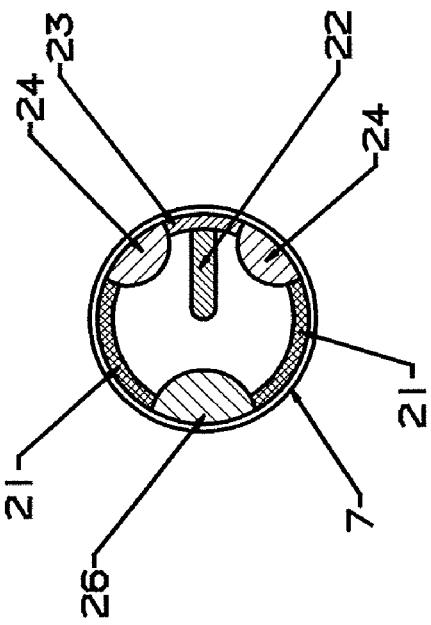
FIG. 2B shows a cross-section of the glass flow in the downcomer pipe across lines B-B of FIG. 2A.
Figure 2C:
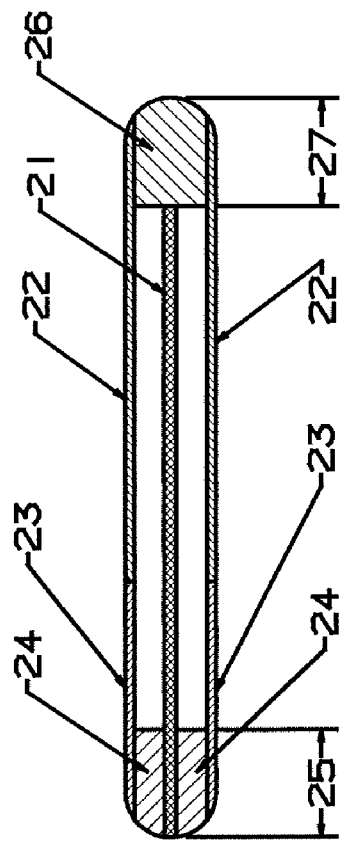
FIG. 2C shows a cross-section across lines C-C of FIG. 2A, where the glass flow in the downcomer pipe appears in the sheet for "The Overflow Process".
Figure 2A:
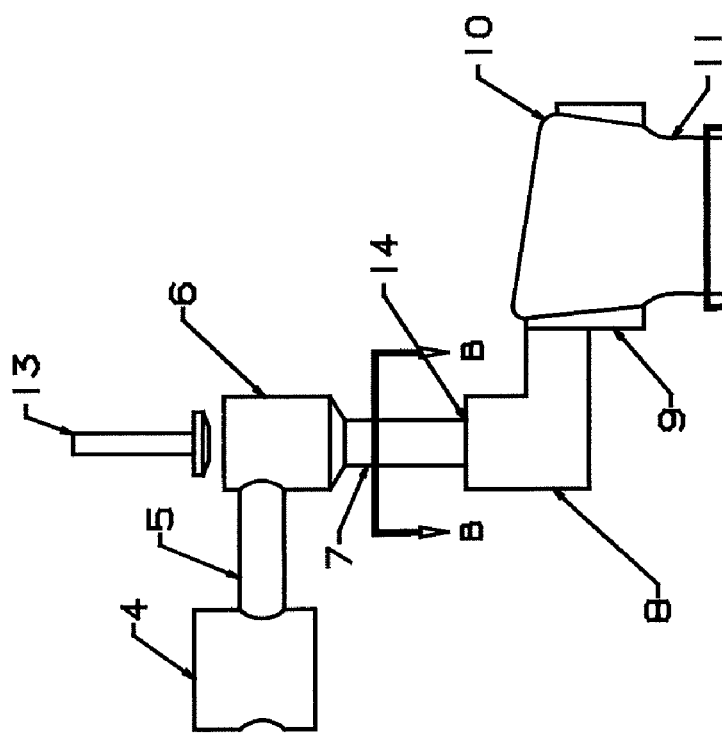
FIG. 2A shows a side view of "The Overflow Process" as known in the prior art.

FIGS. 2A through 2C illustrate where the glass (10) flowing in the downcomer feed pipe (7) ends up in the formed glass sheet in the prior art "Overflow Process". The glass flow in proximity to the back surface (21) of the downcomer pipe (7) ends up in the center of the drawn sheet. The flow (23) in proximity to the front surface of the downcomer pipe (7) is distributed over the entire glass surface; however, it is most concentrated on the approximate one third of the sheet at the inlet end. This surface glass (23) is subject to disruption by the downcomer pipe surface and by the glass in the quiescent zones in the bowl (6) and at the downcomer pipe (7) to the inlet pipe (8) connection (14). The surface of the remaining substantially two thirds of the sheet is formed from virgin interior glass (22). Two other portions of the glass flow (24) which are symmetrically offset from the front surface at an angle of approximately 45 degrees end up forming the near end unusable edge section (25) at the inlet end of the sheet. Another portion (26) centered at an angle of approximately 180 degrees proceeds to the far end of the unusable edge section (27).

FIGS. 3A and 3B show an embodiment of the glass sheet forming apparatus (31) with an inflow pipe (8), a flow distribution device (32) located at the trough inlet surface (which is the subject of this invention), and the glass sheet forming apparatus body (9). The flow distribution device (32) interrupts the flow on the surface glass and diverts it to the surface in the edge of the sheet. Glass from the center of the downcomer pipe flow stream then comes to the surface of the forming structure to form the surface of the usable portion of the glass sheet (11). Note that ten to twenty percent of the sheet at each edge is normally unusable for various reasons.

FIGS. 4A and 4B show an alternative embodiment of the glass sheet forming apparatus (41), which performs the same function as the embodiment in FIG. 3 except that the surface flow distribution device (42) is located under the surface of the glass (10) and redistributes the surface flow in a more subtle but equally effective manner. The glass flow (10) that forms the edge of the sheet flows through the center slot (43) in the flow distribution device (42). The glass (which flows through this center slot) is the glass that has been in proximity to the front surface of the downcomer pipe. Glass from the center of the downcomer pipe then flows to the forming structure surface to form the surface of the usable portion of the sheet (11). Other glass that flows in proximity to the surface of the downcomer pipe remains submerged.

FIGS. 5A through 5C illustrate where the glass (10) flowing in the downcomer feed pipe (7) ends up in the formed glass sheet for the inventions described in FIGS. 3 and 4. The glass flow to the center of the sheet (21) is virtually identical to that in the prior art. However, the flow (52) which forms the outside surface of the formed glass sheet does not flow in proximity to the front surface of the downcomer pipe (7). The two portions of the glass flow (24) which are symmetrically offset from the front surface at an angle of approximately 45 degrees and which end up forming the unusable edge section (25) at the inlet end of the sheet are substantially unaffected.

Figure 6:
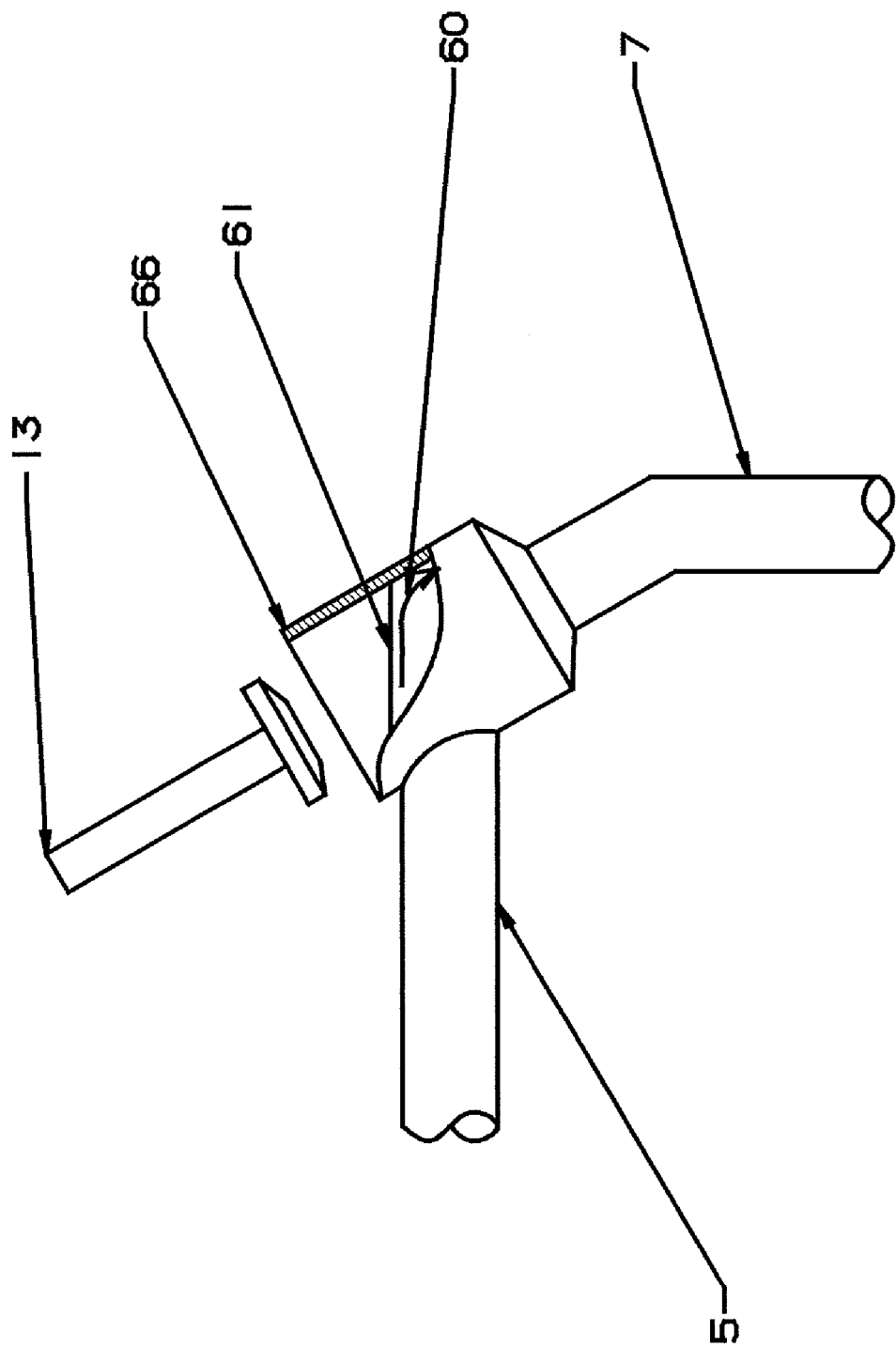
FIG. 6 shows a bowl with an inclined axis which diffuses the quiescent flow zone at the bowl nose in a preferred embodiment of the present invention.

FIG. 6 is an embodiment that shows the axis of the bowl (66) inclined at an angle such that the main process stream passes through the front of the bowl. This active flow (60) entrains the surface glass (61), overcoming the surface tension forces that would normally create a quiescent zone of glass flow located at the bowl nose (FIG. 8). A needle (13) is present to stop glass flow.

FIGS. 7A through 7D show an embodiment of the present invention where a crossways motion of the glass in the bowl (76) is facilitated by feeding the glass in the pipe coming from the stirring device to the bowl (75), into the side of the bowl (76) at an angle (74) with respect to the centerline (73) of the forming apparatus (9). This effectively changes the flow pattern (70) in the bowl such that the quiescent zone normally located at the bowl nose (81, FIG. 8) is moved to the side of the bowl (71). Referring back to FIGS. 2A-2C and 5A-5C, depending on the angle (74) of the flow in the bowl with respect to the centerline (73) of the forming apparatus (9), the glass from the quiescent zone (71) ends up in either the unusable portion of the inlet edge (25) or is submerged in the center of the glass sheet (21) instead of on the surface of the glass sheet (23). The glass free surface (72) in the bowl is also shown.

FIG. 8 illustrates the prior art with a bowl (6) which shows the quiescent zone (81) of glass that is located at the front of the bowl (6). This glass is kept in place by a combination of low process stream flow (80) at the front of the bowl and surface tension.

Eliminating Inhomogeneity Defects at the Downcomer Pipe to Inlet Pipe Junction

FIGS. 9A through 9C show an embodiment of the present invention where the bottom end (94) of the downcomer pipe (7) is located substantially above the glass free surface (90) in the forming apparatus inlet pipe (98). The forming apparatus inlet (98) also has a specific size and shape (92). The vertical distance (93) and the size and shape (92) of the forming apparatus inlet (98) is specifically designed to minimize any zone of quiescent or vortex flow in the glass flow path (91). Thus, the molten glass (10) forms a more homogenous sheet (11). This design is determined by solution of the fluid flow equations (Navier-Stokes Equations) and by experimental tests.

FIGS. 10A through 10C show a downcomer pipe (7) submerged in the molten glass surface (100) in the forming apparatus inlet pipe (8) as known in the prior art. There is a quiescent zone (101) between the two pipes (7) and (8). The glass flow path (103) produces an annular vortex (102) of glass between the downcomer pipe (7) and the trough inlet pipe (8). The vortex exchanges little material with the main process stream except during flow transients at which time it produces defects in the glass sheet.

There are three principal homogeneity defects which may be formed at the downcomer pipe (7) to the inlet pipe (8) junction (14). These defects are cord defects, seed defects, and devitrification defects.

Cord is best described as strings of glass of different viscosity and/or index of refraction in the body glass. It is visually evident in antique glass as lines or swirls of distortion. It is caused by poor mixing of the glass. Cord may be formed from well mixed glass if the glass flow in a region is flowing much slower than the body glass or if it is subject to surface volatilization. The chemical composition of glass in many manufacturing operations changes a small amount from day to day. If glass from a previous day's production is slowly bled into the glass of the present day's production, a small difference in index of refraction or viscosity can produce cord. In the sheet glass process, cord would show as optical distortion caused by refractive index or thickness variations. Thickness variations could also affect the quality of the semiconductor manufacturing process.

Seeds are gaseous inclusions or bubbles in the glass body. When they are large, they are called blisters. Seeds are quite common in melted glass and are kept to the minimum required of a particular product by a process called fining or refining. The process is normally both chemical and mechanical and performed in a finer or refiner. Seeds can be produced in glass after the fining step by electrolysis and fluid flow phenomena. In the sheet glass process, seeds are elongated and show up as visual defects.

Devitrification is the crystallization of the glass. Glass is amorphous meaning that it is a completely random mixture of molecules. Molten glass remains amorphous as long as its temperature is above the liquidus temperature. For glasses that are intended to be transparent, when the molten glass is cooled quickly from above the liquidus temperature to a solid body below the liquidus temperature, it retains its amorphous state and its transparency. If the molten glass is maintained for a period of time at temperatures near to but below the liquidus temperature, it slowly forms crystals which have chemical compositions that are normally slightly different from that of the parent glass. The rate of this devitrification is a function of the glass composition and the difference between the temperature of the glass and the liquidus temperature. In the sheet glass process, devitrification shows as optical defects in the LCD screen.

FIGS. 46 through 48 show in more detail the sources of the homogeneity defects that may be produced at the downcomer pipe (7) to the inlet pipe (8) junction (14), as well as how different positions for the downcomer pipe affect production of these defects.

FIGS. 46A and 46B show the vertical position of the bottom (94) of the downcomer pipe (7) at the same vertical position as the free surface of the glass (460). The length of the small arrows that indicate the streamlines of flow (461) approximate the relative velocities of the glass flow at different locations in the downcomer pipe (7) and the inlet pipe (8). There is a vortex of glass flow (462) located at the bottom of the downcomer pipe (7) which is exposed to the factory atmosphere at the free surface (460). The length of the arrows (462) in the vortex is not scaled to the length of the arrows in the streamlines of flow (461). The glass circulates in the vortex flow (462) field for a long time which causes volatilization of some of the glass chemicals, thus changing the glass chemical and physical properties. The size of the vortex flow (462) is greater when the bottom (94) of the downcomer pipe (7) is below the free surface (460) of the glass.

Physical theory says that if the downcomer pipe (7) is circular and is perfectly centered in a circular inlet pipe (8), the vortex glass flow (462) between the downcomer pipe (7) and the inlet pipe (8) is stationary and does not bleed into the stream of glass flow (461). The realities of manufacturing result in conditions where either periodically or continuously a small portion of the glass from the vortex (462) bleeds into the main glass stream (461). The glass that bleeds into the main glass stream has been subject to volatilization, is likely to have a different chemical composition and thus may create a cord defect. Additionally, if the temperature of the glass in the vortex is below the liquidus temperature for a period of time, devitrification defects may be formed.

FIGS. 49A through 49D show examples of applying heat to the glass at the junction (14) of the downcomer pipe (7) and the inlet pipe (8), to raise the temperature of the glass in the vortex (462) above the liquidus temperature. This embodiment is useful when devitrification of the glass at the junction (14) of the downcomer pipe (7) and the inlet pipe (8) is a concern or problem. It is particularly important when it is preferred or desirable to have the bottom end (94) of the downcomer pipe (7) at or below the glass free surface (460) and devitrification or cord is a homogeneity defect problem. The applied heating solves the devitrification problem. This may be done by placing heaters at the top of the inlet pipe (491) and/or the bottom of the downcomer pipe (492).

Another embodiment places heaters in the seal blocks (493). There are preferably two seal blocks (493), which are symmetrical in shape, one of which is shown individually in FIG. 49D. The seal blocks (493) are manually set upon the insulated structure (133) to partially seal the free surface (460) from the factory atmosphere. The important shape of the seal block is the semi-circular inner radius (494), which must fit closely to the outside diameter (496) of the downcomer pipe (7) to provide a partial seal between the free surface (460) of the glass and the factory atmosphere. The seal block (493) shown is semicircular on its outer edge, however, the outer edge shape (495) may be rectangular or any other complex shape that would effectively seal the free surface (460) from the atmosphere at the top of the insulated structure (133). Some seal block configurations may include more than two seal blocks (493) in order to provide an adequate seal between the free surface (460) and the factory atmosphere and to accommodate any irregular shape of the downcomer pipe (7).

U.S. Pat. No. 6,895,782, herein incorporated by reference, discusses glass flow in the vortex (462) between the downcomer pipe (7) and the inlet pipe (8). This patent describes how to shape the bottom of the downcomer pipe (7), how to shape the inlet pipe (8) and how to adjust them with respect to each other in the horizontal direction to control the time glass spends in the vortex (462) and what part of the glass stream into which it bleeds.

FIGS. 47A and 47B are related to FIG. 9C. The length of the small arrows approximate the relative velocities of the glass flow at different locations in the downcomer pipe (7) and the inlet pipe (8) for the condition where the bottom (94) of the downcomer pipe (7) is substantially above the glass free surface (90) to virtually eliminate the condition of vortex flow. The arrows (471) show the streamlines of flow. The distance (93) shown is 0.25 times the inside diameter (476) of the inlet pipe (7). This distance (93) is in the approximate center of an operating range which varies from 0.05 to 0.65 times the inside diameter (476) of the inlet pipe (7). The optimum distance (93) is a function of the relative diameters of the downcomer pipe (7) and the inlet pipe (8) and the viscosity of the glass (10). Positioning the downcomer pipe (7) relative to the inlet pipe (8) in this range is the most desirable in that it reduces the probability of generating cord, seed, and devitrification defects.

The length of the small arrows (481) and (487) in FIGS. 48A and 48B approximate the relative velocities of the glass flow at different locations in and between the downcomer pipe (7) and inlet pipe (8) for the condition where the bottom (94) of the downcomer pipe (7) is located a distance (483) of 1.00 times the inside diameter (476) of the downcomer pipe (7) above the glass free surface (480). The glass stream (484) exiting the downcomer pipe (7) narrows as the glass accelerates toward the free surface (480). The streamline arrows (487) in this region (484) are longer than the streamline arrows (481) below the free surface (480), thus representing the difference in relative velocity. Where the stream enters the free surface (485), it creates vortex flow (482) similar to that in the case of the downcomer pipe (7) at or below the free surface (460) as shown in FIG. 46B. The length of these arrows (482) is not scaled to the length of the arrows in the streamlines of flow (481) and (487). At the entry point (485) of the stream (484) into the free surface (480), air bubbles are trapped in the merging flow paths of the descending stream (484) and the vortex (482). These air bubbles become seed inhomogeneities. The air bubble entrapment rate increases as the distance (483) increases.

FIGS. 50A and 50B illustrate an embodiment of this invention whereby the shape of the inlet pipe (508) is altered in the vicinity of the free surface (90) to further minimize the development of a stationary vortex at the juncture (14) of the downcomer pipe (7) and the inlet pipe (508). The inlet pipe (508) is flared outward by the angle (505) at the intersection (509) of the free surface (90) and the inlet pipe (508). The flared angle (505) produces a conical shape in a portion of the inlet pipe (508). Arrows (502) representing the flow in the vicinity of the intersection (509) of the free surface (90) and the inlet pipe (508) have a radial component which reduces the tendency to form a stationary vortex ((462) in FIG. 46B and (482) in FIG. 48B). Angles (505) between 10 and 50 degrees reduce the propensity of the stationary vortex to form. The addition of this conical section in the inlet pipe (508)

increases the range of distances (93) over which the vortex ((462) in FIG. 46B and (482) in FIG. 48B) is minimized.

In summary the condition of FIG. 47, where little or no vortex (462) and (482) is generated at the downcomer pipe (7) to the inlet pipe (8) junction (14), is the most desirable. The condition of FIG. 46 where the downcomer pipe is at or immersed in the free surface is tolerable with the installation of heaters and/or with certain design and operational constraints, and the condition of FIG. 48 is to be avoided under all circumstances.

Reducing Degradation of Sheet Glass Forming Apparatus

Referring now to FIGS. 11 through 16, another embodiment of the present invention controls the flow distribution of glass on the forming apparatus in a manner such that the degradation of the production apparatus and the deformation of the forming structure that results from thermal creep is compensated by thermal control of the glass flow distribution.

U.S. Pat. No. 3,338,696 relies on a specifically shaped forming structure to distribute the glass in a manner to form a sheet of uniform thickness. The basic shape of this forming structure is described in detail in U.S. Pat. No. 3,338,696. The sheet glass forming process is conducted at elevated temperatures, typically between 1000° C. and 1350° C. At these temperatures, the materials used for construction of the forming structure exhibit a property called thermal creep, which is deformation of the material caused by applied stress. Thus, the forming structure deforms under the stress caused by its own weight and the stress caused by the hydrostatic pressure of the glass in the trough.

The materials used in the construction of the other parts of the forming apparatus also degrade (warp, crack, change thermal properties, etc.) in an indeterminate way, which has an adverse effect on thickness distribution. The thickness control system of U.S. Pat. No. 3,682,609 can compensate for small thickness errors, but it can only redistribute the glass over distances on the order of 5-10 cm. To significantly effect thickness distribution over the entire width of the glass sheet, the flow of the molten glass over the weirs must be controlled.

This embodiment of the invention solves this problem by introducing a precise thermal control system to redistribute the flow of molten glass at the weirs, which is the most critical area of the forming process. This thermal control effectively counteracts the degradation of the sheet forming apparatus which inevitably occurs during a production campaign.

FIG. 12A shows the side view of the forming structure (9) with arrows showing the flow of molten glass (10) through the forming structure (9) to the side weirs (115). FIG. 12B shows a section through the center of the forming structure (9) which shows the different zones for the control of molten glass (10) as it flows through the forming apparatus. Zone (121) is the flow in the trough (129) from the inlet end of the forming structure to the far end, zone (122) is the flow over the weirs, zone (123) is the flow down the outside of the forming structure, and zone (124) is the molten glass (11) being pulled off the root (116) and cooling into a solid sheet (12). The effect on the solid glass sheet (12) thickness caused by heating or cooling the molten glass (10) as it passes through each zone is different. Adding energy to (raising the temperature of) or removing energy from the molten glass (10) as it flows from the inlet end to the far end of the forming structure (9) in zone (121) produces concave or convex sheet thickness profiles respectively. The period of the thickness profile changes effected in zone (121) is on the order of the length of the forming structure.

Changes to the energy flux to the molten glass (10) as it flows over the weirs (115) in zone (122) have a powerful effect on the resultant solid glass sheet thickness distribution. Localized cooling of the glass in zone (122) effectively produces a dam, which has a large effect on glass flow. This is an extremely sensitive zone, and any control strategy other than isothermal must be carefully designed. Zone (123) is important to return the glass to a uniform temperature distribution, substantially linear in the longitudinal direction, in order that the drawing process at the root (116) is consistent. Differential cooling in zone (124) is the object of U.S. Pat. No. 3,682,609 and is effective in making small thickness distribution changes. Cooling at given longitudinal location affects the thickness at that location in one direction and conversely to the glass on each side of the location. The effect is distributed over a distance on the order of centimeters.

FIGS. 11A and 11B show the prior art muffle (112), the top surface of which is horizontal, whereas the forming structure (9) weirs (115) and the top surface of the glass (10) flowing in the trough (129) of the forming structure (9) arc sloped downward from the inflow pipe (8) to the far end of the forming structure (9). Heat transfer at these temperatures between the muffle (115) and the glass (10) is primarily by radiation. Therefore, the distance between the muffle (115) and the glass (10) affects the distribution of the energy transferred because of the characteristics of radiation heat transfer. Heating elements in the chamber (119) are nominally equidistant (136) from the muffle (112). Therefore, each element (138) has substantially the same effect on energy transfer from the element (138) to the muffle (112).

The distance (137) between the muffle (112) and the glass (10) at the inflow end is substantially less than the distance (139) between the muffle (112) and the glass (10) at the far end, therefore the heat transfer at the inflow end is more concentrated than the heat transfer at the far end. The result is that a change in energy of a heating element (138) at the inflow end has a more targeted effect on the temperature of the glass (10) than a change in energy of a heating element (138) at the far end. The use of heating elements (138) in chamber (119) to change the temperature and consequently the localized flow rate of the glass (10) flowing in the forming structure (9) is documented and claimed in U.S. Pat. No. 6,748, 765.

Figures 13A, 13B:
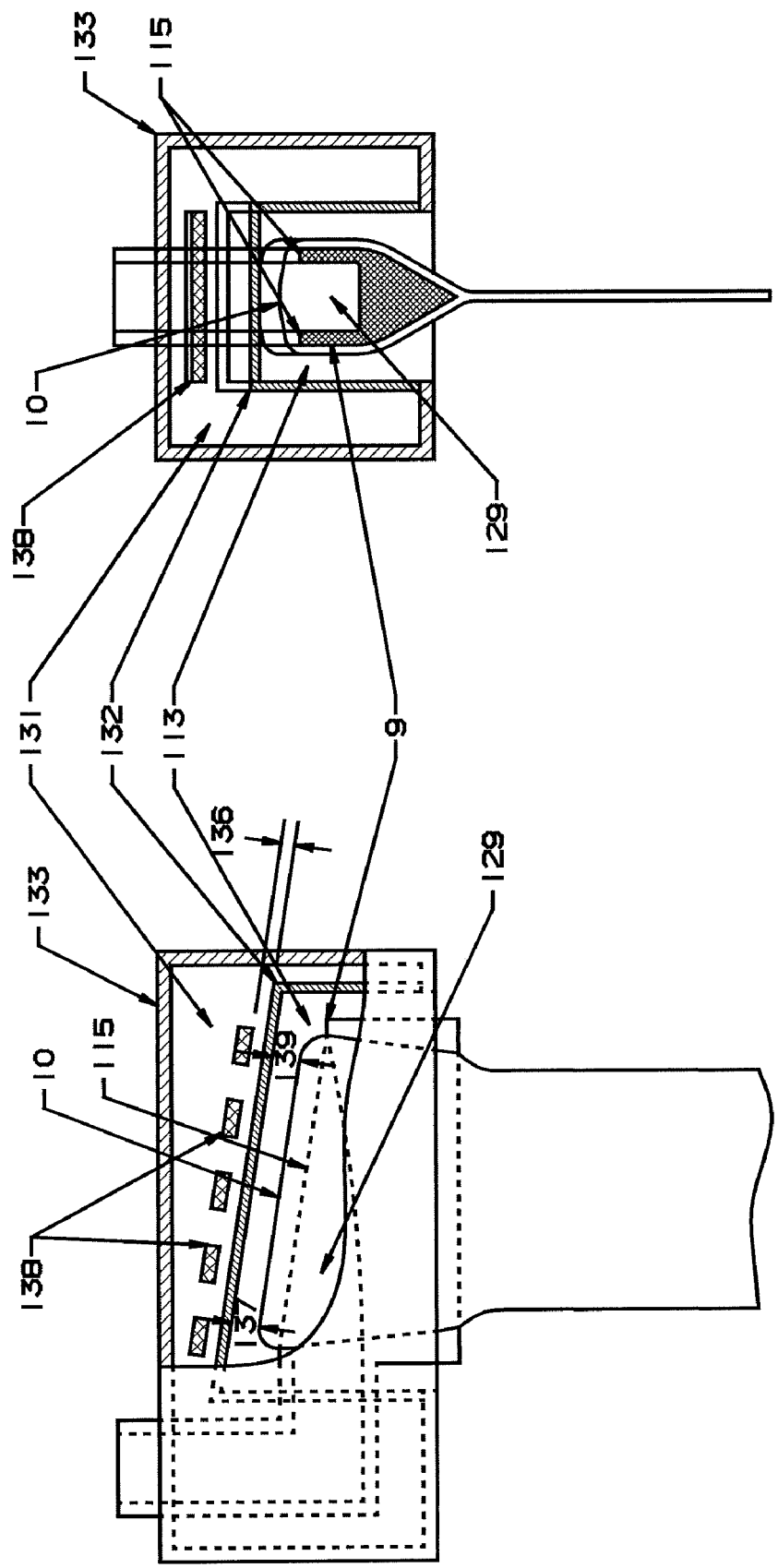
FIG. 13A shows a revised single heating chamber muffle design in a preferred embodiment of the present invention.
FIG. 13B shows a section of FIG. 13A.

FIGS. 13A and 13B show an embodiment of this invention whereby the top of the muffle (132) is shaped more closely to the outside surface of the molten glass (10) that is flowing in the trough (129) and on the forming structure (9). The muffle (132) is heated by heating elements (138) in heating chamber (131), which is encased in the insulated structure (133). The distance (137) between the muffle (132) and the glass (10) at the inflow end is substantially equal to the distance (139) between the muffle (132) and the glass (10) at the far end, therefore the heat transfer at the inflow end is substantially the same as the heat transfer at the far end.

By designing the muffle (132) to conform closely to the outside shape of the molten glass (10) flowing in the trough (129) in the forming structure (9), energy may be directed to targeted areas of the molten glass (10), thereby effecting greater control of temperature distribution. The heating elements (138) in the heating chamber (131) have adequate power to balance the energy flux to the forming structure (9) and thus create suitable temperature conditions.

Figures 14A, 14B:
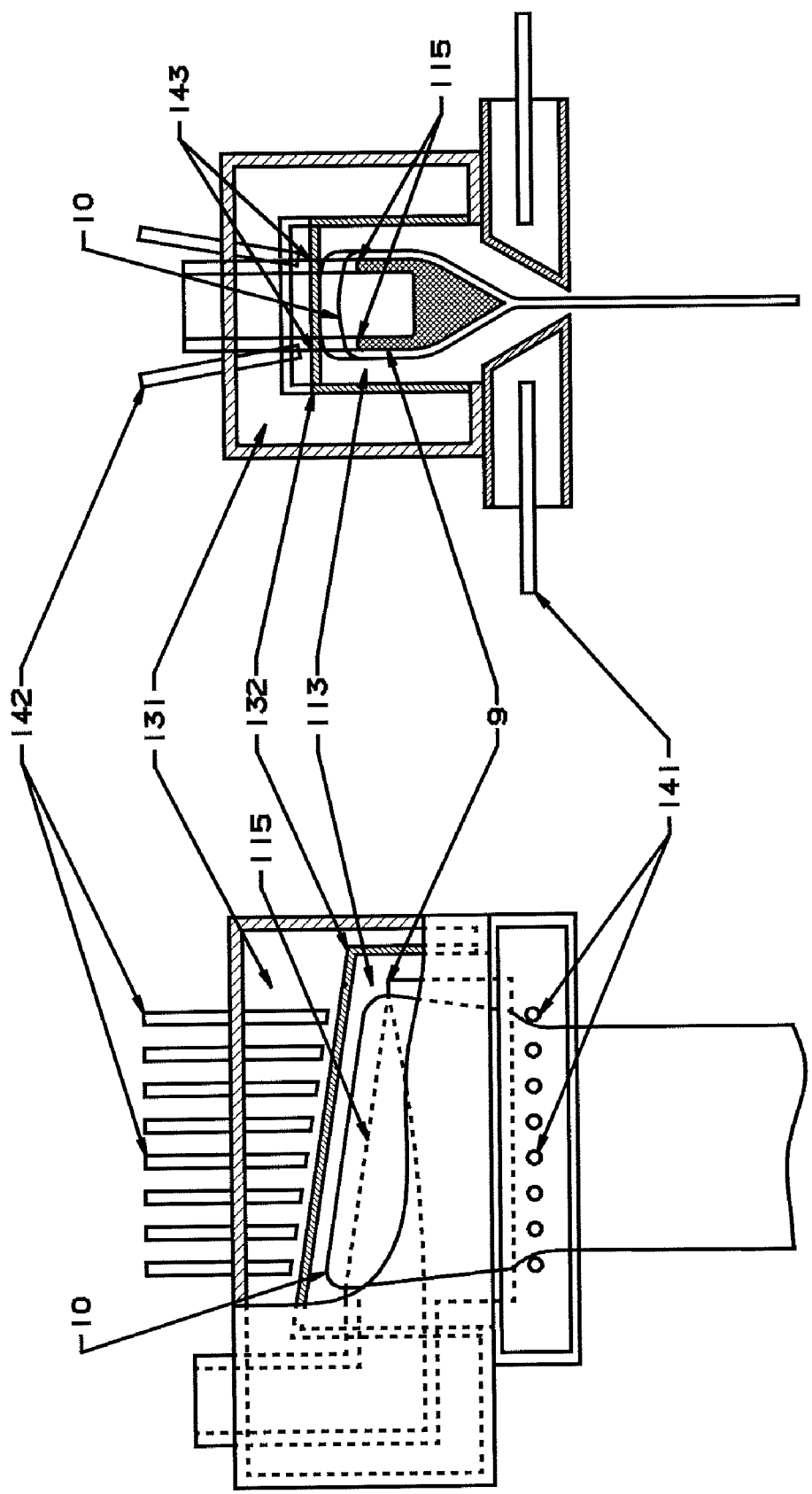
FIG. 14A shows air cooling tubes to affect localized cooling to the molten glass as it passes over the weirs in a preferred embodiment of the invention.
FIG. 14B shows a section of FIG. 14A.
Figures 19A, 19B, 19C, 19D:
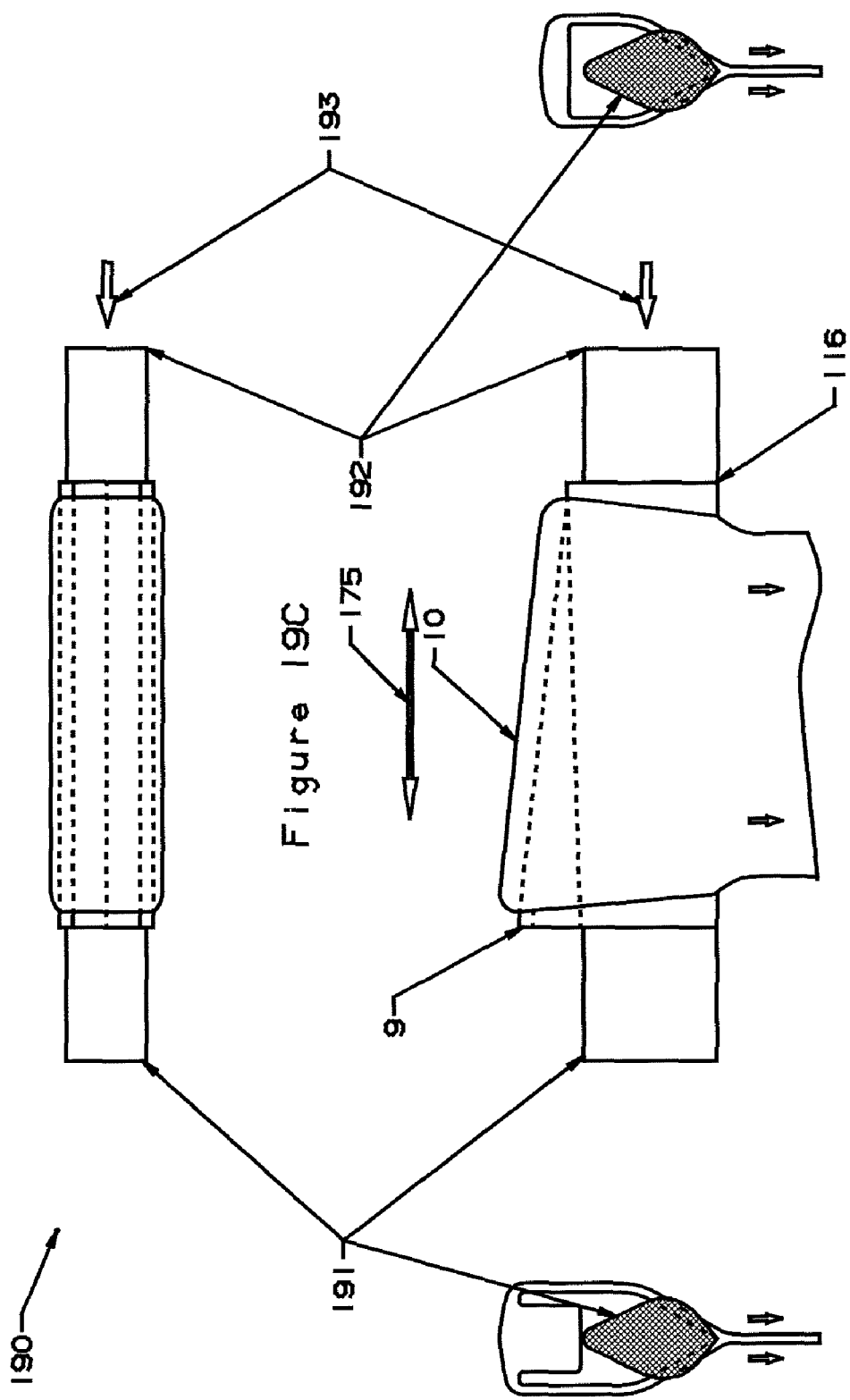
FIG. 19A shows single shaped compression blocks on each end of the forming structure in a preferred embodiment of the present invention.
FIG. 19B shows another view of FIG. 19A.
FIG. 19C shows another view of FIG. 19A.
FIG. 19D shows another view of FIG. 19A.
Figure 21B:
FIG. 21B shows a top view of FIG. 21A.
Figures 21C, 21D, 21E, 21F, 21G:
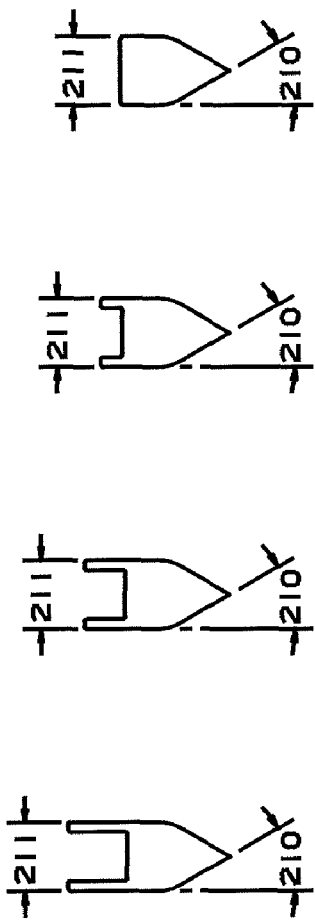
FIG. 21C shows a cross-section of the forming structure design shown in FIG. 21A across lines C-C.
FIG. 21D shows a cross-section of the forming structure design shown in FIG. 21A across lines D-D.
FIG. 21E shows a cross-section of the forming structure design shown in FIG. 21A across lines E-E.
FIG. 21F shows a cross-section of the forming structure design shown in FIG. 21A across lines F-F.
FIG. 21G shows a cross-section of the forming structure design shown in FIG. 21A across lines G-G.
Figure 21A:
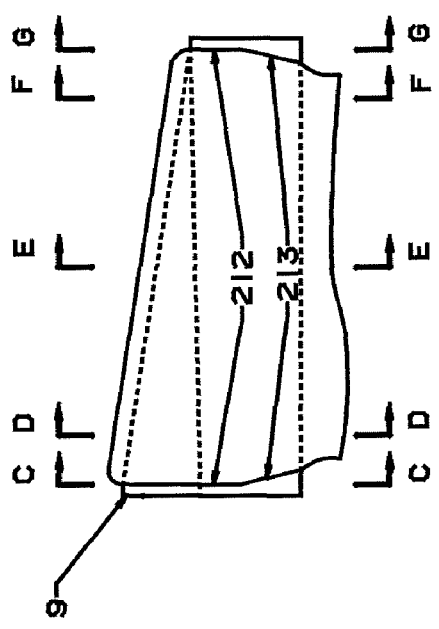
FIG. 21A shows a forming structure design as known in the prior art.

FIGS. 14A and 14B show an embodiment of this invention which effects localized cooling of the molten glass (10) as it passes over the weirs (115) in zone (122). The muffle (132) configuration of FIGS. 13A and 13B is used. Air cooling tubes (142), similar in function to those air cooling tubes (141) that are described in U.S. Pat. No. 3,682,609, are directed at the heating chamber side of the muffle (143) just above the molten glass (10) flowing over the weirs (115).

Localized cooling of the glass in this location effectively produces a localized dam, which has a significant effect on the thickness distribution of the solid glass sheet.

FIGS. 15A and 15B show an embodiment of this invention whereby the multi-chamber muffle (156) is designed with separate heating chambers (151-155) to control the temperature of the molten glass (10) as its passes through the various individual zones of the forming process. These zones (121-124) are described in FIGS. 12A and 12B. The multi-chamber muffle (156) has five heating chambers (151-155). Heating chamber (153), located over the top of the forming structure (9), affects the flow of glass from the inlet end to the far end of the forming structure (9) (zone (121)). The heating chambers (152) and (154) over the top of the weirs (115) affect the flow over the weirs (115) (zone (122)), and the heating chambers (151) and (155) on each side of the forming structure (9) are used to balance the temperature longitudinally (zone (123)). All the heating chambers (151-155) have heating elements with adequate power to balance the energy flux to the forming structure (9) and thus create suitable temperature conditions.

FIGS. 16A and 16B show an embodiment of this invention which affects localized cooling to the molten glass (10) as it passes over the weirs (115). This is zone (122) shown in FIG. 12B. The multi-chamber muffle (156) configuration of FIGS. 15A and 15B is used. Specially designed radiant coolers (161), installed in heating chambers (152) and (154), have the ability to selectively cool the heating chamber side of the muffle surface (162) opposite the weirs (115). The radiant cooler has multiple adjustments (164) such that the temperature of its bottom surface can be varied in the longitudinal direction. The distribution of the heat transfer between the radiant cooler (161) and the muffle surface (162) is a function of the distance (163). By varying the distance (163) between the cooling device (161) and the muffle surface (162), the cooling effect may be attenuated to adjust sensitivity. Although it is not illustrated, the cooling devices (161) are replaceable during operation. The radiant coolers (161) could alternately be inserted from the side instead of the top with a suitable change in the design of the heating chambers (152), (153) and (154).

In an alternative embodiment, the air cooling tubes (142) of FIGS. 14A and 14B could be used with the muffle (156) design of FIGS. 15A and 15B, and the radiant coolers (161) of FIGS. 16A and 16B could be used with the muffle (132) configuration of FIGS. 13A and 13B.

Reducing Thickness Variations in the Glass Sheet

Referring to FIGS. 17 through 20, another embodiment of the present invention supports and compresses the forming apparatus in a manner such that the deformation that results from thermal creep has a minimum effect on the thickness variation of the glass sheet. This embodiment introduces a counteracting force to these stresses on the forming structure in a manner such that the thermal creep which inevitably occurs has a minimum impact on the glass flow characteristics of the forming structure. The invention is designed such that this counteracting force is maintained through an extended period of the production campaign. Thus, sheet glass may be manufactured for a longer time with the same forming structure.

The refractory materials from which the forming structure and its support structure are made have high strength in compression and low strength in tension. Like most structural materials, they also change shape when stressed at high temperature. This embodiment was developed due to the material characteristics and how these characteristics affect the manufacturing process.

There are two fundamental concepts in this embodiment of the invention. First, applying a force and/or moment to the ends of the forming structure counteracts stress caused by the forces of gravity, thus minimizing the effect on molten glass flow caused by thermal creep. Second, the invention uses compression members shaped such that thermal creep, to which the compression members are also subject, does not substantially alter the application of said force and/or moment.

FIGS. 17A and 17B illustrate the typical effects of thermal creep on the shape of the forming structure. FIG. 17A shows that the forming structure (9) sags in the middle such that the top of the weirs (115) and the root (116) are now curved (171) and the trough bottom (117) has a change in curvature (171). This curvature (171) causes the molten glass (10) to no longer flow with constant thickness (172) over the weirs (115). This curvature (171) allows more glass to flow over the middle of the weirs resulting in an uneven sheet thickness distribution. FIG. 17B shows how the hydrostatic force (174) from the molten glass (10) in the forming structure (9) forces the weirs (115) to move apart at the top. This allows more glass to flow to the middle of the forming structure (9) making the thickness in the middle even greater.

FIGS. 18A through 18D show a sheet glass forming apparatus (180) as known in the prior art. The forming structure (9) is supported by an inlet end supporting block (181) and a far end supporting block (182). The forming structure (9) is the equivalent of a beam, which is subject to a bending stress from its own weight, from the weight of the glass in and on the forming structure, and from drawing forces. Because of the low tensile strength of the forming structure material, a compressive force (183) is applied to the lower half of the forming structure (9) to force the material at the root (116) of the forming structure (9) into compression. Typically the inlet end support block (181) is restrained in the longitudinal (horizontal) direction (175) and the compression force (183) is applied to the far end support block (182). The prior art considers only preventing tension at the root (116) of the forming structure (9), and then only the stress at start-up. Little consideration is made for the effects on stress of the thermal creep of the forming structure (9) and its support blocks (181) and (182).

FIGS. 19A through 19D show an embodiment of a sheet glass forming apparatus (190) that has shaped end support blocks (191) and (192). The inlet end shaped support block (191) is restrained in the longitudinal direction (175). A compression force (193) is applied to the far end shaped support block (192). The shape of the support block is designed in a manner to produce a force distribution in the forming structure (9) to substantially counteract the effect of the weight of the forming structure (9) and the molten glass (10). The applied force (193) is such that all material in the forming structure (9) is under substantially equal compression stress in the longitudinal direction (175). This stress causes the thermal creep to occur primarily in the longitudinal direction (175) with little of the sagging shown in FIG. 17A. The forming structure (9) gets shorter due to the equal compressive stress in the longitudinal direction (175). The shaped support blocks are also subject to thermal creep. The cross section of the shaped support block is the same over substantially its entire length with equal compressive stress across its section. Thus as the shaped support block deforms from thermal creep, it continues to apply substantially the same force distribution to the forming structure (9).

FIGS. 20A through 20D show an embodiment of a sheet glass forming apparatus (200) that has four shaped end support blocks (201), (202), (204), and (205). The inlet end has three shaped support blocks (201), (204), and (205), all of which have longitudinal compression forces (206), (207), and (208) applied. A compression force (203) is applied to the far end shaped support block (202). The shape and loading of the support blocks (202) and (203) are designed to the same criteria as support blocks (191) and (192) in FIGS. 19A-19D. The two upper shaped support blocks (204) and (205) are attached to the inlet end of the weirs and are angled inward such that they exert an additional force on the weirs to counteract the affect of the hydrostatic forces which tend to spread the weirs apart.

In a preferred embodiment, short (10-25% of length) transition zones (not shown) are at the forming structure ends of the shaped support blocks. In these transition zones, the cross-section of the shaped support block will change from that of the shaped support block to a shape that will suitably apply the design load to the forming structure.

Compression Loading of the Forming Structure

FIGS. 42A through 42D show a sheet glass forming apparatus (420) that represents prior art. The design is primarily that described by Cortright in U.S. Pat. No. 3,519,411. The forming structure (9) is supported by an inlet end support and compression block (421) and a far end support and compression block (422). The inlet end support and compression block (421) rests on the inlet end structure (423) and is restrained in the longitudinal (horizontal) direction (175) by an adjustment screw (424) and a sealing force (429) at the forming structure (9) inlet. The far end support and compression block (422) rests on the far end structure (425), and a far end compression force (426) is applied to the far end of the forming structure by the support and compression block (422) at the surface (427). The force (426) is generated by the far end force applicator (428) acting between the support and compression block (422) and the far end structure (425). In one embodiment, the force applicator (428) is a force motor. The force applicator used in the prior art is an air cylinder that generates a substantially constant force. Prior art considers only preventing undesirable tension at the root (116) of the forming structure (9).

A force motor as defined herein is a device that generates a substantially constant force in a linear direction and maintains that force for the linear stroke required in the application. The tolerance for variation of the force level is preferably plus or minus 5 percent or less over the full range of the stroke. The energy required to maintain this force may be supplied by gravitational, pneumatic, hydraulic, or mechanical means. Some examples of force motors include, but are not limited to, an adjustable spring assembly, a mechanical adjustment device that is constantly or periodically monitored and adjusted, an air cylinder, an air powered motor, a hydraulic cylinder, a hydraulic powered motor, a solenoid, an electric motor, or a weight and lever system.

Referring to FIGS. 43A through 43D, a substantial improvement over the prior art, discussed in U.S. Pat. Nos. 6,889,526, and 6,990,834, herein incorporated by reference, uses multiple force applicators to enable the compressive forces (426) and (436) at the root (116) of the forming structure (9) to remain consistently at the desired levels throughout the production campaign.

FIGS. 43A through 43D show a sheet glass forming apparatus (430) where the weight of the forming structure is supported at the inlet end by the inlet end structure (433) at the surface (431). Additionally, it is constrained horizontally by a small sealing compression force (429) at the surface (439). The weight of the forming structure is supported at the far end by the far end structure (435) at the surface (432). The surface (432) is designed to have very low friction in the horizontal direction, thus contributing negligible force in the horizontal direction. The inlet end compression force (436) is applied to the bottom portion of the forming structure by a compression block (437), which is designed to have low friction in the direction of the applied force. The inlet end compression force (436) is generated by the inlet end force applicator (438). The far end compression force (426) is applied to the bottom portion of the forming structure by the compression block (434). The far end compression force (426) is generated by the far end force applicator (428). The far end compression force (426) must be slightly greater than the inlet end compression forces (436) to compensate for the inlet pipe sealing compression force (429). The forming structure bottom compression forces (426) and (436) are applied with low friction and can be maintained at the same and/or any preprogrammed level throughout a production campaign. The force applicators (428) and (438) are preferably force motors.

Another substantial improvement over the prior art is shown in FIGS. 44A through 44D. Shown is a sheet glass forming apparatus (440) where the weight of the forming structure is supported at the inlet end by the inlet end support and compression block (421). Additionally, the inlet end structure (445) constrains the forming structure horizontally by a small sealing compression force (429) at surface (449). The weight of the forming structure is supported at the far end by the far end support and compression block (422). The inlet end compression force (436) is applied to the bottom portion of the forming structure by the support and compression block (421). The inlet end compression force (436) is generated by the inlet end force applicator (448). The far end compression force (426) is applied to the bottom portion of the forming structure by the support and compression block (422). The far end compression force (426) is generated by the far end force applicator (428). The far end compression force (426) must be slightly greater than the inlet end compression forces (436) to compensate for the inlet pipe sealing compression force (429). The forming structure bottom compression forces (426) and (436) are maintained at the same and/or any preprogrammed level throughout a production campaign. The force applicators (428) and (438) are preferably force motors.

The force applicators apply forces in opposite longitudinal directions (175) to the respective support and compression blocks such that the bottom of the forming structure is in substantially greater compression than the top of the forming structure. In one preferred embodiment, the compression stress in the bottom of the forming structure is between 1.25 and 4 times the compressive stress in the top of the forming structure. In another preferred embodiment, the compression stress in the bottom of the forming structure is between 1.75 and 2.5 times the compressive stress in the top of the forming structure. The bottom of the forming structure, which has greater resistance to thermal creep than the top of the forming structure, is deformed longitudinally by thermal creep the same magnitude as the top of the forming structure. Consequently, any deformation of the forming structure that results from thermal creep has a minimal effect on a thickness variation of the glass sheet.

An additional embodiment, which may be used with a prior art apparatus, periodically adjusts the inlet end adjustment screw (424) to compensate for changes in the sealing force (429) as the forming structure deforms longitudinally by thermal creep during the production campaign. The torque on the adjustment screw (424) may also be monitored; however, the friction will degrade the accuracy of torque as an indicator of the sealing force (429) actually applied to the forming structure (9). This embodiment of the invention is counter intuitive as adjusting the adjustment screw (424) in a direction to reduce the integrity of the glass seal between the inlet pipe (8) and the forming structure (9) will make operating personnel nervous.

Effects of Surface Tension on the Sheet

In an alternative embodiment of the invention, the width and the angle of the inverted slope of the forming wedge may be changed to alter the effect of surface tension and body forces on the narrowing of the sheet. In addition, the width and the inverted slope angle may be increased to make the structure stiffer and thus more resistant to thermal creep.

FIGS. 21A through 21G show the prior art shape of the forming structure. The cross-section of the wedge shaped portion, FIGS. 21C through 21G, is uniform over the entire usable length of the forming structure. The width of the forming structure (211) and the angle of the inverted slope (210) are identical at each section. As the molten glass (10) flows down the vertical portion (211) of the forming wedge (9), the surface tension and body forces have a minimal effect on the sheet width (212), whereas, when the molten glass (10) flows vertically down the inverted slope portion (210) of the forming wedge, the surface tension and body forces act to make the sheet narrower (213).

FIGS. 22A through 22G show an identical width of the forming structure (211) over its entire length, whereas the angle of the inverted slope (210) is the same in the center of the forming structure (FIGS. 21D-21F) and the angle of the inverted slope (220) at each end is reduced. This reduced inverted slope (220) has a counterbalancing effect on the surface tension and body force stresses and thus reduces the narrowing of the sheet (223).

FIGS. 23A through 23G show the width of the forming structure (211) and the angle of the inverted slope (210) being the same in the center of the forming structure (FIGS. 21D through 21F and FIGS. 22D through 22F), whereas the width of the forming structure (231) and the angle of the inverted slope (230) at each end are reduced. This reduced width (231) and inverted slope (230) have a counterbalancing effect on the surface tension and body force stresses over the effect of FIGS. 22A through 22G and thus further reduces the narrowing of the sheet (233).

Figure 24B:
FIG. 24B shows a top view of FIG. 24A.
Figure 24C:
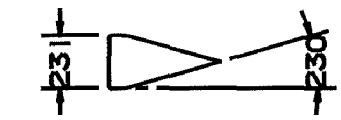
FIG. 24C shows a cross-section of the forming structure design shown in FIG. 24A across lines C-C.
Figure 24D:
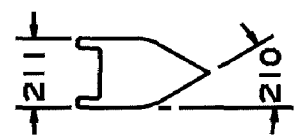
FIG. 24D shows a cross-section of the forming structure design shown in FIG. 24A across lines D-D.
Figure 24E:
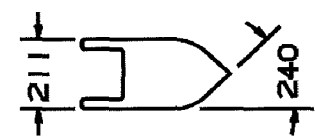
FIG. 24E shows a cross-section of the forming structure design shown in FIG. 24A across lines E-E.
Figure 24F:
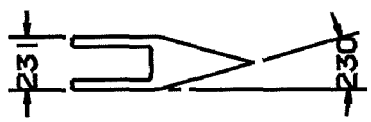
FIG. 24F shows a cross-section of the forming structure design shown in FIG. 24A across lines F-F.
Figure 24G:
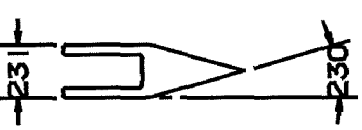
FIG. 24G shows a cross-section of the forming structure design shown in FIG. 24A across lines G-G.
Figure 24A:
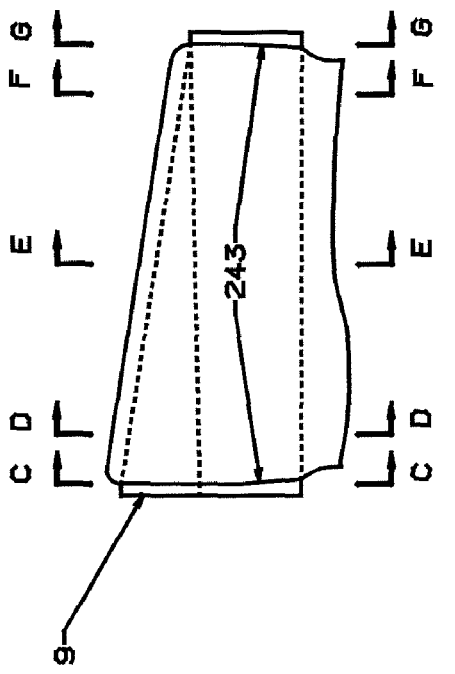
FIG. 24A shows an alternate embodiment of the present invention with the potential for increased structural stiffness.
Figure 27E:
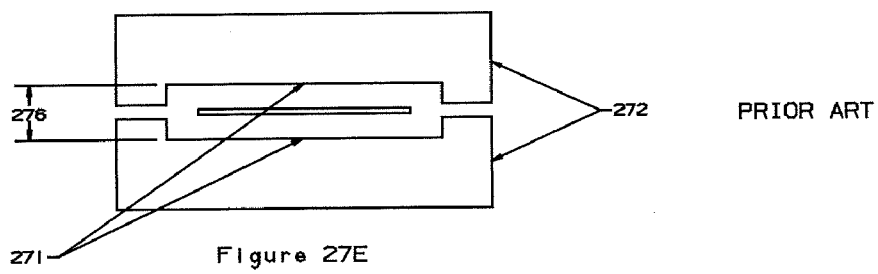
FIG. 27E shows a section view through section E-E of FIG. 27A which represents the prior art shape of the movable bottom doors.
Figure 27D:
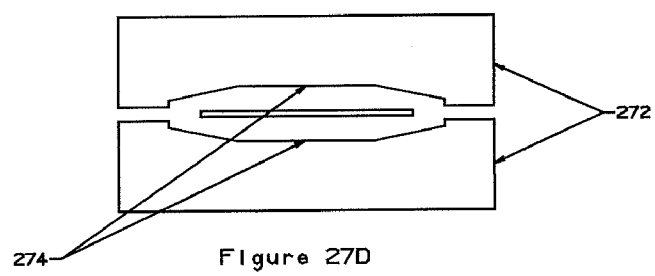
FIG. 27D shows a section view through section D-D of FIG. 27A in a preferred embodiment of the present invention.
Figure 27C:
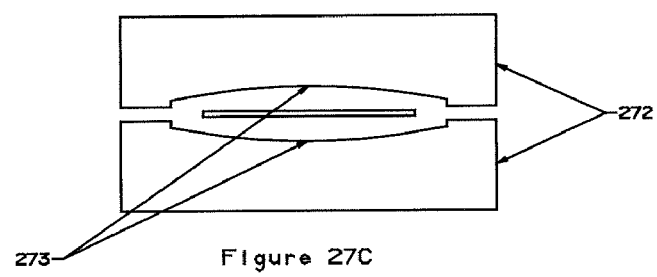
FIG. 27C shows a section view through section C-C of FIG. 27A in a preferred embodiment of the present invention.
Figures 27A, 27B:
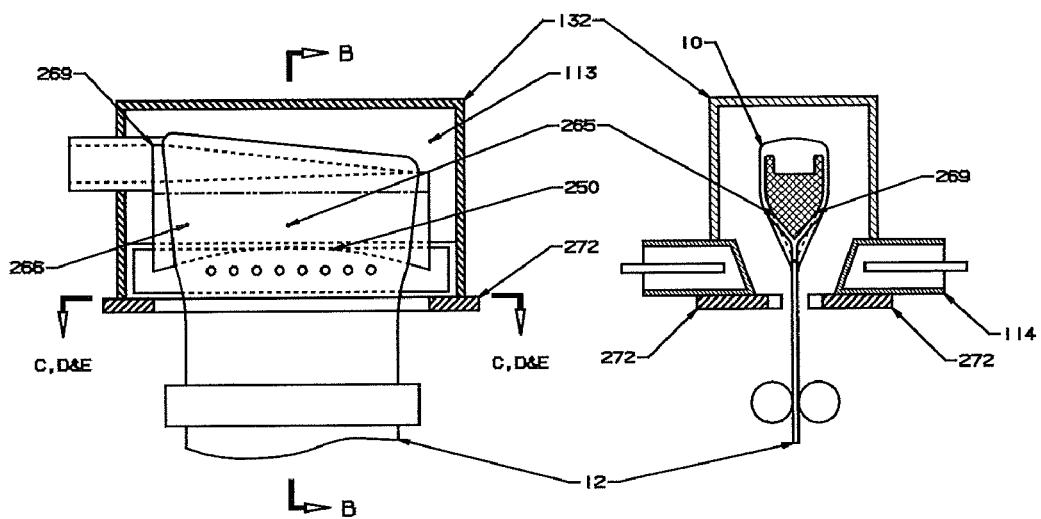
FIG. 27A shows the forming structure of FIGS. 25A through 25D contained in the heating chamber of a muffle with movable bottom doors at its bottom to control radiation heat loss.
FIG. 27B shows a section view through section B-B of FIG. 27A.
Figures 28A, 28B:
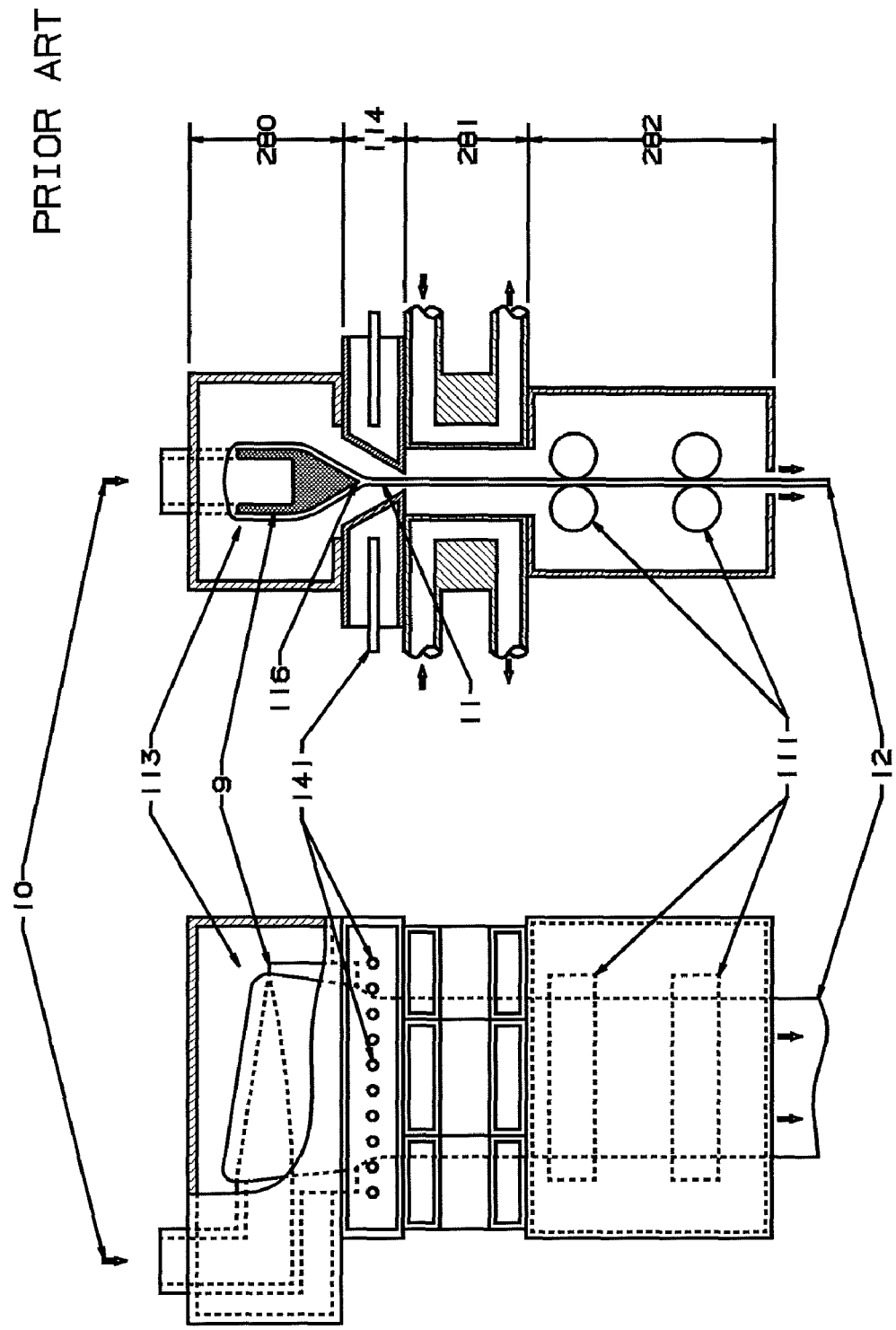
FIG. 28A illustrates the cooling process in "The Overflow Process" glass sheet forming system as known in the prior art.
FIG. 28B shows a section of FIG. 28A.

FIGS. 24A through 24G show another embodiment of this invention, where the width of the forming structure (211) and (231) and the angle of the inverted slope (210) and (230) are the same as in the embodiment of FIGS. 23A through 23G except that the angle of the inverted slope (240) at the center of the forming structure, FIG. 24E is substantially greater than the other inverted slopes (210) and (230). This greater angle increases the section modulus of the structure making it stiffer and thus less prone to thermal creep. Keeping the configuration of the ends the same as FIGS. 23A through 23G has substantially the same effect on the surface tension and body force stresses as FIGS. 23A through 23G and thus has little effect on the narrowing of the sheet (243).

Producing a Flat Sheet

U.S. Pat. No. 3,338,696 considers only the glass flow in the forming structure and assumes that the drawn glass from the bottom of the forming structure will be of uniform thickness and flatness because of the uniform thickness of the flow of glass to the critical point of solidification. In practice, glass must be preferentially cooled across its width to create forming stresses during solidification that create a flat sheet. The present invention alters the forming stresses and cooling distribution such that the formed sheet is inherently flat.

FIGS. 25A through 25D show an embodiment of this invention where the shape of the root (116) of the forming wedge (259) is not straight but continuously curved convex upward (250) in the shape of a parabola. This causes the glass that is drawn from the center of the forming wedge (251) to cool faster than the glass drawn from each edge (252) of the forming wedge. This imposes stress on the partially solidified glass (251) in the center of the sheet to cause the sheet to be flatter, having less warp.

The vertical dimension (257) of the parabola varies between 1% and 10% of the horizontal length (258) of the glass covering the forming structure (259), with a preferred range of 3% to 5%. The angle of the inverted slope of the forming wedge at the inflow end and at the far end (254) of the forming structure (259) is the same as the angle of the inverted slope (255) at the center of the forming structure (259).

FIGS. 26A through 26D show another embodiment of this invention where the shape of the root (116) of the forming wedge (269) is a continuously curved convex upward (250) parabola as in FIGS. 25A through 25D, but where the angle (264) of the inverted slope of the forming wedge at the inflow end and at the far end of the forming structure (269) is substantially less than the angle of the inverted slope at the center of the forming structure (269). FIG. 26A shows the parting line (263) that defines the break point where the top edge of the inverted slope starts is horizontal, whereas FIG. 25A shows the parting line (253) that defines the break point where the top edge of the inverted slope starts is parabolically curved.

The equation for the viscous force in glass flow is:

$$F=\mu*dv/dx=\mu*dv/dz*dz/dx \quad (1)$$

Where:
F=a viscous force
μ=absolute viscosity
v=velocity

Differentiating the equation that describes the force change is $$dF=\mu*d(dv/dx)+(dv/dx)*d\mu \quad (2)$$

The equation for a parabola is:

$$z=k*x^2 \quad (3)$$

where:
z=the vertical axis
x=the horizontal axis
k=constant of proportionality

The derivative of z with respect to x is:

$$dz/dx=2*k*x \quad (4)$$

Combining equations (1) and (4)

$$F=\mu*dv/dz*2*k*x \quad (5)$$

Differentiating with respect to x and combining $$dF/dx=2*k*(\mu*x*d(dv/dz)/dx+x*(dv/dz)*d\mu/dx+\mu*dv/dz) \quad (6)$$

If μ is constant and dv/dz is small with respect to x then $$dF/dx\approx 2*k*\mu*dv/dz \quad (7)$$

Equation 4 shows that the shape change of a parabola with respect to x is a constant. Equation 7 shows that the change in force with respect to x is substantially constant if we can control the longitudinal temperature distribution (x direction). Comparing the form of equation (7) with the form of equation (4), it is seen that the use of a parabolic shape is consistent with the equations of fluid flow.

Referring to FIG. 27A through 27E, from equation (2) and the assumptions for equation (7) the control of the glass temperature distribution in the zone at the root (116) of the forming structures (259) and (269) where the glass sheet is formed is critical. The change in the glass viscosity (dµ) is a strong function of the glass temperature at different locations in the formed glass sheet. In FIGS. 25A and 26A this is the comparative temperatures at locations (251) and (252). The process temperature at weirs (115) at the top of the forming structures (259), and (269) is higher than the temperature at the root (116). FIG. 39D shows a typical temperature difference of 50 degrees centigrade which is typical of a prior art shaped forming structure (9). The end sections (256) and (266) of the forming structures (259) and (269), respectively, extend lower into the forming zone than the center section (255) and (265), and therefore may be subject to greater heat loss. A large amount of the heat lost from the end sections (256) and (266) and center sections (255) and (265) is by radiation out of the bottom of the forming chamber (113) through the opening provided by the edges (271), (273), and (274) in the bottom doors (272). In the prior art (FIG. 27E), these doors (272) have a straight interior edge (271) and are moved laterally in and out to control the radiation heat loss by making the gap (276) between the doors smaller or larger. In a preferred embodiment of this invention the interior edges (273) of the doors are shaped parabolically (273) to control the relative heat loss from the end sections (256) and (266) and center section (255) and (265) of the forming structures (259) and (269). In another preferred embodiment, the interior edges (274) of the doors are shaped in a series of straight sections (274) to control the relative heat loss from the end sections (256) and (266) and center section (255) and (265) of the forming structures (259) and (269). The exact shape of the interior edges (273) and (274) is preferably determined by heat transfer analysis and/or experiment.

In the above paragraph it was assumed that the longitudinal temperature distribution at the root (250) should be a constant to comply with equation (7). In another preferred embodiment, it is desirable to have the temperature at the ends (252) of the formed sheet be lower than the temperature at the center of the formed sheet (251). This scenario would produce a longitudinal force distribution per equation (6).

The shaping of the interior edges (271), (273), and (274) to control the radiation heat loss from the bottom sections of the forming structure (9) is not restricted to forming structures with a continuously curved convex upward (250) parabolic shape, but may be used with any shape forming structure (9) where the longitudinal control of radiation heat loss is required.

Reducing Air Leakage

U.S. Pat. No. 3,338,696 relies primarily on careful design and matching of materials to prevent any material cracks and openings. These cracks and openings are the sources of air leakage for both initial operation and for operation during the course of a manufacturing campaign. This embodiment of the invention provides individual pressure balancing technology such that even if a leakage path exists at start-up or develops during operation, a minimum quantity of air will flow through the leakage paths.

The glass sheet is formed by drawing the glass from the bottom of the overflow forming structure. The molten glass is cooled and is solidified in a carefully controlled manner. The most desirable cooling phenomenon is radiation, which cools the glass substantially evenly through its entire thickness. Convective cooling, which cools primarily the glass surface, is also a factor. The convective cooling must be precisely controlled as when it is excessive, it has a destabilizing effect on the drawing process. The observed destabilizing phenomenon is a cyclic variation in sheet thickness as the sheet is drawn. This is termed "pumping" and is a phenomenon noted in virtually all glass downdraw processes.

The operating temperature of the forming zone of "The Overflow Process" is typically 1250° C. and is at the top of a chamber with an open bottom, typically 3 meters high, containing an atmosphere of hot air. Because of the approximately 3 meter column of high temperature air, the atmosphere in the zone where the sheet is formed has a pressure higher than the pressure outside of the forming apparatus. Therefore, any crack or opening creates an airflow path whereby air flows into the open bottom of the chamber, up the chamber, and out the cracks or openings. When this leakage path is such that it substantially increases the convective cooling in the forming zone at the root (116) of the forming structure (9), a cyclic variation in the sheet thickness (pumping) is produced.

For air to flow through an opening there must be a difference in pressure from one side of the opening to the other. This invention involves adjusting the internal pressure in each of the major components of the forming apparatus such that the pressure difference across any leakage path to the forming zone approaches zero. Therefore, if an opening either exists or develops, little or no air leakage will occur as there is negligible differential pressure to force airflow.

Referring now to FIGS. 28A through 32B, FIGS. 28A and 28B show cooling of the glass as it transitions from the molten state to the solid state. This process must be carefully controlled. This cooling process starts on the lower part of the foaming apparatus (9) just above the root (116), in the muffle zone (280), continues as the molten glass sheet (11) passes through the muffle door zone (114), and is substantially solidified by the time it leaves the transition zone (281). The controlled cooling process continues in the annealer and pulling machine zone (282) to relieve internal stress in the solidified glass sheet (12).

Four embodiments for controlling forming chamber pressure differentials are shown in FIGS. 29A through 32B. These are a) adding flow to pressurize, b) restricting outflow, c) flowing to a vacuum, and d) encasement by a pressurizing chamber, respectively. Any of these control methods may be used to control the pressure in the muffle zone (280), the muffle door zone (114), the transition zone (281), or the annealing and pulling machine zone (282) depending on unique design requirements. An important objective, however, is to equalize the pressure on each side of the membrane separating either the factory atmosphere or a heating zone or a cooling zone from the forming chamber. This invention also applies to implementations of "The Overflow Process" where the gas in the forming chamber is a gas other than air, i.e. nitrogen, etc.

Figures 29A, 29B:
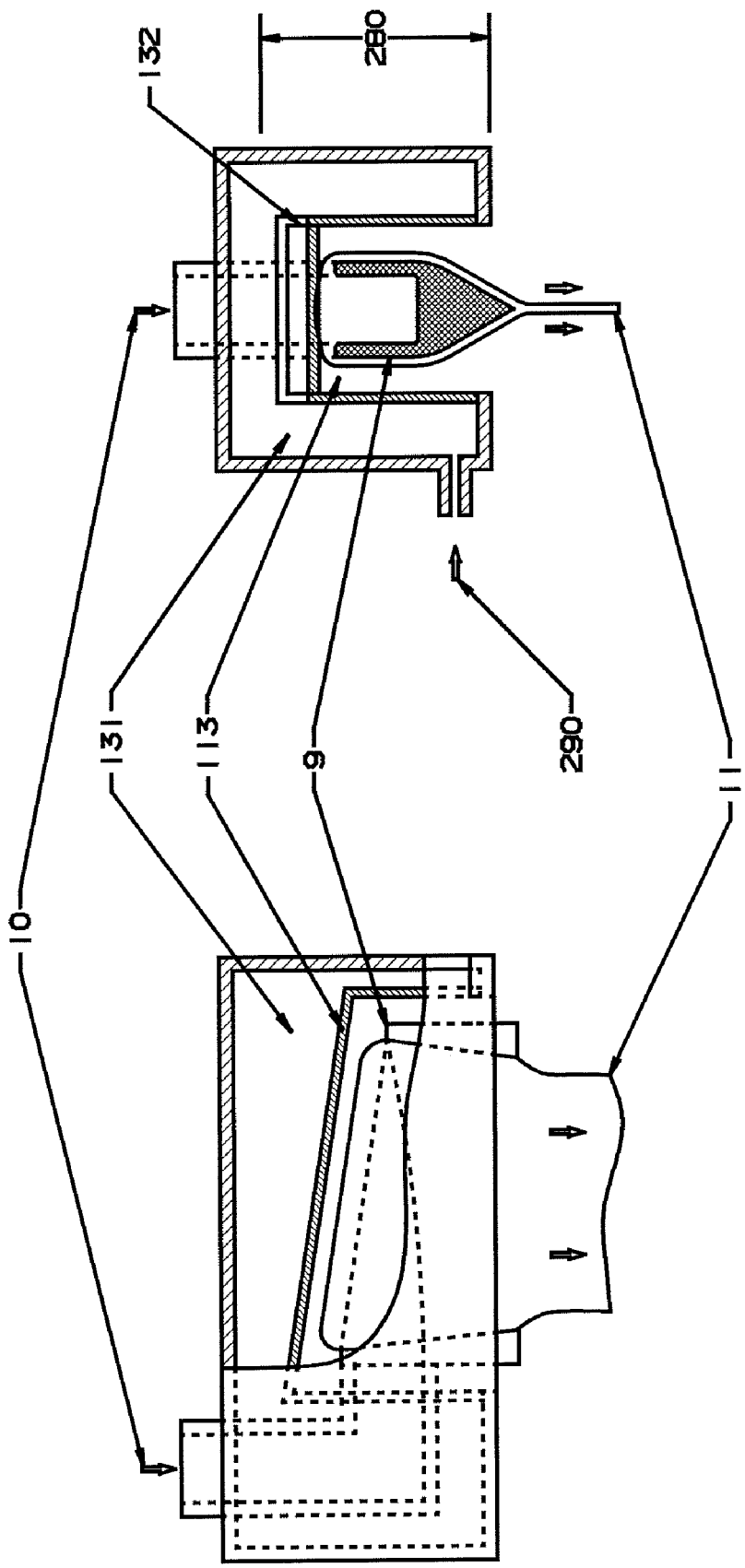
FIG. 29A shows how the pressure in the muffle zone may be controlled to minimize leakage in a preferred embodiment of the present invention.
FIG. 29B shows a section of FIG. 29A.

More specifically, FIGS. 29A and 29B show an embodiment of the muffle zone (280) which shows air (290), which is preferably preheated, introduced into the muffle heating chamber (131) to make the pressure in the heating chamber (131) equal to that in the adjacent forming chamber (113). The wall (132) separating the two chambers in the muffle is normally constructed of many pieces and is therefore susceptible to random leaks. Equalizing the pressure between the two chambers minimizes the leakage flow.

Figures 30A, 30B:
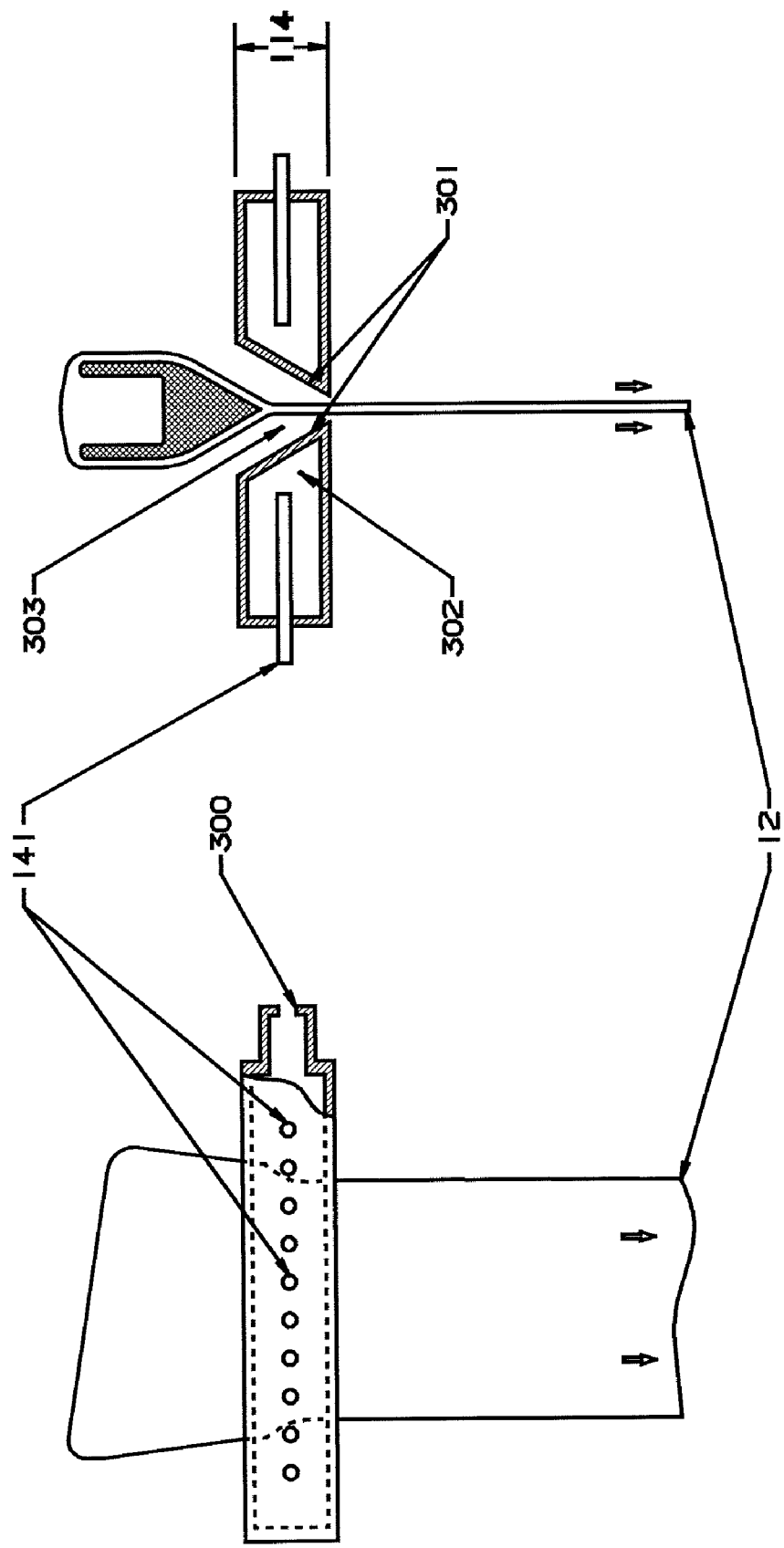
FIG. 30A shows how the pressure in the muffle door zone may be controlled to minimize leakage in a preferred embodiment of the present invention.
FIG. 30B shows a section of FIG. 30A.

FIGS. 30A and 30B show an embodiment of the muffle door zone (114), which includes an exit restriction (300) to the flow of air exiting each muffle door (301). The size of this restriction is varied to maintain the air pressure inside the muffle door chamber (302) equal to the air pressure in the adjacent forming chamber (303). The flow of air into the muffle doors (301) through the cooling tubes (141) would normally be adequate to overcome any leakage paths and thus raise the internal pressure in the muffle door chamber (302) to the pressure of the adjacent forming chamber (303).

Referring to FIGS. 51, 52, and 53, another way to minimize the leakage from the muffle doors (301) through any joints or cracks is to precisely control the cooling air mass flow into (511) and out of (517) the muffle door chamber (302). FIG. 51 shows one embodiment of this invention where the device (512) controls the cooling air mass flow (511) into the muffle door chamber (302) and the device (516) controls the cooling air mass flow (512) out of the muffle door chamber (302). The total cooling air mass flow (511) into the muffle door (301) is regulated by measurement and the control device (512) as it flows to the individual flow adjusters (513), which proportion the cooling flow among the individual cooling tubes (141), which are described in U.S. Pat. No. 3,682,609, incorporated herein by reference. The cooling air exits the muffle door (301) through multiple exits (514) into the manifold (515) into the measurement and control device (516), which regulates the exiting of cooling air mass flow (517). In this embodiment, the cooling air mass flow into (511) and the cooling air mass flow out of (512) the muffle door (301) are regulated to the same value, therefore, there is no net air leakage from cracks and joints in the muffle door (301). If all the leakage paths external to the muffle door (301) are sealed, then there is no leakage from the front (518) of the muffle door (301) into the internal chambers (113) of the forming apparatus. An additional feature of this embodiment is that the total cooling air mass flow is controlled to a constant value, which in turn stabilizes the energy loss in the muffle door zone (114).

In another embodiment, the device (512) measures the cooling air mass flow (511) into the muffle door (301) and the device (516) measures the air mass flow out of (517) the muffle door (301) and controls the air mass flow out (517) to a value equal to the air mass flow in (511) as measured by the device (512). The settings of the individual flow adjusters (513) determine the cooling air mass flow rate (511).

In another embodiment, each individual flow adjuster acts as a measurement and control device (523) whereby the sum of the measurements equal the cooling air mass flow (511) into the muffle door (301). The device (516) measures the air mass flow out of (517) the muffle door (301) and controls the air mass flow out (517) to a value equal to the air mass flow in (511) as determined by the sum of the measurements of devices (523).

Figures 31A, 31B:
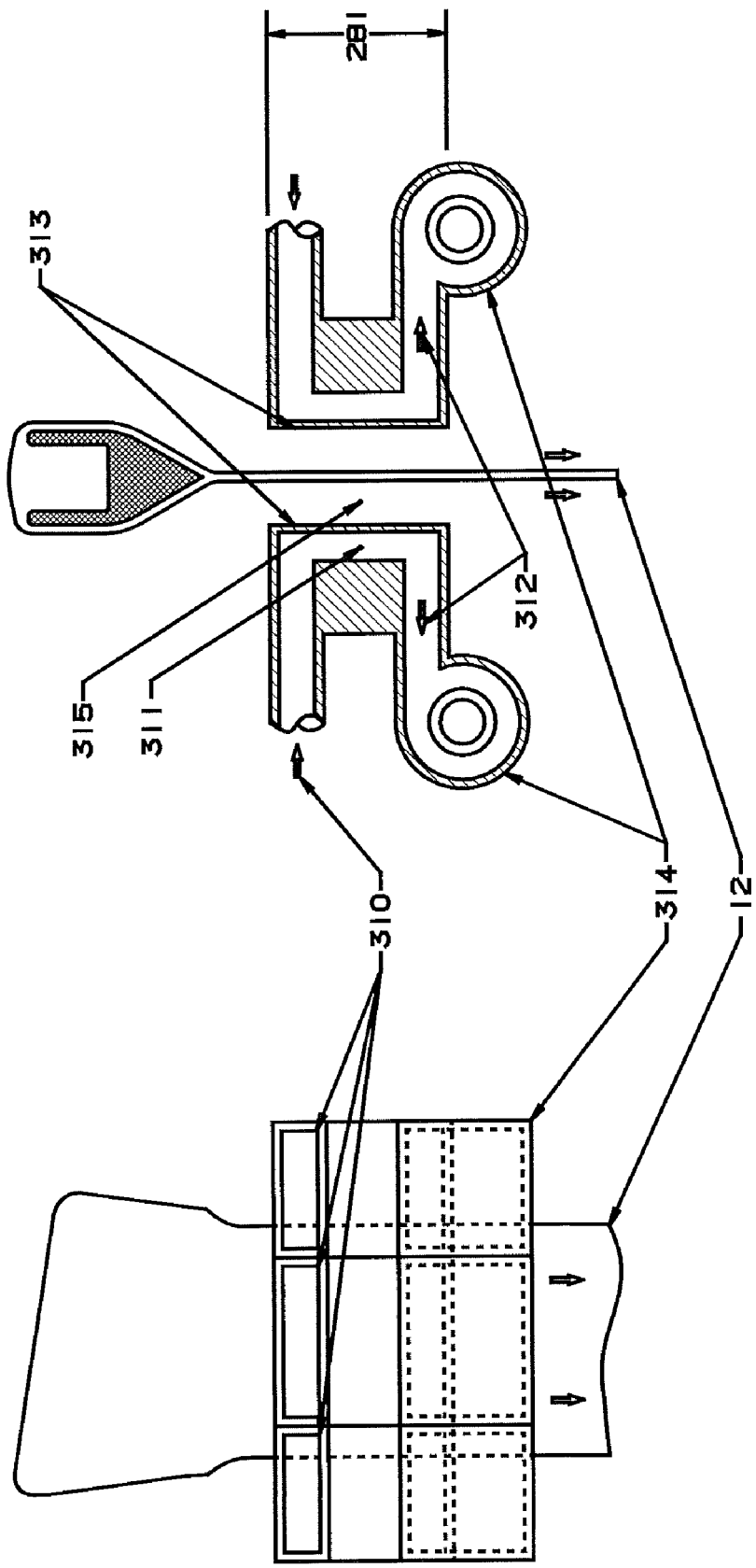
FIG. 31A shows how the pressure in the transition zone may be controlled to minimize leakage in a preferred embodiment of the present invention.
FIG. 31B shows a section of FIG. 31A.

FIGS. 31A and 31B show an embodiment of the transition zone (281), which has the cooling air at elevated pressure (310) entering the cooling chamber (311) and exiting (312) each of the transition coolers (313) into a regulated vacuum source (314). The large volume of air required for cooling in the transition zone would normally raise the pressure in the transition cooling chamber (311) above that of the adjacent forming chamber (315). A vacuum source (314) is therefore required to lower the pressure and is adjusted to equalize the pressure in the transition cooling chamber (311) to the pressure in the adjacent forming chamber (315).

FIGS. 32A and 32B show an embodiment of the annealer and pulling machine zone (282), which includes a pair of pressure balancing chambers (320) on each end of the annealer and pulling machine (282). The pressure in the balancing chamber (321) is adjusted to be equal to the pressure in the annealing chamber (322). A chamber at each end was chosen because the bearings and adjustment mechanisms for the pulling rollers (111) are on the ends. Alternate configurations would be one single pressure balancing chamber (320) encasing the entire annealer and pulling machine (282) or a multitude of individual pressure balancing chambers (320) as would be required by particular design considerations.

Control of Convective Cooling

Referring back to FIGS. 51 through 53, the convective cooling in the muffle door zone (114) is controlled by accurate control of the cooling air flow into (511) and out of ((517) and (527)) the muffle door (301). The cooling of the glass as it is formed into a sheet at the root (116) of the forming structure (9) is dominantly by radiation to the front surfaces (518) of the muffle doors (301) in the muffle door zone (114). The temperature of the front surface (518) of the muffle door (301) is regulated primarily by the total cooling air mass flow (511). There is also forced convective cooling of the glass in the muffle door zone (114) if there is air flow from the muffle chamber (113) to the transition zone (281).

FIG. 52 shows a muffle door (301) with multiple vent openings (529) on the top surfaces. These vent openings (529) are open to the muffle chamber (113) to provide air flow (528) for forced convective cooling of the glass in the muffle door zone (114). The cooling air mass flow (511) into the muffle (301) is measured and regulated by individual flow adjusters (523), which direct cooling air to the front surface (518) of the muffle door (301). The cooling air exits the muffle door (301) though multiple measurement and control devices (526) which regulate the exiting mass flow of cooling air (527). The convective cooling air mass flow (528) exiting the muffle door is equal to the difference between the cooling air mass flow into (511) and the cooling air mass flow out of (527) the muffle door (301). The convective cooling air mass flow (528) enters the forming apparatus chamber (113) through the vent openings (529) and exits downward through the muffle door zone (114), providing a controlled quantity of forced convective cooling to the molten glass (10) that is being formed into a sheet (111) at the root (116) of the forming structure (9). As noted earlier in this text, an excessive quantity of forced convective cooling may cause the glass flow rate to cycle ("pumping") causing sheet thickness variation. An additional feature of this embodiment is that the total cooling air mass flow is controlled to a constant value, which in turn stabilizes the energy loss in the muffle door zone (114).

In another embodiment of this invention, the device (512) measures and regulates the cooling air mass flow (511) into the muffle door (301) and the device (516) measures the air mass flow out of (517) the muffle door (301) and controls the air mass flow out (517) to a value equal to the air mass flow in (511) as measured by the device (512) minus the desired forced convective cooling air mass flow (528).

The vent openings (529) between the muffle chamber (302) and the chamber containing the sheet forming structure (113) must be large enough to substantially equalize the pressure between the two chambers such that no air leaks through cracks and openings between the muffle door chamber (302) and the glass flowing off the root (116) of the wedged shaped sheet forming structure (9).

Compensation for Nonlinear Thermal Creep of Refractory

The refractory materials from which the forming structure (9) and its support structure are made have high strength in compression and low strength in tension. Like most structural materials they also change shape when stressed at high temperatures. Recently available information from U.S. Pat. No. 6,974,786, issued Dec. 13, 2005, entitled "SAG CONTROL OF ISOPIPES USED IN MAKING SHEET GLASS BY THE FUSION PROCESS", herein incorporated by reference, defines the thermal creep material characteristics of Zircon. Zircon is the presently preferred material for the construction of the forming structure. An analysis of how these thermal creep characteristics affect the manufacturing process provided motivation for the present invention.

The present invention includes embodiments that minimize the vertical deformation of the forming structure, whereby the vertical deformation approaches zero. This produces higher yield and delays termination of the production run for replacement of the forming structure.

FIGS. 33A-33D illustrates the principle parts of a typical "Overflow Process" manufacturing system. The molten glass (10) from the melting furnace and forehearth, which must be of substantially uniform temperature and chemical composition, enters the forming apparatus and flows into the sheet forming structure (9). The glass sheet forming apparatus, which is described in detail in both U.S. Pat. No. 3,338,696 and in the applicant's U.S. Pat. Nos. 6,748,765, 6,889,526, 6,895,782, 6,990,834, and 6,997,017 and patent application Ser. Nos. 11/006,251, 11/060,139 and 11/184,212, is a wedge shaped forming structure (9). These patents and patent applications are incorporated herein by reference. Straight sloped weirs (115) substantially parallel with the pointed edge of the wedge (116) form each side of the trough (129) in the forming structure (9). The trough bottom (117) and the sides (118) of the trough (129) are contoured in a manner to provide even distribution of glass to the top of each side weir (115). The glass then flows over the top of each side weir (115), down each side of the wedge shaped forming structure (9), and joins at the root (116) to form a sheet of molten glass. The molten glass is then cooled as it is pulled off the root (116) to form a solid glass sheet (11) of substantially uniform thickness.

The usable width (331) of the formed sheet (11) is on the order of 70 percent of the longitudinal length of the root (116) of the forming structure (9) and is formed from the glass that flows over the middle region (337) of the weirs (115). The glass flowing over the inlet end region (336) and the far end region (338) of the forming structure (9) form the unusable end portions (334) and (335) of the formed sheet. It is therefore most important that the middle region (337) of the forming structure (9) be maintained as a uniform shape during the duration of the production campaign such that the thickness in the saleable portion of the sheet be of constant thickness.

FIGS. 34A through 34D illustrate the typical effects of thermal creep on the shape of the forming structure when different compression forces are imparted to the bottom section of the forming structure (9) near the root (116). FIG. 34A shows that, with no compression loading, the forming structure (9) sags in the middle such that the top of the weirs (115) and the root (116) are now curved (171) and the trough bottom (117) has a change in curvature (171). This curvature (171) causes the molten glass (10) to no longer flow with constant thickness (172) over the weirs (115). More specifically, the curvature (171) allows more glass to flow over the middle region (337) of the weirs (115) resulting in an uneven sheet thickness distribution. The forming structure (9) has an initial length (346) as defined by the phantom lines (344) and (349). With no external loading the weirs (115) get shorter and the root (116) gets longer. At the neutral axis (341) the length of the forming structure (9) does not change. The neutral axis (341), as used herein, defines the horizontal plane in the forming structure where there is no longitudinal deformation when the forming structure (9) deforms under its own weight with no external forces. The neutral axis (341), as used herein, also differentiates between the top section and the bottom section of the forming structure (9); the top section or the upper section of the forming structure (9) being vertically above the neutral axis (341) and the bottom section or lower section being vertically below the neutral axis (341).

FIG. 34B shows that sagging of the forming structure is minimized under the optimum compression loading (345) of the lower section of the forming structure (9) near the root (116). With optimal loading, both the weirs (115) and the root (116) deform (shorten) to approximately the same length (347). FIG. 34C shows that if too much load (342) is applied to the lower section of the forming structure (9) near the root (116), the root (116) is compressed excessively, thus producing a convex upward shape (342) to the trough weirs (115), the trough bottom (117), and the root (116). The root (116) deforms considerably more than the weirs (115) as can be seen by the movement relative to the phantom lines (344) and (349). FIGS. 34A through 34C represent the effect of thermal creep over the same time period. FIG. 34D shows a forming structure (9), which has deformed a greater amount to length (348). This increased deformation is caused by imparting the correct load (345) for the increased time of a substantially longer production campaign. Referring back to FIG. 33, this increased deformation has an adverse effect on the usable width (331) of the manufactured sheet as the usable sheet width (331) is a function of the width of the middle region (337) of the forming structure. The longitudinal deformation of the top of the middle region (337) must be substantially equal to the longitudinal deformation of the bottom of the middle region (337) in order that the middle region maintain its shape, thus producing a usable width (331) manufactured sheet (11) of uniform thickness. This increased deformation, over an extended period of time, may eventually cause termination of the production campaign because the usable sheet width (331) is not adequate.

Figure 35:
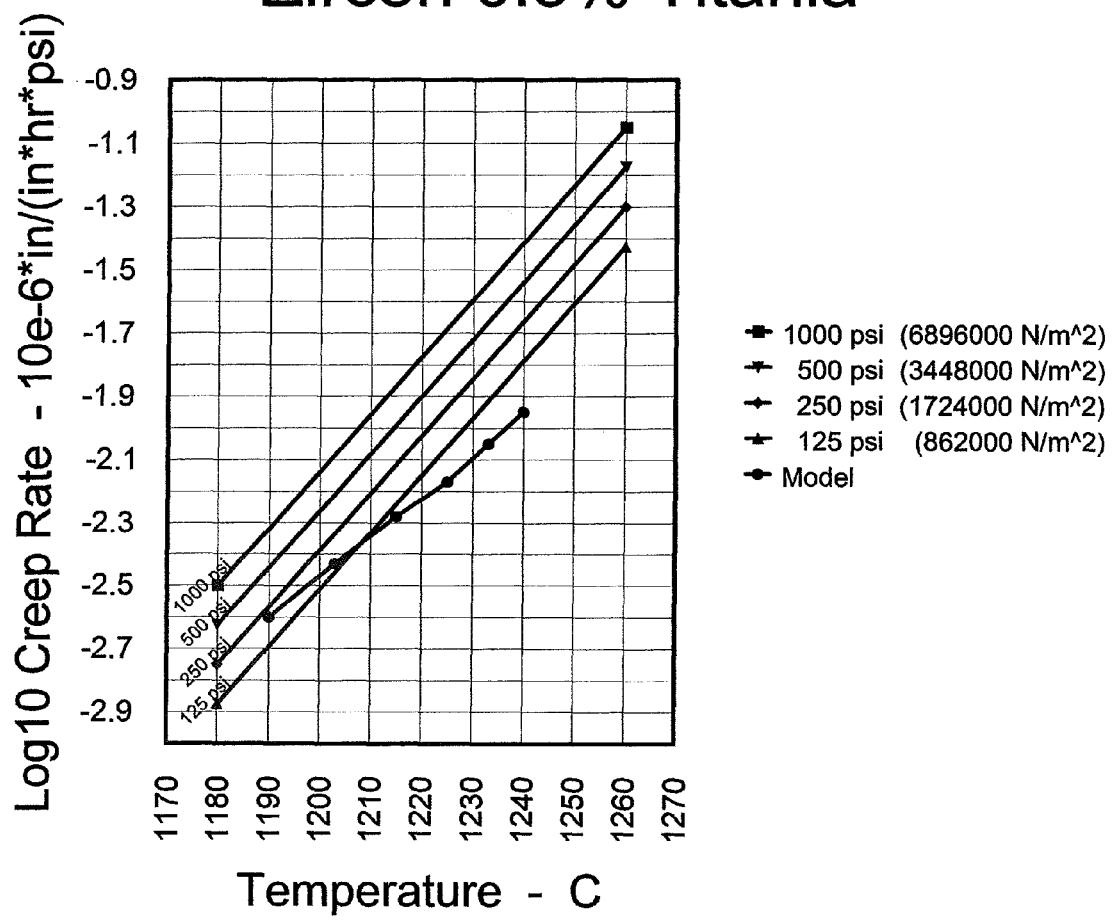
FIG. 35 is a graph of the thermal creep material characteristics of the refractory material used in the forming structure.

The present invention recognizes the highly nonlinear characteristic of the thermal creep of the refractory material used for the construction of the forming structure. The present preferred refractory material for the forming structure is Zircon, whereas in the past other materials such as Alumina have been used for the forming structure refractory. FIG. 35 is a graph of Zircon's thermal creep coefficient as a function of pressure and temperature, as defined by the data of U.S. Pat. No. 6,974,786. To the inventor's knowledge, this data is not available in the general literature. The data in FIG. 35 is derived from FIGS. 2B, 3A, and 3B in U.S. Pat. No. 6,974,786. Since the raw data was not available, the curves of FIG. 35 represent a judgmental fit to the data and therefore, the accuracy is sufficient only to represent trends and not absolute accuracy. Extrapolation of the data was required to get predictions of the thermal creep coefficients in the stress range predicted by the model.

Figure 36:
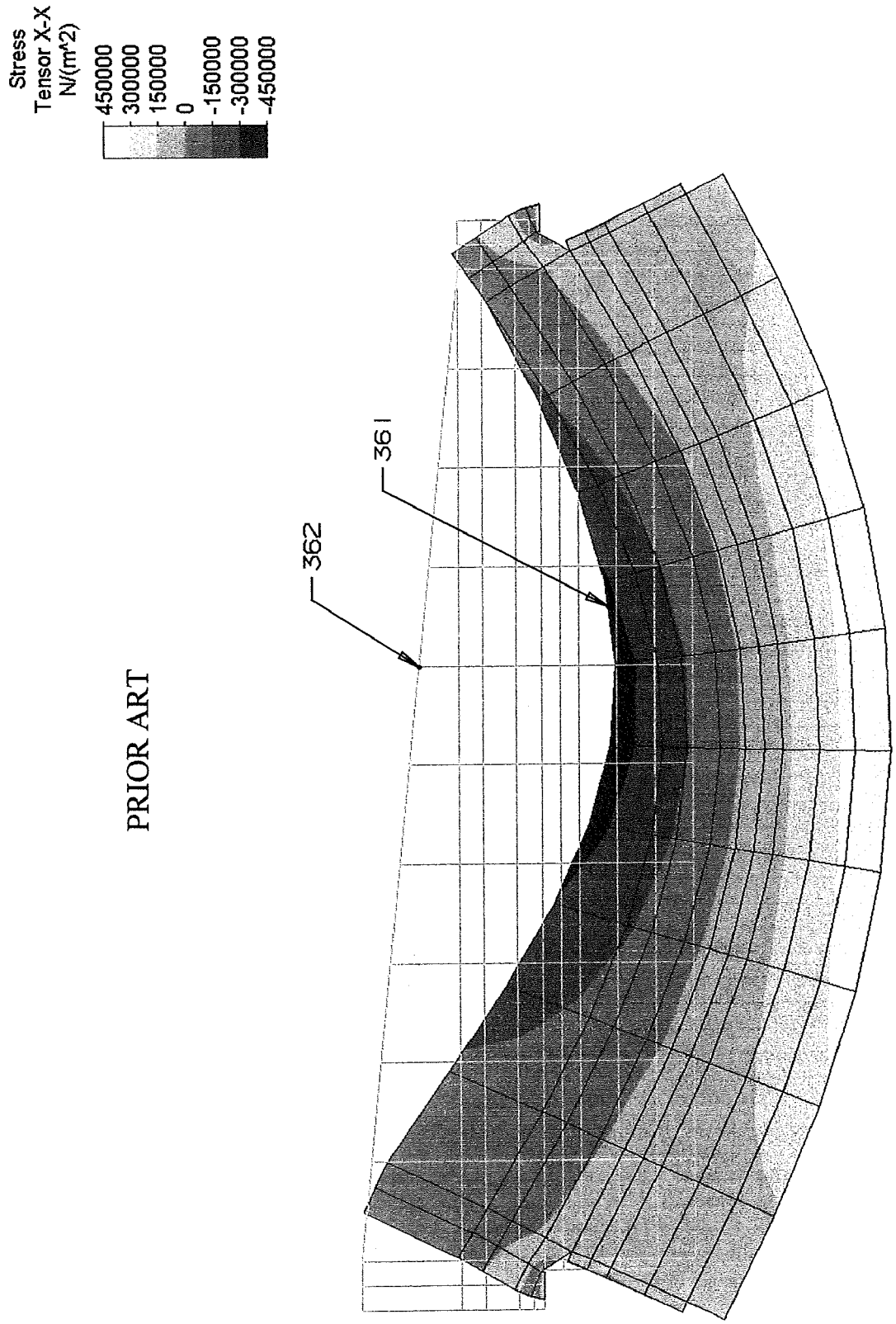
FIG. 36 shows the deformation of the prior art linear FEA of the forming structure deformation with no corrective forces.
Figure 40:
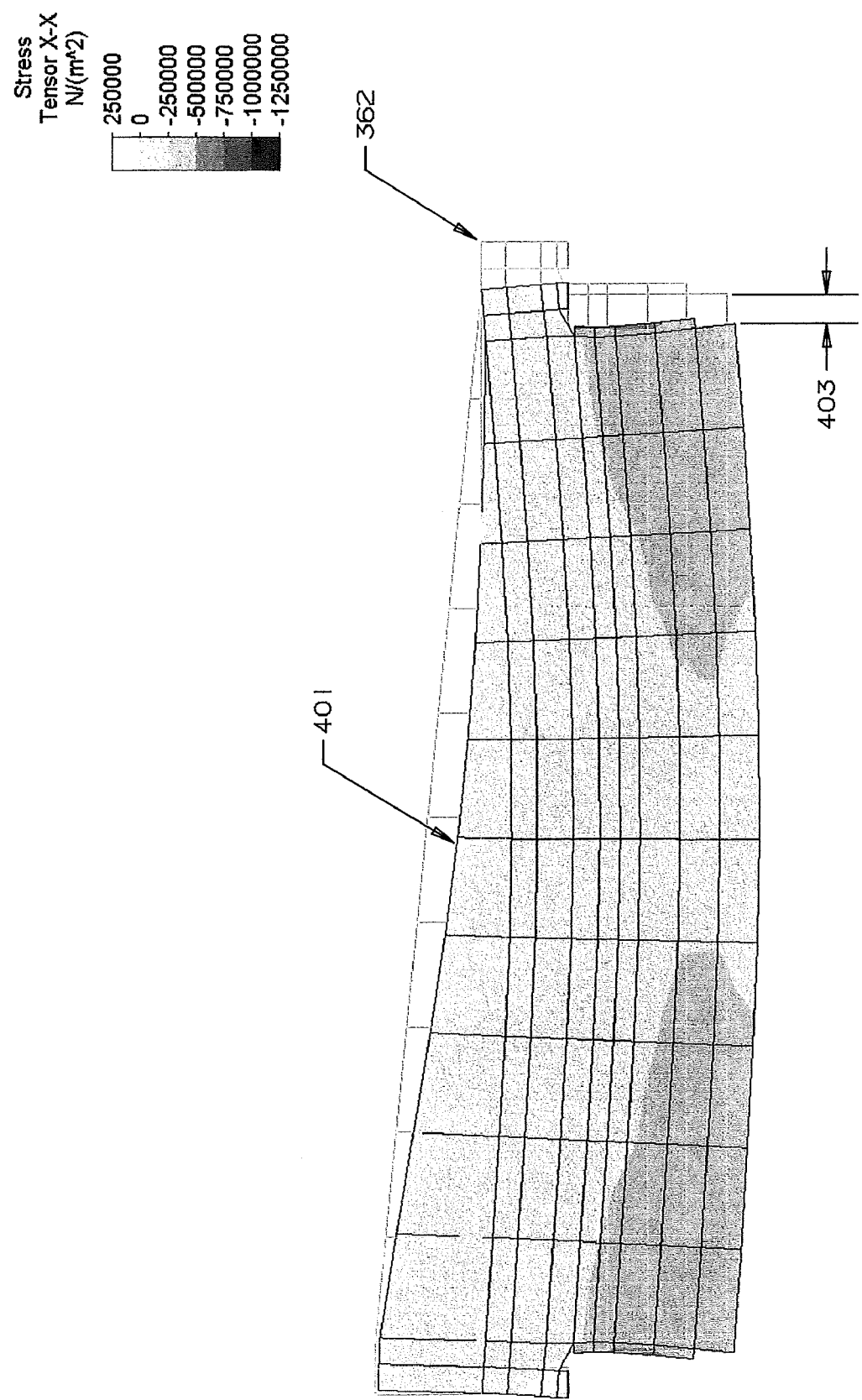
FIG. 40 shows the deformation of nonlinear FEA of the forming structure deformation with corrective forces for virtually no sagging of the forming structure as predicted by linear FEA.
Figure 41:
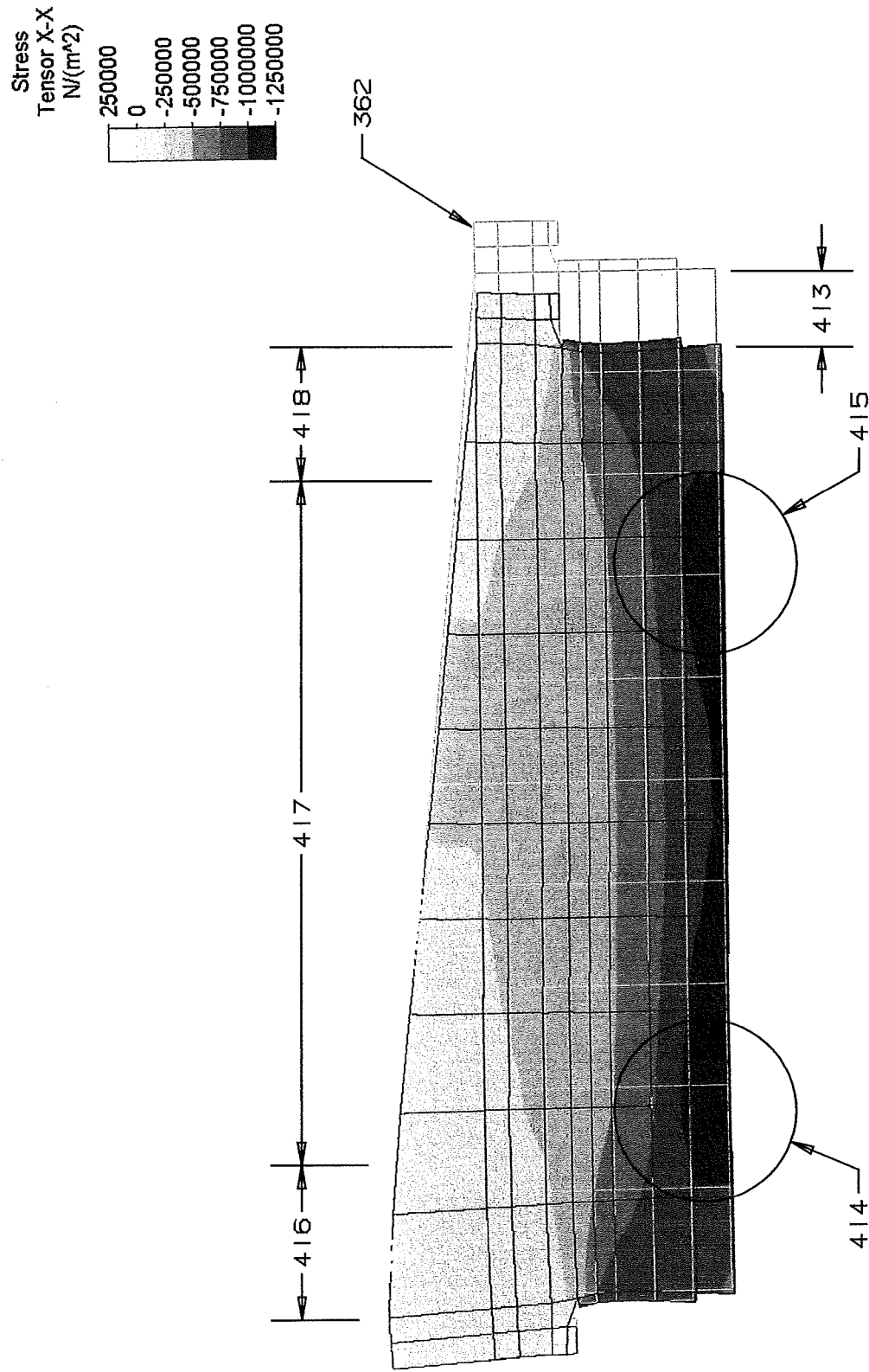
FIG. 41 shows the deformation of nonlinear FEA of the forming structure deformation with corrective forces for virtually no sagging of the forming structure.

FIGS. 36 and 37 show the thermal creep deformation as predicted by the prior art, while the creep deformation as determined by the present invention is shown in FIGS. 40 and 41. These figures are the result of Finite Element Analysis (FEA) models of the various different boundary conditions and material properties and represent expected thermal creep deformations for a manufacturing period of 2 years magnified by a factor of 10. As discussed below, the variables considered in the analysis include the block shape, force loading, density, and thermal creep coefficient/Young's Modulus, but not the weight of the glass. ALGOR® software was used for the Finite Element Analysis.

The FEA grid of the forming structure is shown in FIGS. 39A and 39B. The forming structure is supported vertically at the first end and the second end at (391) and (392) respectively. The forming structure is restrained longitudinally at (393). FIG. 39B shows that a half model was used with symmetry being assumed at the vertical surface (394). The area to which the force is applied as a uniform pressure to the first and second ends is shown in FIGS. 39A and 39C as area (395).

The forming structure (9) modeled was for a forming structure root length of 2.00 meters. The finished dimensions of the refractory block analyzed are 2.20 meters long by 0.66 meters high by 0.20 meters wide. The bottom of the trough in which the glass flows is horizontal and the slope of the weir at the top of the forming structure is minus 5.73 degrees. The included angle of the bottom of the root is 33.4 degrees. To the applicant's knowledge, the dimensions used do not precisely represent actual dimensions used by any particular manufacturer using the overflow process; however, the dimensions are typical of what would be selected by one skilled in the art.

The weight of the glass flowing in and on the forming structure was not included as part of the total load. Including the glass weight would have a minimal effect on the amplitude of the deformation and negligible effort on the shape of the deformation. Including the glass weight would require the forces applied to the lower portions of the ends of the forming structure to be proportionally greater by the weight of the glass. The material density of the forming structure (9) used was 4,000 kg/m^3.

Figure 38:
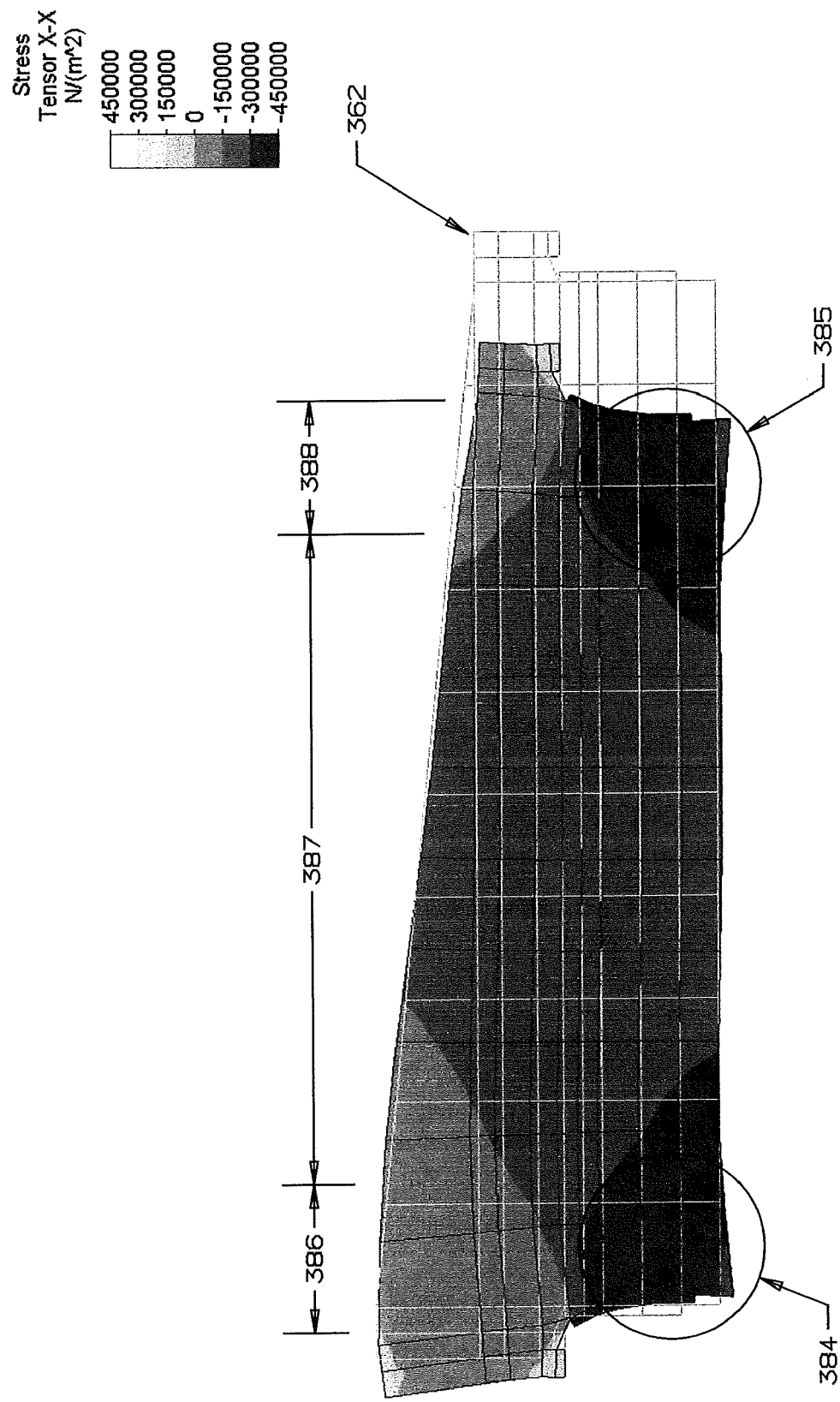
FIG. 38 shows the deformation of the linear FEA of the forming structure deformation with corrective forces for virtually no sagging of the forming structure.

The thermal creep coefficient used for the calculations for FIGS. 36, 37, and 38 was for the condition 250 psi and 1215° C. from FIG. 35. A linear stress finite element analysis program was used to simulate thermal creep, the thermal creep coefficient multiplied by the time interval being analogous to the reciprocal of the Young's Modulus. The value of the thermal creep coefficient used was 2e-8 in/in/hr/psi. The Young's Modulus used to simulate the thermal creep was 11.4e6 psi. A magnification of the results by 40,000 for FIGS. 36, 37, 38, 40, and 41 shows 10 times the deformation that would occur in 2 years. The force applied to the lower portions of the first and second ends was 0 (zero) lb. for FIG. 36, 2,250 lb. for FIG. 37, and 3,195 lb. for FIG. 38.

FIGS. 36, 37, 38, 40, and 41 are graphical results of a FEA. Using FIG. 36 as an example, the shape of the shaded image (361) of the forming structure shows the deformation of the forming structure for the specific boundary conditions for the calculation made for FIG. 36, relative to the undeformed grid (362). The shading corresponds to the longitudinal stress tensor X-X, the magnitude of which is defined in the legend in the upper right corner of the corresponding figure.

FIGS. 36, 37, and 38 are the results of the predicted thermal creep using a linear FEA for the boundary conditions. The contoured shading represents the magnitude of the longitudinal stress tensor for a scale of minus 450,000 to plus 450,000 newtons per square meter.

The shape of the shaded image (361) in FIG. 36 represents 10 times the thermal creep predicted in 2 years using a linear FEA if no compression loading of the lower portion of the forming structure is used. The shape of the shaded image (371) in FIG. 37 represents 10 times the thermal creep predicted in 2 years using a linear FEA if compression loading of the lower portion of the forming structure of U.S. Pat. No. 3,519,411 is used. The shape of the shaded image (381) in FIG. 38 represent 10 times the thermal creep predicted in 2 years using a linear FEA to obtain a substantially straight shape of the top of the forming structure (9) in the middle region (387). Note that the middle region ((387) of the forming structure in FIG. 38) has a substantially straight shape, whereas both the inlet end region (386) and the far end region (388) are slightly curved convex upward. This shape maintains uniform flow over the weirs (115) in the middle region (387) and changed flow over the end region (386) and (388) weirs. The sheet formed has constant thickness in the saleable middle portion, but different thickness and shape in the unusable end portions. The straight shape of the middle portion of the top of the forming structure (9) is preferably obtained by having the deformation or strain in the middle region of the upper portion of the forming structure (9) be substantially equal to the deformation or strain in the middle region of the lower portion of the forming structure (9).

The stress-strain model of the forming structure is that of a short beam. The stress is distributed and cannot be determined in the simple manner of the stress-strain model of a long beam because a short beam has more pronounced end effects than a long beam. The application of the longitudinal compression forces to the lower portions of the forming structure (9) can produce local stress concentrations like at locations (384) and (385) in FIG. 38. These particular stress concentrations are at the points of application of the longitudinal compression forces.

The stress and resulting thermal creep deformation (thermal creep strain) of the forming structure is caused by gravitational forces which produce both the shear forces and the bending moment in the forming structure. The vertical shear forces are caused by support of the forming structure at each end and are greater in the end regions (386) and (388). The bending moment is a maximum in the middle region of the forming structure. The bending moment produces the primary deformation; however, both the shear and the bending moment must be considered in the analysis. Finite Element Analysis (FEM) is the preferred technology for design of the compression loading of the forming structure.

For some forming structure shapes, the specific combination of the shear and the bending moments make it desirable to implement the multiple stage compression force technology of U.S. patent application Ser. No. 11/184,212.

FIG. 39D shows the assumed temperature distribution of the forming structure in the nonlinear model. The top to bottom temperature difference is 50° C. The temperature used may not precisely represent the actual differential experienced by any particular manufacturer using the overflow process; however, the differential is typical of what would be selected by one skilled in the art.

FIGS. 40 and 41 show the thermal creep deformation predicted by varying the material properties in a linear stress FEA in a manner to simulate nonlinear thermal creep. The contoured shading represents the magnitude of the longitudinal stress tensor for a scale of minus 1,250,000 to plus 250,000 newtons per square meter.

The shape of the shaded image (401) in FIG. 40 represents 10 times the thermal creep predicted in 2 years using a nonlinear FEA if compression loading of the lower portion of the forming structure of FIG. 38 (a linear FEA) is used. It is the nonlinear analysis of the loading of configuration of FIG. 38.

The shape of the shaded image (411) in FIG. 41 is a nonlinear analysis that predicts the minimum thermal sagging condition. The force to produce the predicted substantially zero vertical deformation of the forming structure is 6,075 lbs. versus 3,195 lbs. predicted by the linear analysis shown in FIG. 38. The force of 6,075 lbs. to produce a stable forming structure (9) shape is almost three times the force of 2,250 lbs. that a linear analysis requires to produce zero longitudinal tension in the forming structure (9) per the claims of U.S. Pat. No. 3,519,411. Note that the middle region (417) of the forming structure in FIG. 41 has a substantially straight shape, whereas both the inlet end region (416) and the far end region (418) are slightly curved convex upward. This shape maintains uniform flow over the weirs (115) in the middle region (417) and changed flow over the end region (416) and (418) weirs. The sheet formed has constant thickness in the saleable middle portion, but different thickness and shape in the unusable end portions. Because of the non-linear thermal creep properties of the Zircon refractory, the straight shape of the middle portion of the top of the forming structure (9) is obtained by having the compressive stress in the middle region of the bottom or lower portion of the forming structure (9) be substantially greater than the compressive stress in the middle region of the top or upper portion of the forming structure (9). These stress levels produce equal longitudinal deformation or strain in the top and bottom portions of the middle region (417). The application of the longitudinal compression forces to the lower portions of the forming structure (9) can produce local stress concentrations at locations such as in regions (414) and (415) in FIG. 41.

Nonlinear analysis predicts a longitudinal deformation (413) on the order of 16 mm (413) because of the increased compression loading required to produce a stable forming structure (9) shape. The loading of the linear analysis of FIG. 38 (U.S. Pat. No. 6,889,526) applied to a nonlinear analysis produces a longitudinal deformation or strain (403) on the order of 8 mm, as shown in FIG. 40. The initial length (346) of the forming structure (9) would be made greater to compensate for this increased deformation if the width (331) of the usable sheet (11) was critical and the present design width (346) was marginal.

The nonlinear analysis herein is a simplified example of the nonlinear analysis that would be performed for a known production configuration. The grid is quite coarse and the magnitude of the thermal creep coefficient was only iterated in the vertical direction. Also, more sophisticated FEA programs than that used herein are available which can automatically iterate the thermal creep coefficient as a function of stress and temperature level.

A review of the data of U.S. Pat. No. 6,974,786 shows a high variation in the test results of samples run at the same test conditions. Part of this variation is testing error; however, there is a high probability that there is a significant variation in both the magnitude and slope of the thermal creep properties of different batches of Zircon refractory with respect to temperature and stress. Thus, the forming structures made from different batches of material would have different thermal creep properties. The analysis described herein can be performed for a forming structure (9) design using the average values of the thermal creep properties; however, the deformation of individual forming structures (9) in the production environment may differ from the predicted deformation. To correct for this variation in deformation the feedback control strategy of patent application Ser. No. 11/184,212, herein incorporated by reference, can be used.

In one embodiment the compression loading of the forming structure may be implemented in the prior art manner of Cortright (U.S. Pat. No. 3,519,411), where the forming structure (9) is restrained in the longitudinal direction (175) by a fixed location adjustment bolt (424) at one end and the force applied by an active horizontal load (426) at the other end. The apparatus in this embodiment is shown in FIG. 42A through 42D, but the force applied (426) has a much higher magnitude than the force specified by Cortright. In an application of this embodiment the adjustment bolt (424) is periodically adjusted to maintain the loading at the desired magnitude per U.S. Pat. No. 6,990,834.

In additional embodiments, shown in FIGS. 43 and 44, the forces (426) and (436) are applied as an active load at each end of the forming structure per U.S. Pat. No. 6,990,834, herein incorporated by reference.

In another embodiment, illustrated in FIG. 45, a third active load (457) is induced at the far end of the forming structure to provide a sealing force to overcome the hydrostatic pressure of the glass (429) entering the forming structure per U.S. Pat. No. 6,990,834. In this embodiment, the compression forces (436) and (456) have equal magnitude, but opposite direction.

A fundamental concept of this invention is to apply a force and/or moment to the ends of the forming structure to counteract stress caused by the forces of gravity, thus virtually eliminating the effect on molten glass flow caused by thermal creep.

Although the invention has been described with respect to various embodiments, it should be realized this invention is also capable of a wide variety of further and other embodiments.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for forming sheet glass using an apparatus, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the method comprises the steps of:

providing a downcomer pipe connected to an end of the inflow pipe opposite the trough, wherein a bottom end of the downcomer pipe is located at or below a glass free surface in the inflow pipe and the downcomer pipe and the inflow pipe have a size and shape; and maintaining a glass temperature at the free surface above a glass liquidus temperature with at least one heater located at the top of the inflow pipe and/or the bottom of the downcomer pipe in an area of the free surface.

2. The method of claim 1, wherein the heater prevents formation of devitrification defects.

3. The method of claim 1 wherein the heater is part of a bottom of the downcomer pipe.

4. The method of claim 1 wherein the heater is part of a top of the inflow pipe.

5. The method of claim 1, further comprising at least one sealing block surrounding the downcomer pipe, wherein the heater is part of the sealing block.

6. A method for forming sheet glass using an apparatus, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the method comprises the steps of:

providing a downcomer pipe connected to and end of the inflow pipe opposite the trough, wherein the bottom end of the downcomer pipe is located above a glass free surface in the inflow pipe and the downcomer pipe and the inflow pipe have a size and shape; and maintaining a glass temperature at the free surface above a glass liquidus temperature with at least one heater located at the top of the inflow pipe and/or the bottom of the downcomer pipe in an area of the free surface.

7. The method of claim 6, wherein the heater prevents formation of devitrification homogeneity defects.

8. The method of claim 6 wherein the heater is part of a bottom of the downcomer pipe.

9. The method of claim 6 wherein the heater is part of a top of the inflow pipe.

10. The method of claim 6, further comprising at least one sealing block surrounding the downcomer pipe, wherein the heater is part of the sealing block.

11. A method for forming sheet glass using an apparatus, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the method comprises the step of:

provided a downcomer pipe connected to an end of the inflow pipe opposite the trough, wherein a conical section is incorporated in the inflow pipe at a vertical location of a glass free surface at a juncture of the downcomer pipe and inflow pipe.

12. The method of claim 11, wherein the included half angle of the conical section is between 10 and 50 degrees and the apex of the conical section is above the conical section.

13. A method for forming sheet glass using an apparatus, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the method comprises the steps of:

(a) measuring a mass flow of air into a muffled door chamber with at least one inflow measurement device;

(b) measuring a mass flow of air out of the muffle door chamber with at least one outflow measurement device; and (c) providing at least one vent opening in a top of the muffle door chamber that allows air flow between the muffle door chamber and a chamber containing the sheet forming structure;

wherein the outflow measurement device regulates cooling air flowing out of the muffle door chamber equal to a measured value that flows into the muffle door chamber minus a quantity of forced convection air mass flow desired for cooling the glass flowing off a bottom of the wedged shaped sheet forming structure.

14. The method of claim 13 wherein the inflow measurement device regulates cooling air flowing into the muffle door chamber to a constant value such that energy loss in a muffle door zone is constant.

15. The method of claim 14, wherein the vent opening between the muffle door chamber and the chamber containing the sheet forming structure is large enough to substantially equalize a pressure between the muffle door chamber and the chamber containing the sheet forming structure such that no air leaks through cracks and openings between the muffle door chamber and the glass flowing off a bottom of the wedged shaped sheet forming structure.

16. The method of claim 13 wherein the vent opening between the muffle door chamber and the chamber containing the sheet forming structure is large enough to substantially equalize a pressure between the muffle door chamber and the chamber containing the sheet forming structure such that no air leaks through cracks and openings between the muffle door chamber and the glass flowing off a bottom of the wedged shaped sheet forming structure.

* * * * *